US008979631B2

(12) United States Patent
Kitamura et al.

(10) Patent No.: US 8,979,631 B2

(45) Date of Patent: Mar. 17, 2015

(54) GAMING MACHINE CAPABLE OF REALISTICALLY INFORMING OF A PAYOUT RATE

(75) Inventors: Kenta Kitamura, Tokyo (JP); Masumi Fujisawa, Tokyo (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 277 days.

(21) Appl. No.: 13/289,856

(22) Filed: Nov. 4, 2011

(65) Prior Publication Data

US 2012/0115574 A1 May 10, 2012

(30) Foreign Application Priority Data

Nov. 8, 2010 (JP) ................................ 2010-250312

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC .......... *G07F 17/3211* (2013.01); *G07F 17/323* (2013.01); *G07F 17/3267* (2013.01)

USPC ............................ 463/20; 463/16; 273/143 R

(58) Field of Classification Search

CPC ........... A63F 2003/00009; A63F 2003/00012; A63F 3/00643

USPC .................................. 463/16, 20; 273/143 R

See application file for complete search history.

(56) References Cited

U.S. PATENT DOCUMENTS

| | | | | |
|---|---|---|---|---|
| 6,315,660 B1 * | 11/2001 | DeMar et al. | .................. | 463/16 |
| 8,267,771 B2 * | 9/2012 | Wilson et al. | .................. | 463/20 |
| 2007/0060341 A1 * | 3/2007 | Lind | .............................. | 463/31 |
| 2010/0081493 A1 | 4/2010 | Kamano | | |

* cited by examiner

*Primary Examiner* — Milap Shah

*Assistant Examiner* — Jason Pinheiro

(74) *Attorney, Agent, or Firm* — Sheppard, Mullin, Richter & Hampton LLP

(57) ABSTRACT

The present invention provides a gaming machine that is capable of realistically informing a player of a payout rate, via an effective rendering of such a type in which the player is permitted to participate. In this gaming machine, when the routine migrates to a bonus game, a player makes an input operation via a first display panel to thereby advance a game in a second display panel that is provided upward of the first display panel. In this manner, as the bonus game, a game of such a kind in which the player is permitted to participate can be executed at a position that is easily seen from an upward periphery.

16 Claims, 43 Drawing Sheets

FIG. 5

| | FIRST VIDEO REEL | SECOND VIDEO REEL | THIRD VIDEO REEL | FOURTH VIDEO REEL | FIFTH VIDEO REEL |
|---|---|---|---|---|---|
| CODE NUMBER | SYMBOL | SYMBOL | SYMBOL | SYMBOL | SYMBOL |
| 00 | FIRST SYMBOL GROUP | SECOND SYMBOL GROUP | THIRD SYMBOL GROUP | FOURTH SYMBOL GROUP | FIFTH SYMBOL GROUP |
| 01 | | | | | |
| 02 | | | | | |
| 03 | | | | | |
| 04 | | | | | |
| 05 | | | | | |
| 06 | | | | | |
| 07 | | | | | |
| 08 | | | | | |
| 09 | | | | | |
| 10 | | | | | |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |

FIG. 7

SYMBOL COMBINATION TABLE

| SYMBOL COMBINATION | | | | | NUMBER OF PAYOUTS | WINNING COMBINATIONS |
|---|---|---|---|---|---|---|
| FIRST VIDEO REEL | SECOND VIDEO REEL | THIRD VIDEO REEL | FOURTH VIDEO REEL | FIFTH VIDEO REEL | | |
| FIRST SYMBOL | FIRST SYMBOL | FIRST SYMBOL | FIRST SYMBOL | FIRST SYMBOL | AMOUNT OF JACKPOT | JACKPOT |
| SECOND SYMBOL | SECOND SYMBOL | SECOND SYMBOL | SECOND SYMBOL | SECOND SYMBOL | BONUS GAME * | BONUS GAME TRIGGER |
| THIRD SYMBOL | THIRD SYMBOL | THIRD SYMBOL | THIRD SYMBOL | THIRD SYMBOL | 10 | THIRD WINNING COMBINATION |
| FOURTH SYMBOL | FOURTH SYMBOL | FOURTH SYMBOL | FOURTH SYMBOL | FOURTH SYMBOL | 8 | FOURTH WINNING COMBINATION |
| FIFTH SYMBOL | FIFTH SYMBOL | FIFTH SYMBOL | FIFTH SYMBOL | FIFTH SYMBOL | 5 | FIFTH WINNING COMBINATION |
| SIXTH SYMBOL | SIXTH SYMBOL | SIXTH SYMBOL | SIXTH SYMBOL | SIXTH SYMBOL | 5 | SIXTH WINNING COMBINATION |
| SEVENTH SYMBOL | SEVENTH SYMBOL | SEVENTH SYMBOL | SEVENTH SYMBOL | SEVENTH SYMBOL | 4 | SEVENTH WINNING COMBINATION |
| EIGHTH SYMBOL | EIGHTH SYMBOL | EIGHTH SYMBOL | EIGHTH SYMBOL | EIGHTH SYMBOL | 3 | EIGHTH WINNING COMBINATION |
| FIFTH SYMBOL | FIFTH SYMBOL | FIFTH SYMBOL | (ANY) | (ANY) | 2 | NINTH WINNING COMBINATION |
| EIGHTH SYMBOL | EIGHTH SYMBOL | EIGHTH SYMBOL | (ANY) | (ANY) | 2 | TENTH WINNING COMBINATION |
| FIFTH SYMBOL | (ANY) | (ANY) | (ANY) | (ANY) | 1 | ELEVENTH WINNING COMBINATION |
| EIGHTH SYMBOL | (ANY) | (ANY) | (ANY) | (ANY) | 1 | TWELFTH WINNING COMBINATION |

* FREE GAME IS PERFORMED BY THE NUMBER OF TIMES DETERMINED BY MEANS OF LOTTERY.

131

GAMING MACHINE CAPABLE OF REALISTICALLY INFORMING OF A PAYOUT RATE

CROSS REFERENCE TO RELATED APPLICATIONS

This application claims priority of Japanese Patent Application No. 2010-250312 filed on Nov. 8, 2010. The contents of this application are incorporated herein by reference in their entirety.

BACKGROUND OF THE INVENTION

1. Field of the Invention

The present invention relates to a gaming machine that is capable of repeatedly executing a unit game.

2. Description of the Related Art

A gaming machine adapted to repeatedly execute a unit game is proposed, the gaming machine including an extension device configured to assign another function to each symbol having its own function, the gaming machine providing a new game so as to thereby offer various kinds of games (for example, refer to United States Patent Application Publication No. 2010/0081493).

In recent years, slot machines that are installed in casinos outside Japan include the one that allows a player to execute a second game or the like, in addition to a basic game to be played in such a manner that symbols to be stopped after reel rotation are rearranged and the amount of prize is determined. In these slot machines, it is determined whether or not the routine is caused to migrate to the second game by means of lottery in the basic game, and then, the second game is executed according to a result of the lottery. Therefore, players have been merely allowed to have a simple entertaining option of whether or not the routine is caused to migrate to the second game.

In addition, in conventional slot machines, a payout rate is set to be comparatively low, which has caused a lowered popularity of the slot machines.

Slot machines that are capable of changing a payout rate in gaming facilities such as casinos have been conventionally known as well. Each of such slot machines has a switch for changing the payout rate. In the gaming facilities, after closing their shops, the staffs can change setting of the payout rate by operating the switch in accordance with a play situation in the gaming facilities. However, players cannot directly check whether the payout rate is highly set or is lowly set. Therefore, even in a case where the payout rate has been highly set, players cannot be informed of the fact, and it has been a low possibility that a player can enjoy game at a slot machine at which the payout rate is highly set. Accordingly, even in the case where the payout rate has been highly set, players who visit the gaming facilities cannot always enjoy game, the number of players who play at slot machines cannot always be increased, and it has been difficult to increase sales in gaming facilities exerted by slot machines.

In addition, in conventional slot machines, a comparatively small-sized display panel is provided in order to avoid increasing an installation area, and a rendering image is displayed on the display panel, whereby it has been difficult to sufficiently have a rendering effect.

The present invention has been made in order to solve the conventional problem described above, and it is an object of the present invention to provide a gaming machine that is capable of realistically informing a player of a payout rate via an effective rendering of such a kind that the player is permitted to participate.

SUMMARY OF THE INVENTION

A gaming machine according to embodiment of the present invention comprising:

an input device for starting a basic game;

a first display panel configured to display a plurality of reels on which a plurality of symbol groups are respectively drawn, the first display panel constituting an operating panel;

a second display panel that is provided upward of the first display panel, and is configured to display an image; and a controller configured to execute processing operations of:

(a) based on an input to the input device, making determination processing to randomly determine symbols to be displayed for a player when scroll of a plurality of symbol arrays stops, and then, starting a basic game;

(b) scrolling a respective one of the plurality of symbol arrays that are displayed on the first display panel;

(c) based on a result of the determination result, sequentially stopping a respective one of a plurality of symbol arrays that are scrolled;

(d) after the scroll of the plurality of symbol arrays is stopped, when at least one symbol is displayed, migrating to a bonus game (Koyuki bonus game) and then executing rendering of the bonus game in the second display panel;

(e) in the bonus game that is executed in the second display panel, moving a predetermined character, based on a result of the input operation that is made by the player via the first display panel; and (f) based on a result of the movement of the character, determining a prize and then awarding the determined prize to the player.

In this configuration, when the routine migrates to a bonus game, a player makes an input operation via a first display panel to thereby advance a game in a second display panel that is provided upward of the first display panel. In this manner, as a bonus game, a game of such a kind in which a player is permitted to participate is executed at a position that can be easily seen from an upward periphery.

Further, the gaming machine according to embodiment of the present invention comprising:

an input device for starting a basic game;

a first display panel configured to display a plurality of reels on which a plurality of symbol groups are respectively drawn, the first display panel constituting an operating panel;

a second display panel that is provided upward of the first display panel, and is configured to display an image; and a controller configured to execute processing operations of:

(a) based on an input to the input device, making determination processing to randomly determine symbols to be displayed for a player when scroll of a plurality of symbol arrays stops, and then, starting a basic game;

(b) scrolling a respective one of the plurality of symbol arrays that are displayed on the first display panel;

(c) based on a result of the determination result, sequentially stopping a respective one of a plurality of symbol arrays that are scrolled;

(d) after the scroll of the plurality of symbol arrays is stopped, when at least one symbol is displayed, migrating to a bonus game (Koyuki bonus game) and then executing rendering of the bonus game in the second display panel;

(e) in the bonus game that is executed in the second bonus game, moving a predetermined character from a bottom to a top, based on a result of the input operation that is made by the player via the first display panel; and (f) based on a result of the movement of the character, determining a prize and then awarding the determined prize to the player.

In this configuration, when the routine migrates to a bonus game, a player makes an input operation via a first display panel to thereby advance a game in a second display panel that is provided at an upper part of the first display panel. In this manner, as the bonus game, a game of such a kind in which a player is permitted to participate is executed at a position that can be easily seen from an upward periphery.

The first display panel is a panel configured to display symbol scroll and stoppage. A player pays his or her attention to the first display panel in a normal basic game. When the routine migrates to a bonus game the game advances in a second display panel that is provided upward of a first display panel. This game advances from a bottom to a top of the second display panel. The eye of the player that has paid his or her attention to the first display panel will then naturally move to a lower part of the second display panel that is proximal to the first display panel.

The game then advances from the bottom to the top of the second display panel in accordance with the progress of the game, and finally, the game completes at the upper part of the second display panel, enabling the player's eye to be naturally moved in accordance with the progress of the game.

At the time of completion of the game, the contents of the game are displayed at the upper part of the second display panel, whereby the game completes at a position that is easily seen from the periphery. In this manner, a goal can be reached at a position that is easily watched by another player.

A gaming machine can be provided which is capable of realistically informing a player of a payout rate, via an effective rendering of such a kind in which a player is permitted to participate.

BRIEF DESCRIPTION OF THE DRAWINGS

FIG. 5 is a view showing groups of symbols drawn on a circumferential faces of reels in the gaming machine according to the embodiment of the present invention;

FIG. 7 is a view showing a symbol combination table of the gaming machine according to the embodiment of the present invention;

DESCRIPTION OF THE PREFERRED EMBODIMENTS

Figure 1:
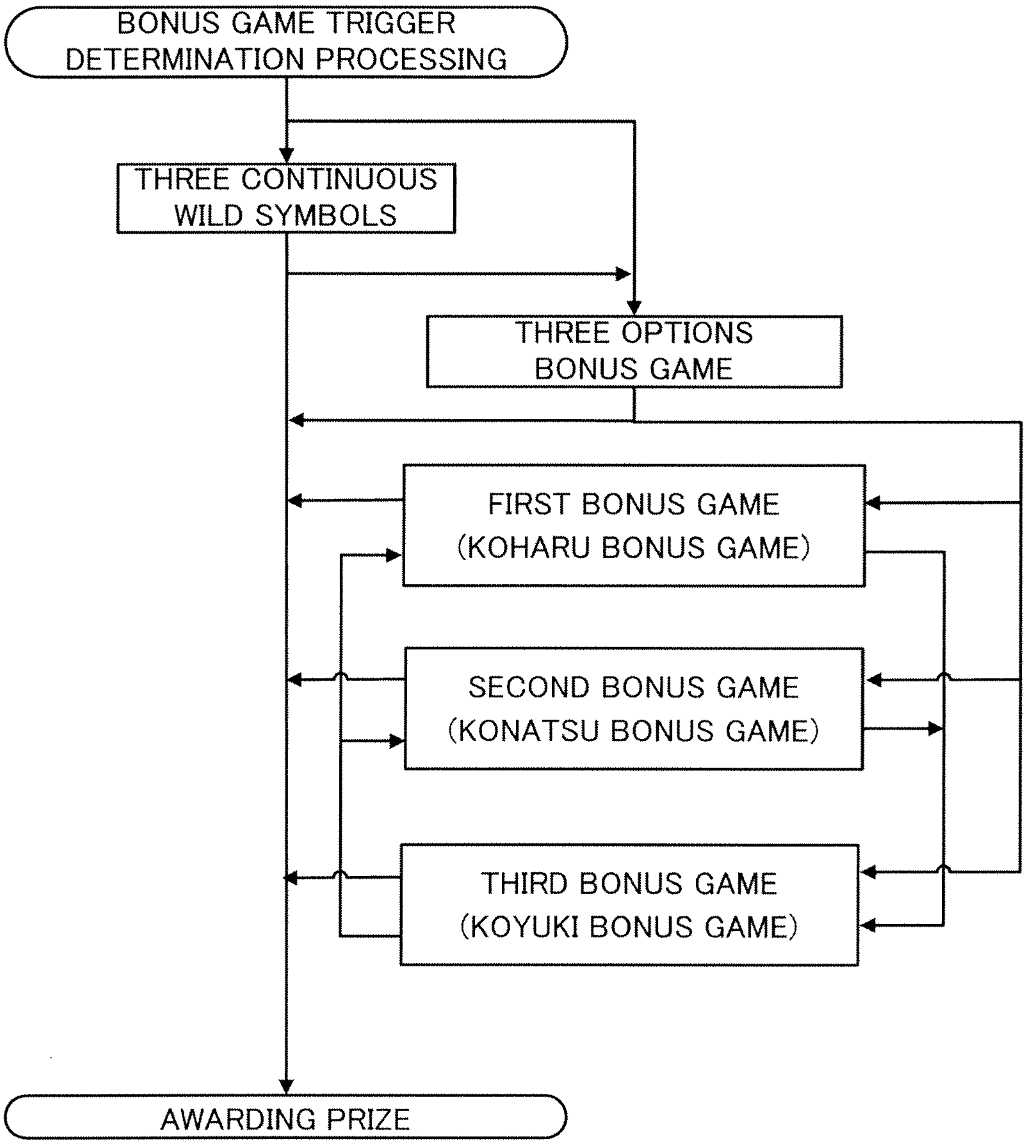
FIG. 1 is a block diagram depicting an outline of a gaming machine according to an embodiment of the present invention.

Hereinafter, exemplary embodiments of the present invention will be described with reference to the drawings.

Outline of the Embodiments

A gaming machine according to embodiment comprising:

an input device (a spin button, a spin switch) for starting a basic game;

a first display panel (a lower display image panel) configured to display a plurality of reels (video reels) on which a plurality of symbol groups are respectively drawn, the first display panel constituting an operating panel;

a second display panel (an upper image display panel) that is provided upward of the first display panel (a lower display image panel), and is configured to display an image; and a controller (a main CPU) configured to execute processing operations of:

(a) based on an input to the input device (a spin button, a spin switch), making determination processing to randomly determine symbols to be displayed for a player when scroll of a plurality of symbol arrays stops, and then, starting a basic game;

(b) scrolling a respective one of the plurality of symbol arrays that are displayed on the first display panel (the lower display image panel);

(c) based on a result of the determination result, sequentially stopping a respective one of a plurality of symbol arrays that are scrolled;

(d) after the scroll of the plurality of symbol arrays is stopped, when at least one symbol is displayed, migrating to a bonus game (Koyuki bonus game) and then executing rendering of the bonus game in the second display panel (the upper display image panel);

(e) in the bonus game that is executed in the second display panel (the upper display image panel), moving a predetermined character, based on a result of the input operation that is made by the player via the first display panel (the lower display image panel); and (f) based on a result of the movement of the character, determining a prize and then awarding the determined prize to the player.

In this configuration, when the routine migrates to a bonus game, a player makes an input operation via a first display panel to thereby advance a game in a second display panel that is provided upward of the first display panel. In this manner, as a bonus game, a game of such a kind in which a player is permitted to participate is executed at a position that can be easily seen from an upward periphery.

Further, the gaming machine according to embodiment comprising:

an input device (a spin button, a spin switch) for starting a basic game;

a first display panel (a lower display image panel) configured to display a plurality of reels on which a plurality of symbol groups are respectively drawn, the first display panel constituting an operating panel;

a second display panel (an upper display image panel) that is provided upward of the first display panel (the lower display image panel), and is configured to display an image; and a controller (a main CPU) configured to execute processing operations of:

(a) based on an input to the input device (the spin button, a spin switch), making determination processing to randomly determine symbols to be displayed for a player when scroll of a plurality of symbol arrays stops, and then, starting a basic game;

(b) scrolling a respective one of the plurality of symbol arrays that are displayed on the first display panel (the lower display image panel);

(c) based on a result of the determination result, sequentially stopping a respective one of a plurality of symbol arrays that are scrolled;

(d) after the scroll of the plurality of symbol arrays is stopped, when at least one symbol is displayed, migrating to a bonus game (Koyuki bonus game) and then executing rendering of the bonus game in the second display panel (the upper display image panel);

(e) in the bonus game that is executed in the second display panel (the upper display image panel), moving a predetermined character from a bottom to a top, based on a result of the input operation that is made by the player via the first display panel (the lower display image panel); and (f) based on a result of the movement of the character, determining a prize and then awarding the determined prize to the player.

In this configuration, when the routine migrates to a bonus game, a player makes an input operation via a first display panel to thereby advance a game in a second display panel that is provided at an upper part of the first display panel. In this manner, as the bonus game, a game of such a kind in which a player is permitted to participate is executed at a position that can be easily seen from an upward periphery.

The first display panel is a panel configured to display symbol scroll and stoppage. A player pays his or her attention to the first display panel in a normal basic game. When the routine migrates to a bonus game the game advances in a first display panel that is provided upward of the first display panel. This game advances from a bottom to a top of the second display panel. The eye of the player that has paid his or her attention to the first display panel will then naturally move to a lower part of the second display panel that is proximal to the first display panel.

The game then advances from the bottom to the top of the second display panel in accordance with the progress of the game, and finally, the game completes at the upper part of the second display panel, enabling the player's eye to be naturally moved in accordance with the progress of the game.

At the time of completion of the game, the contents of the game are displayed at the upper part of the second display panel, whereby the game completes at a position that is easily seen from the periphery. In this manner, a goal can be reached at a position that is easily watched by another player.

FIG. 1 is a block diagram for explaining an outline of an embodiment of the present invention. As shown in FIG. 1, in a gaming machine according to the embodiment of the present invention, it is determined whether or not the routine is caused to migrate to a bonus game in bonus game trigger determination processing.

In the bonus game trigger determination processing, it is determined whether or not the routine is caused to migrate to a three continuous WILD symbols game. The three continuous WILD symbols game is a game in which, from among two upper and lower image display panels (an upper image display panel 131 (to be described later) and a lower image display panel 141 (to be described later)), in a state in which video reels that are displayed on the image display panel that is provided on a lower side are hidden, after rendering has been executed in such a manner that a shadow is displayed on its back side, three continuous WILD symbols are displayed on the reel on which the shadow has been displayed.

From the three continuous WILD symbols game, it is determined whether the routine migrates to a three options bonus game or whether a prize is awarded and then a bonus game completes, by means of lottery. The three options bonus game is a game to which the routine migrates, directly from the bonus game trigger determination processing or via the three continuous WILD symbols game. The three options bonus game is a game to which the routine can migrate, in a case where three bonus symbols have been displayed in a stopped state on any of the video reels that are displayed on the lower image display panel.

In the three options bonus game, there may be a case in which video reels are re-scrolled in a state in which two bonus symbols have been rearranged. In this re-scrolling, while at least one reel on which two bonus symbols have been displayed in a stopped state is maintained in its fixed state, the remaining reels are re-scrolled after re-lottery has been performed. In this manner, even if re-lottery has been performed without changing a probability table to be employed when such re-lottery has been performed, there can be increased a probability that three bonus symbols are arranged as a while after such re-lottery (re-scroll) has been performed.

If three bonus symbols are displayed in a stopped state in the three options bonus game, a player is given an opportunity of selecting any of the three bonus symbols that have been displayed in a stopped state. When any of the bonus symbols is selected, a first bonus game (a Koharu bonus game), a second bonus game (a Konatsu bonus game), or a third bonus game (a Koyuki bonus game) is executed.

The first bonus game is a game in which no other player can participate and a prize is randomly determined. Specifically, this bonus game is a game in which a prize according to a playing time of the first bonus game is awarded to a winning player. The second bonus game is a game in which no other player can participate and a prize is randomly determined. In the second bonus game, one or two WILD symbols are arranged on each reel in each unit game and then scrolling is performed. A prize according to a total number of WILD symbols arranged after a plurality of unit games is awarded to a winning player. In the first and second bonus games described above, lottery is performed as to whether or not the routine is caused to migrate to the third bonus game after the first and second bonus games have been played.

The third bonus game is a game in which at least one player can participate. This game is executed in a case where a player has made a selection in the three options bonus game or in a case where it is determined that the routine migrates to the third bonus game, by means of lottery in the first and second bonus games.

In the third bonus game, a lower image display panel (a touch panel) is employed for operational input from a player, and the contents of the progress of a game are displayed on an upper image display panel. In the upper image display panel, in accordance with the progress of a game responsive to an input operation of the player, a display relating to the game moves from its lower part to its upper part. In this manner, a game starts from a lower part of the upper image display panel, which is close to the lower image display panel having displayed thereon video reels to which a player pays attention in a normal game, and then, the above display moves in an upward direction, whereby movement of the player's eye is lessened, enabling the player to naturally pay his or her attention to the contents of the game.

In addition, in the upper image display panel, the game advances from the bottom to the top, and the relevant top and bottom areas are utilized to be able to avoid an increase in size in a horizontal direction of the image display panel.

After a goal has been reached in the third bonus game, any of items of awarding of prize in the third bonus game, migration to the first bonus game, and migration to the second bonus game, as the result of the goal, is selected by means of lottery. If an item of migration to the first or second bonus game has been selected, as described above the routine may migrate to the third bonus game after the first or second bonus game has been played. In this way, a loop of migrating from the third bonus game to the first or second bonus game and further migrating to the third bonus game may be occasionally formed. This loop may be occasionally repeated a predetermined number of times (for example, five times) that is defined as its upper limit. This loop completes in a case where a lottery result has not been obtained, the lottery result indicating that the routine migrates to the first or second bonus game after a goal has been reached in the third bonus game, or the lottery result indicating that the routine migrates to the third bonus game in the first or second bonus game, or alternatively, in a case where a specific game result has been obtained partway of the third bonus game (for example, in a case where a specific character has appeared).

[Explanation of Function Flow Diagram]

Figure 2:
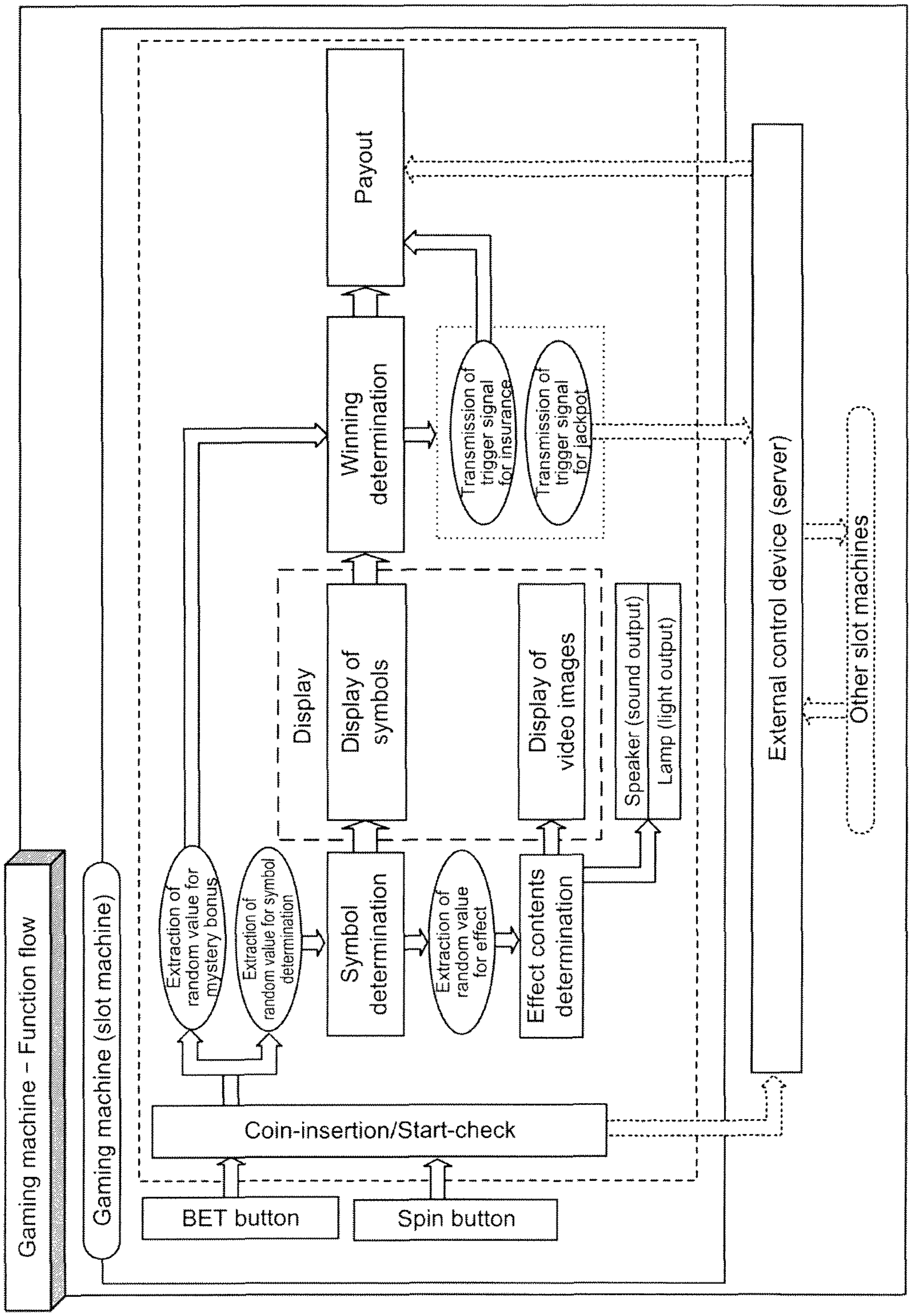
FIG. 2 is a diagram showing a functional flow of the gaming machine according to the embodiment of the present invention.

With reference to FIG. 2, basic functions of the gaming machine according to the present embodiment are described.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols (trigger symbols) related to a free game trigger has been displayed the gaming machine starts the free game. In the embodiment, as a bonus game, a game (a free game) is performed in such a manner that lottery according to determination of to-be-stopped symbols described previously is performed over a predetermined number of times without consuming a coin.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

Figure 3:
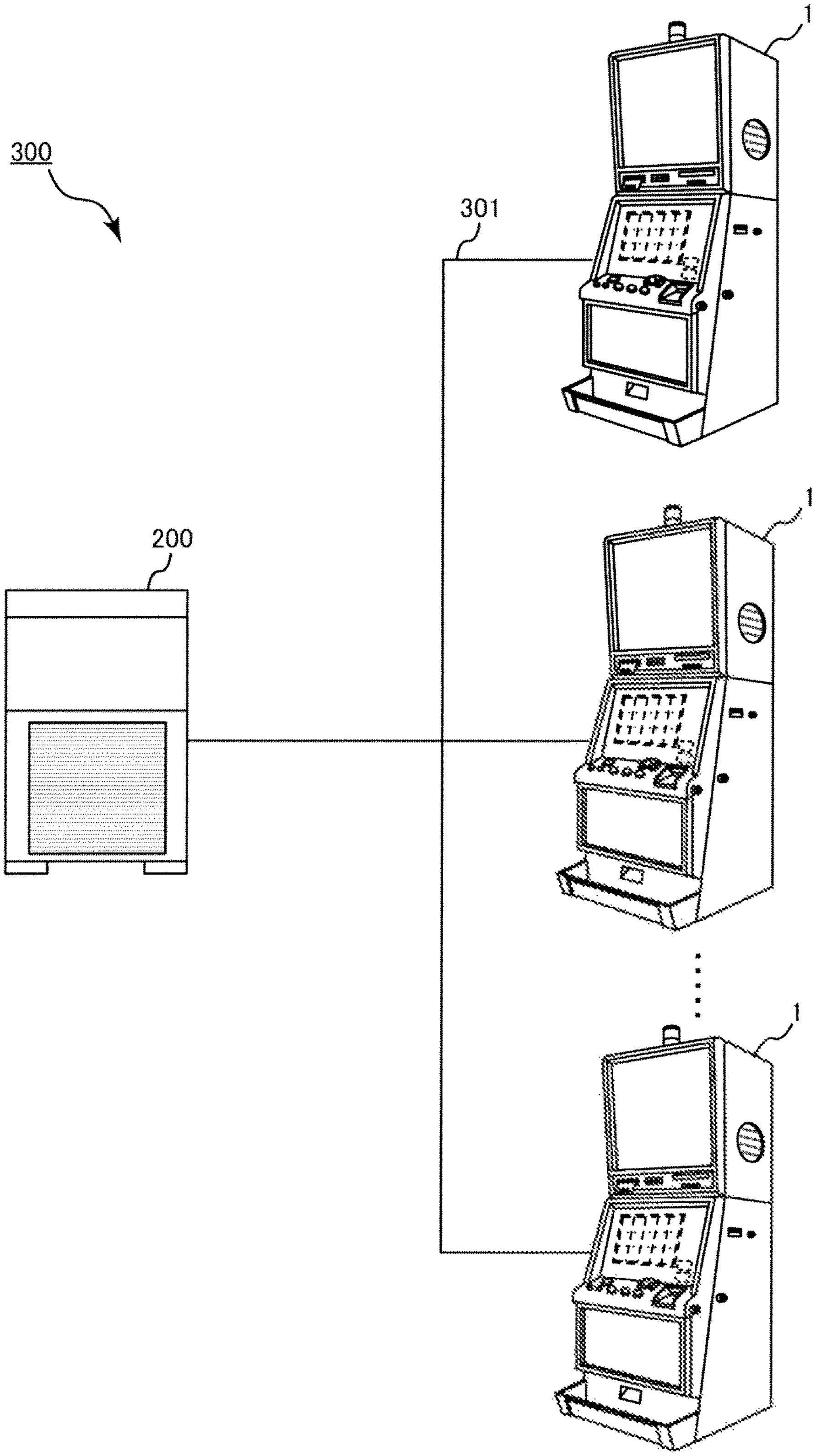
FIG. 3 is a view showing a game system including gaming machines according to the embodiment of the present invention.

The basic functions of the gaming machine have been described above. Next, with reference to FIG. 3, a game system including the gaming machine is described.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 4:
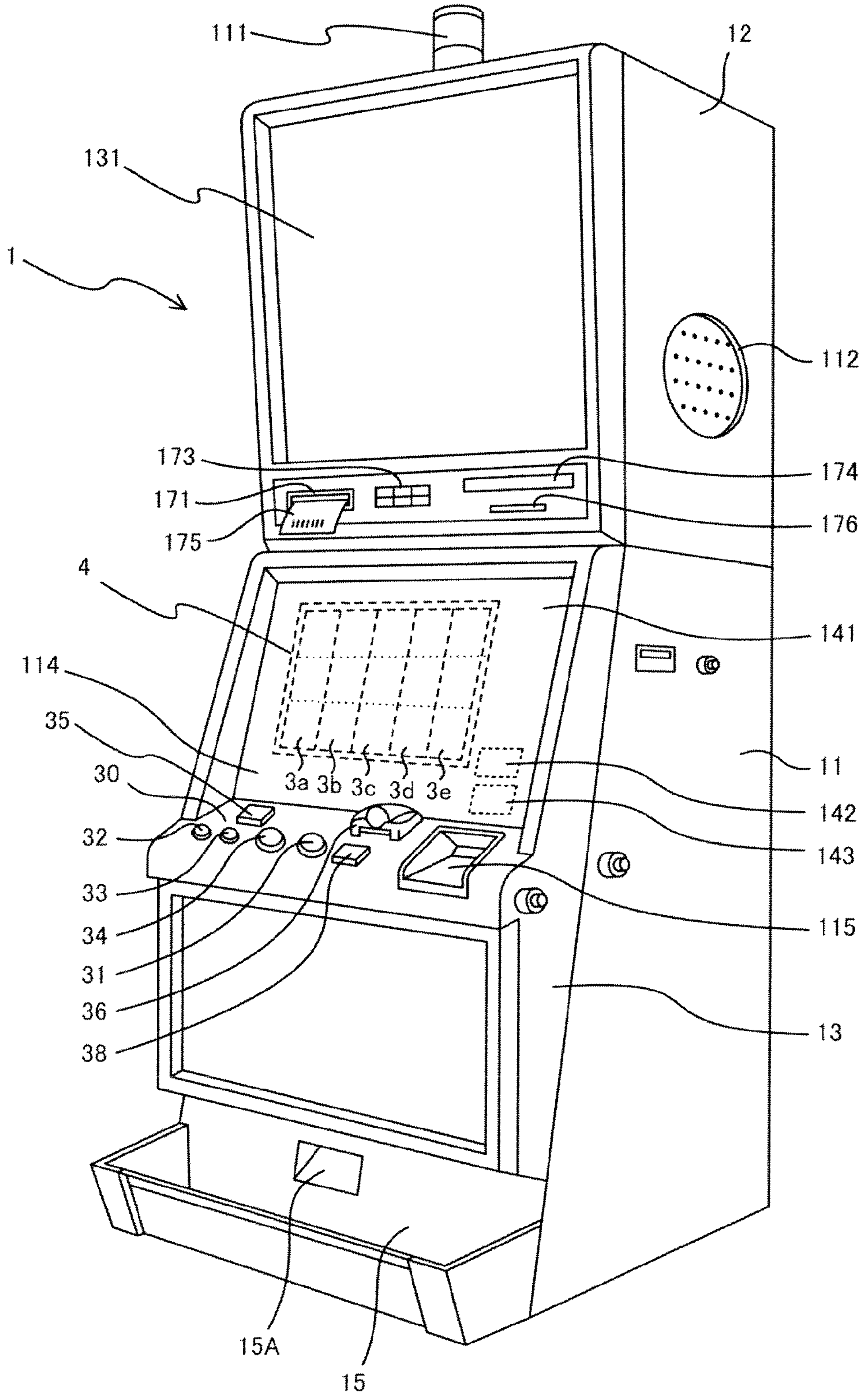
FIG. 4 is a view showing an entire configuration of the gaming machine according to the embodiment of the present invention.

The game system according to the present embodiment has been described above. Next, with reference to FIG. 4, an overall configuration of the gaming machine 1 is described.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 symbols in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (three consecutive symbols in the present embodiment) of each of the symbol arrays is displayed for the player.

The symbol display region 4 has three regions, namely an upper region, an upper central region, a lower central region, and a lower region, for each video reel 3, and a single symbol is to be displayed to each region. That is, fifteen (=five columns×three symbols) symbols are to be displayed in the symbol display region 4. In the present embodiment, a line formed by selecting one of the aforementioned three regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

In addition, the lower image display panel 141 has a number-of-credits display region 142 and a number-of-payouts display region 143. The number-of-credits display region 142 is configured to display the number of coins that are owned by a player and are deposited inside a gaming machine 1 (hereinafter, referred to as the number of credits). In addition, the number-of-payouts display region 143 is configured to display the number of coins to be paid out to a player when a winning prize has been established (hereinafter, referred to as the number of payouts).

The lower image display panel 141 has a built-in touch panel 114. The player can input various commands by touching the lower image display panel 141. On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A high power button 38 is also employed when a player operates to thereby start scrolling of symbol arrays of each video reel 3. When the player has operated a spin button 31, a unit game is started in a normal state (hereinafter, referred to as a non-high power state). On the other hand, when the player has operated the high power button 38, a high power state is established and then a unit game is started.

The high power state is a state in which a payout rate is higher than that set when the non-high power state is established. A high payout rate is established by increasing a winning probability in bonus game by re-scrolling other reels while leaving bonus symbols displayed in a stopped state in a bonus game to be described later. By doing this, a payout rate can be increased without a need to change the winning probability in lottery processing.

A payout rate is referred to as a value obtained by dividing the number of coins or the number of credits paid out to a player as a result of executing a unit game by the number of coins or the number of credits determined (betted) to start a unit game. A state in which the payout rate is high is a state in which more coins or credits have been seemingly paid out. The state in which the payout rate is high is a state which is advantageous to a player, but is disadvantageous to a gaming facility. On the other hand, a state in which the payout rate is low is a state in which lesser coins or credits have been seemingly paid out. The state in which the payout rate is low is a state which is disadvantageous to a player, but is advantageous to a gaming facility.

A unit game is a game from start of symbol scroll-display or rearrangement to symbol display in a stopped state. The unit game may be started when a player has operated BET buttons such as a 1-BET button 34 and a MAX-BET button 35 or five BET buttons 39*a* to 39*e*. In addition, the unit game may be started when the spin button 31 or the high power button 38 has been operated. Further, the unit game may be completed when payout of a prize responsive to a combination of symbols that are displayed in a stopped state has been completed.

The high power state or the non-high power state can be determined according to a value of a flag that is stored in a RAM 73 of a motherboard 70 to be described later. When the high power state is established, the flag value is set to 1, or alternatively, when the non-high power state is established, the flag value is set to 0. When the high power state is established, a player operates the spin button 31 to be thereby able to return the current state to the non-high power state. A processing operation of returning the high power state to the non-high power state will be described later in detail.

When a game state of a unit game is in a basic game state, it is preferable that a player operate the high power button 38 to thereby establish the high power state. In this case, no high power state is established even if the high power button 38 is operated when there is established a bonus game state or a free game state which is more advantageous to a player than the basic game state. By doing thus, a profit to be given a player is given can be restrained, making it possible to prevent a deficit from which a gaming facility may suffer. On the other hand, even when a bonus game state or a free game state is established, a high power state may be established. In such a case, a player can be given a higher profit to be able to attract the player's interest to a game.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

The symbol table for normal game shows the arrangements of symbols drawn on the peripheral surfaces of the reels. A first video reel 3*a*, a second video reel 3*b*, a third video reel 3*c*, a fourth video reel 3*e*, and a fifth video reel 3*d* each is assigned with a respective one of symbol arrays (a first symbol group, a second symbol group, a third symbol group, a fourth symbol group, and a fifth symbol group), consisting of 22 symbols that correspond to respective code numbers from “00” to “21”.

As kinds of symbols, a plurality of kinds of symbols including “JACKPOT 7” and “bonus symbols” are provided. These kinds of symbols are fewer than the number of symbols on each reel (22 symbols), whereby a plurality of symbols of a same kind may also be assigned to one reel. According to the number of assignments, a winning probability in a case where symbols have formed a combination is different from another one, and the number of payouts is set in accordance with the winning probability. That is, in a case where fewer assigned symbols have formed a combination, more payouts are realized.

[Configuration of Circuit Included in Gaming Machine]

Figure 6:
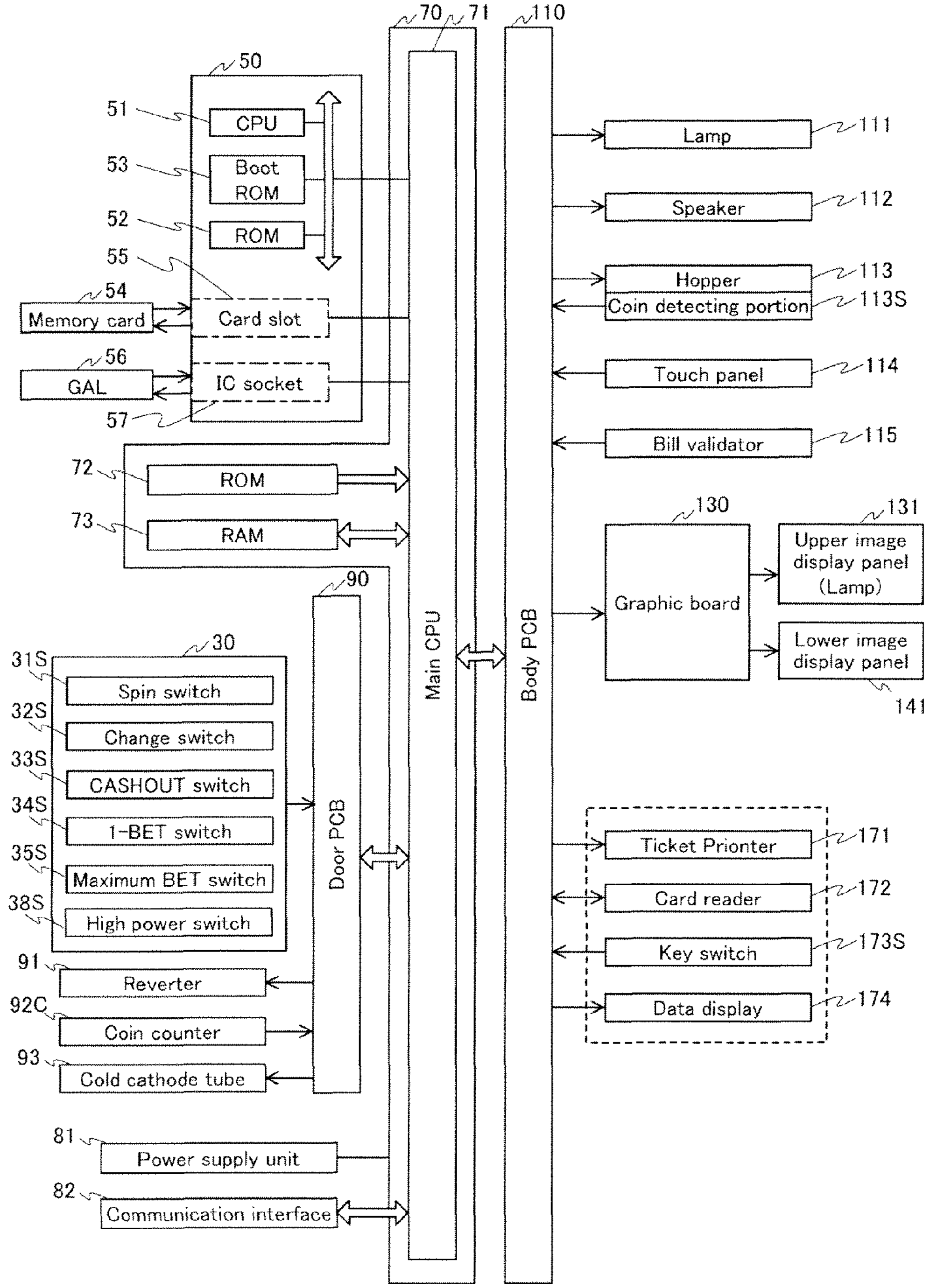
FIG. 6 is a block diagram depicting an internal configuration of the gaming machine according to the embodiment of the present invention.

The configuration of the symbol arrays included in the video reels 3 of the gaming machine 1 has been described above. Next, with reference to FIG. 6, a configuration of a circuit included in the gaming machine 1 is described.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIG. 8 to FIG. 34 which are described later). Further, the aforementioned game program includes data specifying the configuration of the symbol array assigned to each video reel 3.

The lottery program is a program for determining to-be stopped symbol of each video reel 3 by lottery. The to-be stopped symbol is data for determining three symbols to be displayed to the symbol display region 4 out of the 22 symbols forming each symbol array. The gaming machine 1 of the present embodiment determines as the to-be stopped symbol the symbol to be displayed in a predetermined region (the upper region) out of the three regions provided for each of the video reels 3 of the symbol display region 4.

The aforementioned lottery program includes symbol determination data. The symbol determination data is data that specifies random values so that each of the 22 symbols (code numbers from “00” to “21”) forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of “JACKPOT 7”, and includes seven symbols of predetermined. Hence, the former is determined at the probability of “1/22”, whereas the latter is determined at the probability of “7/22”.

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus. The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 70 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S and a high power button 38S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 1735 and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 1135 outputs a signal to the main CPU 71 upon detection of coins paid out by the hopper 113.

The touch panel 114 detects a place on the lower image display panel touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. The number of credits that is stored in the RAM 73 is displayed in the number-of-credits display portion 142 of the lower image display panel 141. The payout number of coins is displayed in the number-of-payouts display portion 143 of the lower image display panel 141.

The upper image display panel 131 is a panel in which an image of a bonus game to be described later has been depicted on a surface of an optically transmissible board. At the back side of the panel, a part of the image becomes brighter by emitting light from a plurality of light emitting means (such as lamps) that are provided at positions focusing on the image, whereby a variety of information is conveyed to a player. The upper image display panel 131 may be a constituent element employing a liquid crystal panel.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73. In addition, a graphic board 130 is configured to control a plurality of lamps that are provided at the back side of the upper image display panel 131 to turn on or off in accordance with the progress of a game.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

A description of a circuit configuration of a gaming machine 1 has now completed. Next, a symbol combination table will be described with reference to FIG. 7.

The symbol combination table is configured to specify symbol combinations of symbols according to winning prizes and the number of payouts. In a gaming machine 1, a winning prize is established in a case where, after scrolling of the symbol arrays on the respective video reels 3 has been stopped, a combination of symbols that are displayed on a winning line coincides with a specified combination of symbols in accordance with the symbol combination table. Then, according to a winning combination, a prize such as payout of coins or start of a bonus game is awarded to a winning player. In a case where a combination of symbols that are displayed on a winning line does not coincide with any the symbol combinations that are specified in accordance with the symbol combination table, no winning combination (so called losing) is established.

Basically a winning prize is established in a case where symbols of any kind have been displayed to be rearranged on a winning line. With respect to specific symbols, however, a winning prize is also established in a case where they have been displayed on a winning line according to one or three video reels 3.

For example, in a case where the third symbols have been displayed to be arranged on a winning line according to all of the video reels 3, a winning combination is formed as a third winning combination and then "10" is determined as the number of payouts. A payout of coins is then performed based on the determined number of payouts. The payout of coins is performed by actually discharging coins from a coin payout exit 15A, adding to the number of credits, or issuing a barcode ticket.

The first symbol is a jackpot trigger. In a case where the first symbols have been displayed to be rearranged on a winning line according to all of the video reels 3, a winning combination is formed as a "jackpot" and then the amount of jackpot is determined as the number of payouts.

The second symbol is a bonus game trigger. In a case where the second symbols have been displayed to be rearranged on a winning line according to all of the video reels 3 or part of predetermined video reel, a winning combination is formed as a "bonus game" and then the corresponding bonus game is started from a next play.

[Contents of Program]

A description of the symbol combination table has now completed. Next, with reference to FIG. 8 to FIG. 34, the program to be executed by the gaming machine 1 is described.

<Main Control Processing>

Figure 8:
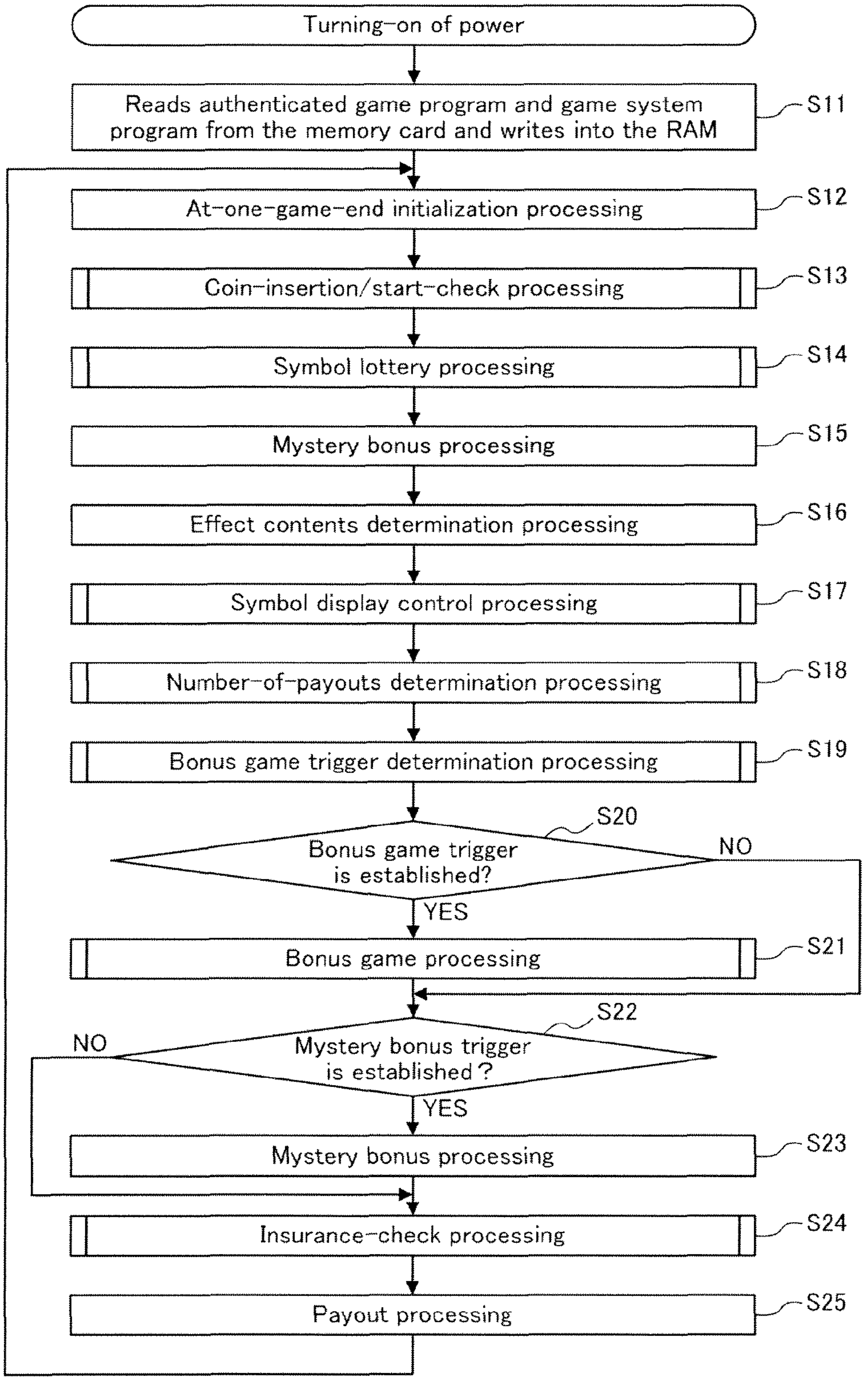
FIG. 8 is a view showing a flowchart of main control processing of the gaming machine according to the embodiment of the present invention.

First, with reference to FIG. 8, main control processing is described. First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

Next, the main CPU 71 performs symbol lottery processing to be described later with reference to FIG. 12 (step S14). In this processing operation, to-be-stopped symbols are determined based on random numeric values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper region, central region and lower region in the symbol display region 4.

Next, the main CPU 71 conducts number-of-payouts determination processing which is described later with reference to FIG. 14 (step S18). In the processing, the number of payouts is determined based on the combination of symbols displayed along one of the winning lines L, and is stored into a number-of-payouts counter provided in the RAM 73.

Next, in a case where the second symbols shown in FIG. 7 have been rearranged on a winning line from among the symbols that are displayed in a stopped state in the symbol display region 4, the main CPU 71 establishes a bonus game trigger and then executes bonus trigger determination processing for the sake of determining the contents of a bonus game (step S19). In this bonus trigger determination processing, the main CPU 71 executes a bonus game to be described later, or alternatively, determines whether to execute a three continuous WILD symbols game to be described later, by means of random number lottery. The determined contents are stored in the RAM 73.

Next, the main CPU 71 determines whether or not the bonus game trigger has been established (step S20). When the main CPU 71 determines that the bonus game trigger has been established, the main CPU 71 performs bonus game processing to be described later with reference to FIG. 16 (step S21).

When determining in step S20 that the bonus game trigger have not been rearranged or after executing the processing of step S21, the main CPU 71 determines whether or not the mystery bonus trigger is established (step S22). When determining that the mystery bonus trigger has been established, the main CPU 71 conducts the mystery bonus processing (step S23). In the processing, the number of payouts (e.g. 300) being set for the mystery bonus is stored into the number-of-payouts counter provided in the RAM 73.

After the processing of step S23 or when determining in step S21 that the mystery bonus trigger has not been established, the main CPU 71 conducts insurance-check processing which is described later with reference to FIG. 15 (step S24). In the processing, whether or not to conduct payout by the insurance is checked.

The main CPU 71 conducts payout processing (step S25). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

<Coin-Insertion/Start-Check Processing>

Figure 9:
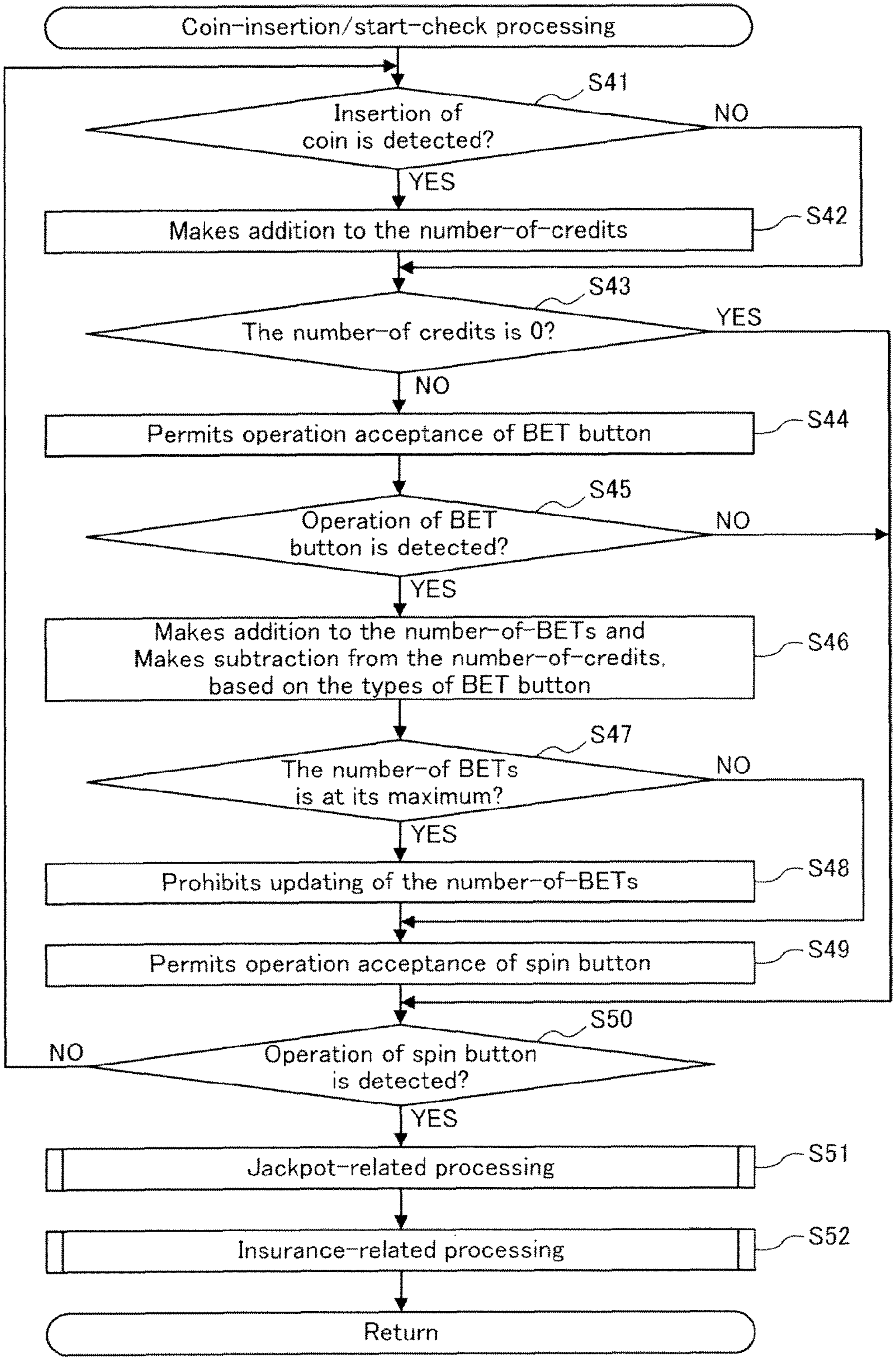
FIG. 9 is a view showing a flowchart of coin insertion/start check processing in the gaming machine according to the embodiment of the present invention.

Next, with reference to FIG. 9, coin-insertion/start-check processing is described.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 10 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-Related Processing>

Figure 10:
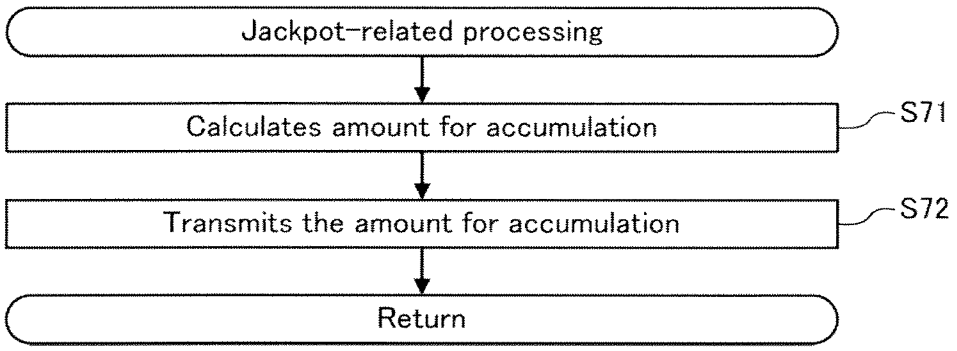
FIG. 10 is a view showing a flowchart of jackpot-related processing in the gaming machine according to the embodiment of the present invention.

Now, with reference to FIG. 10, the jackpot-related processing is described. First, the main CPU 71 calculates the amount for accumulation (step S71). The main CPU 71 obtains the product of the value of the number-of-BETS counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 11:
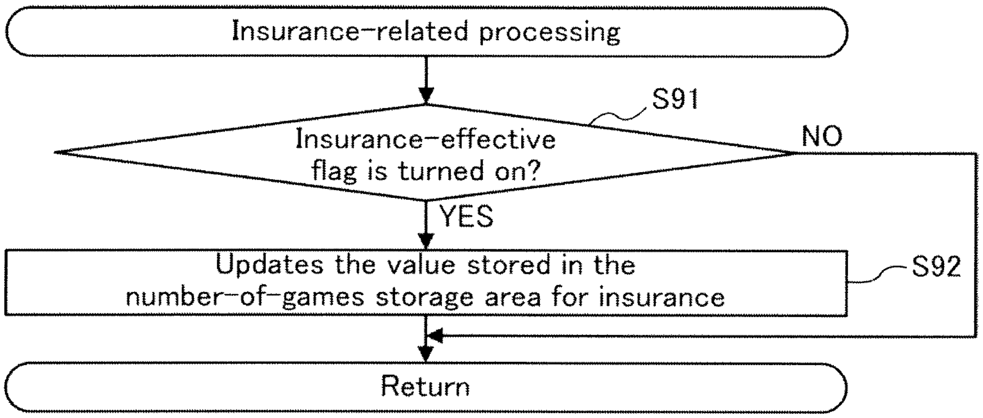
FIG. 11 is a view showing a flowchart of insurance-related processing in the gaming machine according to the embodiment of the present invention.

Next, with reference to FIG. 11, the insurance-related processing is described. First, the main CPU 71 determines whether or not an insurance-effective flag is turned on (step S91). The insurance-effective flag is turned on when a command to make the insurance effective is inputted by the player in the insurance selection processing which is described later with reference to FIG. 17.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
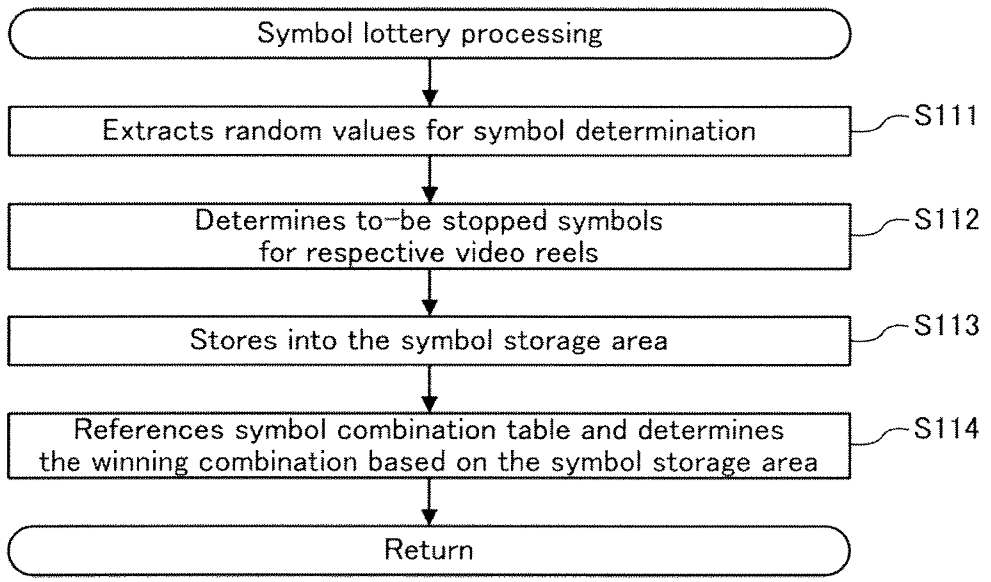
FIG. 12 is a view showing a flowchart of symbol lottery processing in the gaming machine according to the embodiment of the present invention.

Next, with reference to FIG. 12, the symbol lottery processing is described. First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

<Symbol Display Control Processing>

Figure 13:
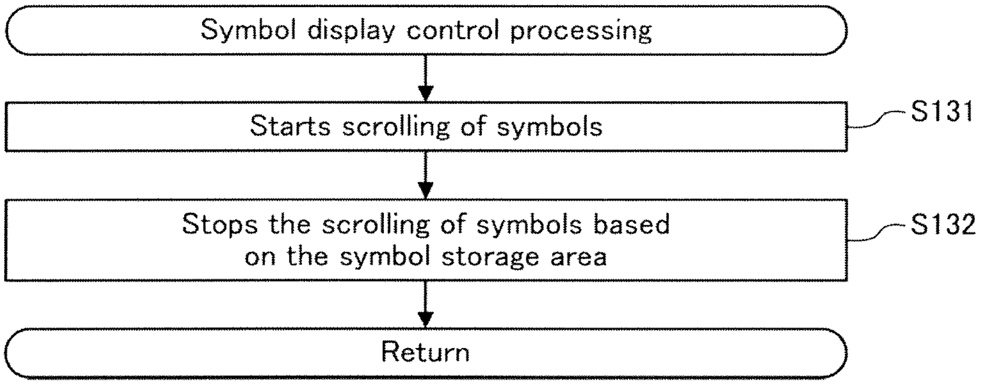
FIG. 13 is a view showing a flowchart of symbol display control processing in the gaming machine according to the embodiment of the present invention.

Next, with reference to FIG. 13, the symbol display control processing is described. First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 14:
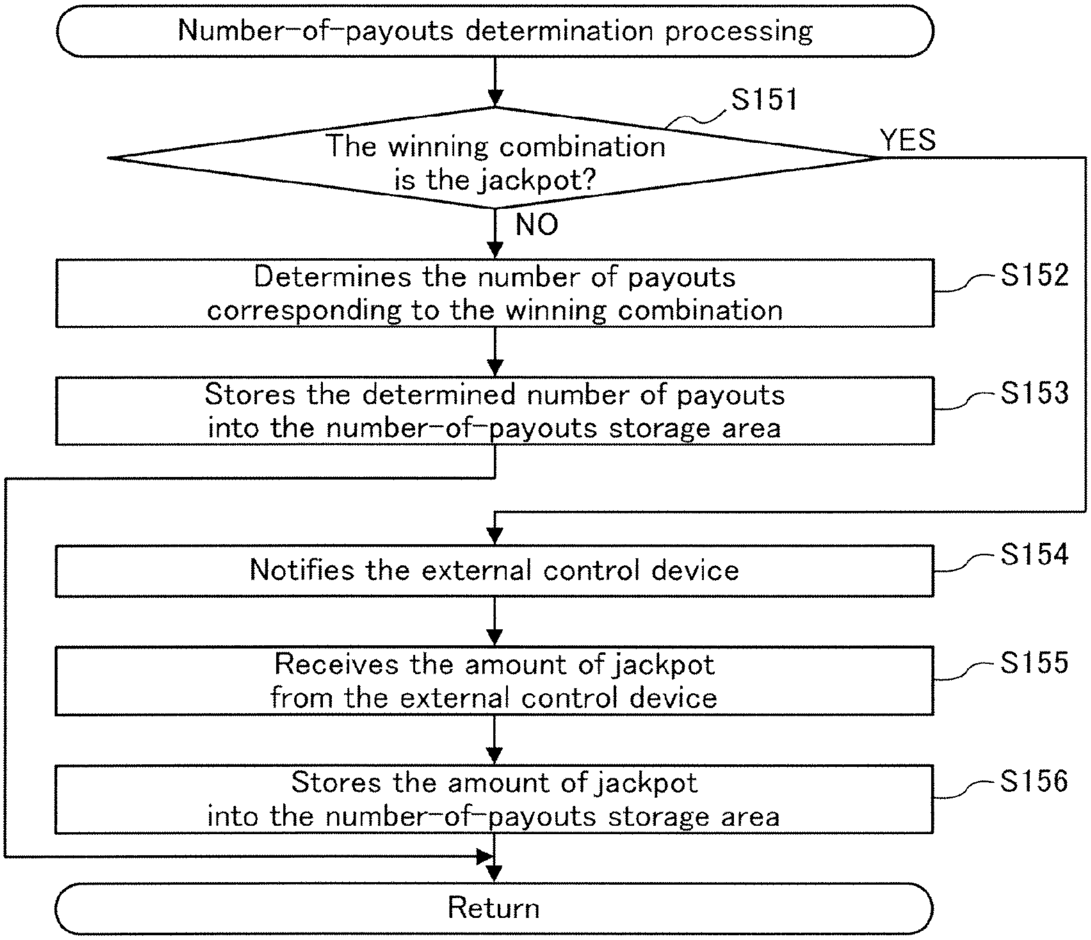
FIG. 14 is a view showing a flowchart of number-of-payouts determination processing in the gaming machine according to the embodiment of the present invention.

Next, with reference to FIG. 14, the number-of-payouts determination processing is described. The main CPU 71 first determines whether or not the winning combination is the jackpot (step S151). When the main CPU 71 determines that the winning combination is not the jackpot, the main CPU 71 determines the number of payouts corresponding to the winning combination (step S152). When a winning combination is a fourth winning combination, for example, a numeric value “8” is determined as the number of payouts (refer to FIG. 7). It is to be noted that the main CPU 71 determines “0” as the number of payouts in the case where the game is lost. Next, the main CPU 71 stores the determined number of payouts into the number-of-payouts counter (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

<Insurance-Check Processing>

Figure 15:
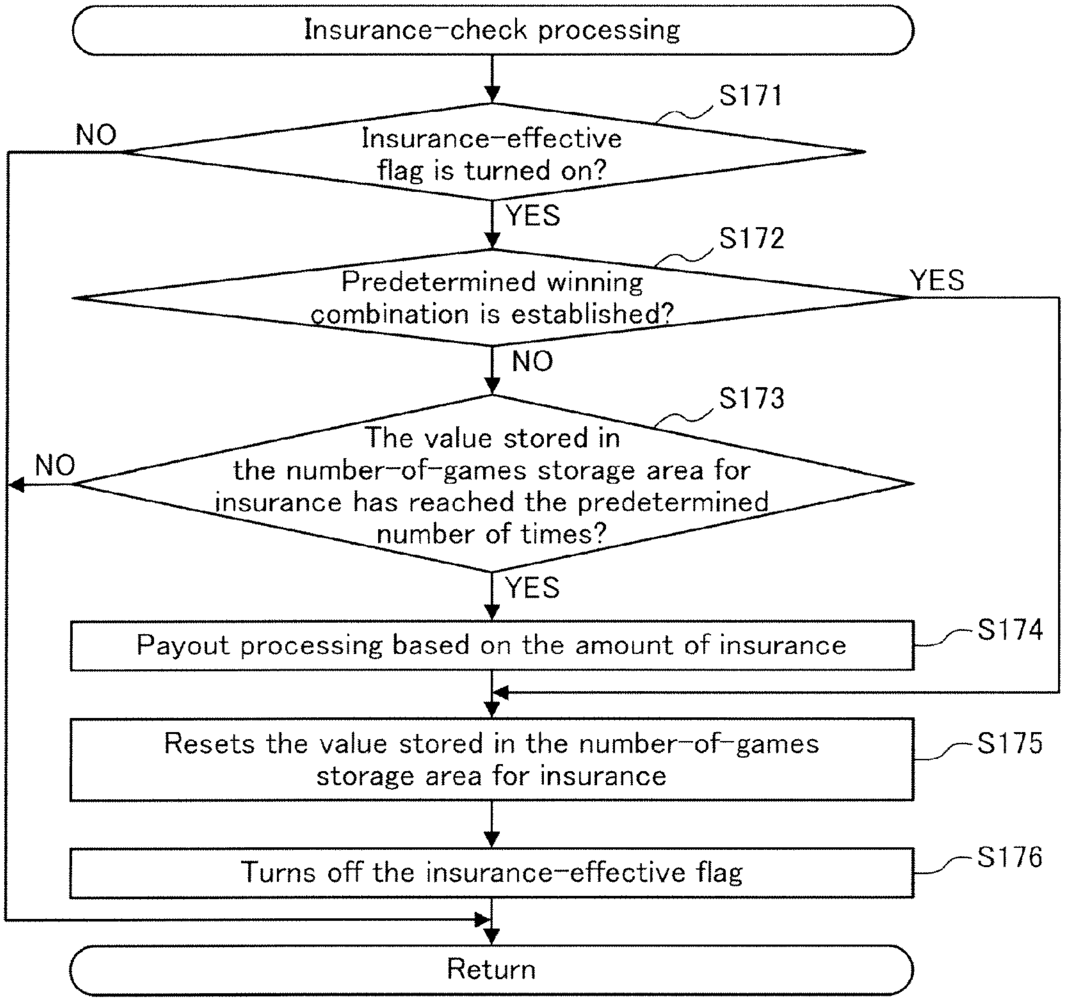
FIG. 15 is a view showing a flowchart of insurance check processing in the gaming machine according to the embodiment of the present invention.

Next, with reference to FIG. 15, the insurance-check processing is described. First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, “bonus game trigger”, “jackpot” and “mystery bonus” are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 71 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Insurance Selection Processing>

Figure 16:
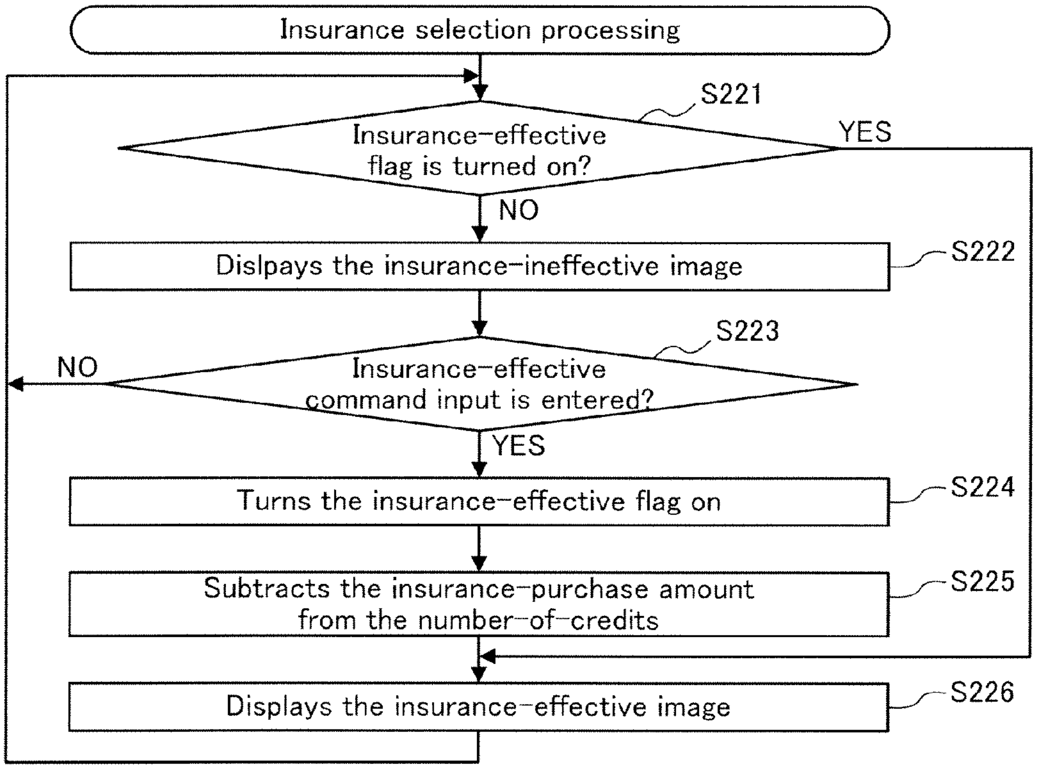
FIG. 16 is a view showing a flowchart of insurance selection processing in the gaming machine according to the embodiment of the present invention.

Next, with reference to FIG. 16, the insurance selection processing is described. First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing “INSURANCE BET $1.00 TOUCH TO BET” is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing “INSURANCE CONTINUED WIN 200 CREDIT” is displayed. This image is an image informing the player that the insurance is effective, and that the value of “200” is to be added to the number-of-credits counter when the insurance condition is satisfied. After the processing has been conducted, the processing is shifted to step S221.

<Bonus Game Processing>

Figure 17:
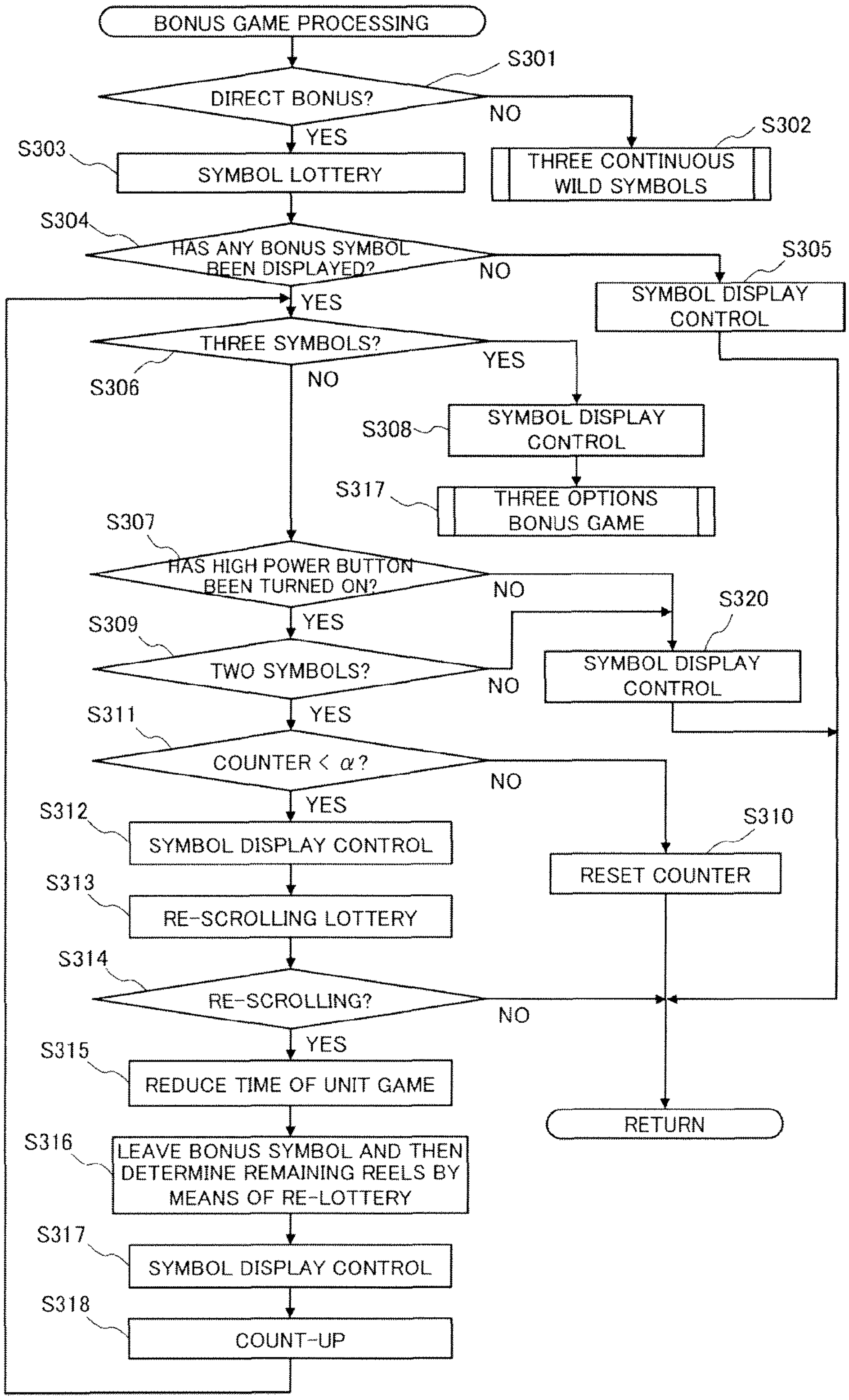
FIG. 17 is a view showing a flowchart of bonus game processing in the gaming machine according to the embodiment of the present invention.

Next, bonus game processing will be described with reference to FIG. 17. First, the main CPU 71 determines whether or not the routine is caused to directly migrate to a bonus game, based on the contents of migration to the bonus game that is determined in step S19 of FIG. 8 and then is stored in the RAM 73 (whether the routine is caused to directly migrate to a bonus game or to migrate to a three continuous WILD symbols game) (step S301).

In a case where a selection has been made to cause the routine to migrate to a three continuous WILD symbols game in step S19, the main CPU 71 causes the routine to migrate from step S301 to step S302 by obtaining a negative result in step S301 and then executes the three continuous WILD symbols game.

On the other hand, in a case where a selection has been made to cause the routine to directly migrate to the bonus game in step S19, the main CPU 71 causes the routine to migrate from step S301 to step S303 by obtaining an affirmative result in step S301 and then determines to-be-stopped symbols by means of random number lottery, based on random number values for symbol determination as to a total of fifteen symbols made of five columns×three symbols, which is displayed in a symbol display region 4. Specifically, the position of a video reel to be stopped at a center stage in the symbol display region 4 (an upper stage, a center stage, and a lower stage) are randomly selected on each of the video reels 3*a* to 3*e*. Symbol arrays made of a plurality of kinds of symbols are assigned to each of the video reels 3*a* to 3*e*, whereby determining a stop position of a video reel designates randomly selecting any of the symbols that configure the symbol array on this video reel. In symbol lottery processing, the selected symbols are determined so as to stop at the center stage. In addition, the symbols to be displayed in a stopped state at a top and a bottom of the center stage are determined based on arrangement of the symbol array on the video reel.

As described above with respect to FIG. 7, a plurality of symbols of a same kind may also be occasionally assigned as to the respective symbols that configure the symbol arrays on the respective video reels, and a probability that each of the symbols are selected is set for each of the symbols in accordance with the assigned number. For example, more symbols that are indicative of an eighth symbol (a pair of Japanese traditional wooden clogs called "Geta") than symbols indicative of a seventh symbol (a three-stringed Japanese traditional guitar called "Shamisen") are assigned to symbol arrays, whereby a probability that the symbols that are indicative of the eighth symbols (the pair of Japanese traditional wooden clogs called "Geta") is higher than a probability that the symbols indicative of the seventh symbols (the three-stringed Japanese traditional guitar called "Shamisen"). In this way, as to each of the video reels 3*a* to 3*e*, symbols displayed in a stopped state in the symbol display region 4 (the upper stage, the center stage, and the lower stage) are determined by means of lottery.

When the lottery processing in step S303 completes, the main CPU 71 determines whether or not a lottery result indicating that a bonus symbol is displayed in the symbol display region 4 has been obtained as a result of the lottery processing (step S304). In a case where the result indicating that such a bonus symbol is displayed in the symbol display region 4 has not been obtained, the main CPU 71 causes the routine to migrate from step S304 to step S305 by obtaining a negative result in step S304, scrolls all of the symbols in the symbol display region 4, and then, stops the symbols that are determined by means of lottery so as to be displayed in a stopped state in the symbol display region 4. In this processing operation, in a case where a winning combination (FIG. 7) is established in accordance with the symbols displayed in a stopped state, a prize according to the established winning combination is awarded to a winning player. In this manner, in a case where no bonus symbol is displayed in a stopped state in the symbol display region 4, bonus game processing completes.

On the other hand, in a case where a lottery result indicating that at least one bonus symbol is displayed anywhere in the symbol display region 4 in step S303, the main CPU 71 causes the routine to migrate from step S304 to step S306 by obtaining an affirmative result in step S304 and then determines whether or not three bonus symbols are rearranged from among the symbols displayed in a stopped state in the symbol display region 4, the symbols having been determined by means of lottery in the step S303 described above.

Figure 18:
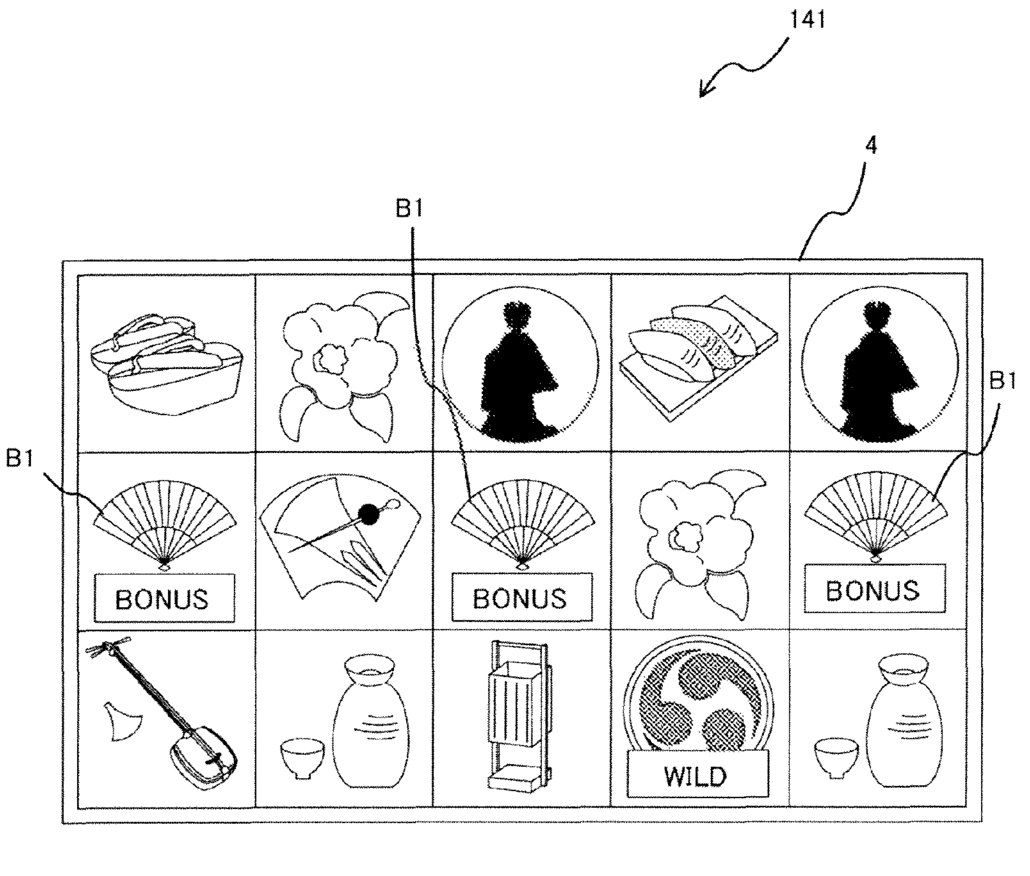
FIG. 18 is a view showing symbols that are displayed on a lower image display panel of the gaming machine according to the embodiment of the present invention.

In a case where a lottery result indicating that three bonus symbols are displayed has been obtained, the main CPU 71 causes the routine to migrate from step S306 to step S308 by obtaining an affirmative result in step S306, scrolls all of the symbols in the symbol display region 4, and then, stops the symbols that are determined by means of lottery so as to be displayed in a stopped state in the symbol display region 4. Specifically, as shown in FIG. 18, the symbols that are determined by lottery and include three bonus symbols B1 are displayed in a stopped state in the symbol display region 4. In this processing operation, in a case where a winning combination (FIG. 7) is established by means of the symbols displayed in a stopped state, a prize according to the established winning combination is awarded to a winning player. The main CPU 71 then causes the routine to migrate to a three options bonus game (step S317).

On the other hand, in a case where three bonus symbols determined by means of lottery in the step S303 described above are not displayed (that is, in a case where one or two bonus symbols are displayed), the main CPU 71 causes the routine to migrate from step S306 to step S307 by obtaining a negative result in step S306 and then determines whether or not a high power button 38 (FIG. 4) is operated to be turned on. In a case where the high power button 38 is operated to be turned on, the main CPU 71 causes the routine to migrate from step S307 to step S309 by obtaining an affirmative result in step S307 and then determines whether or not two bonus symbols determined by means of lottery in the step S303 described above are displayed.

Figure 19:
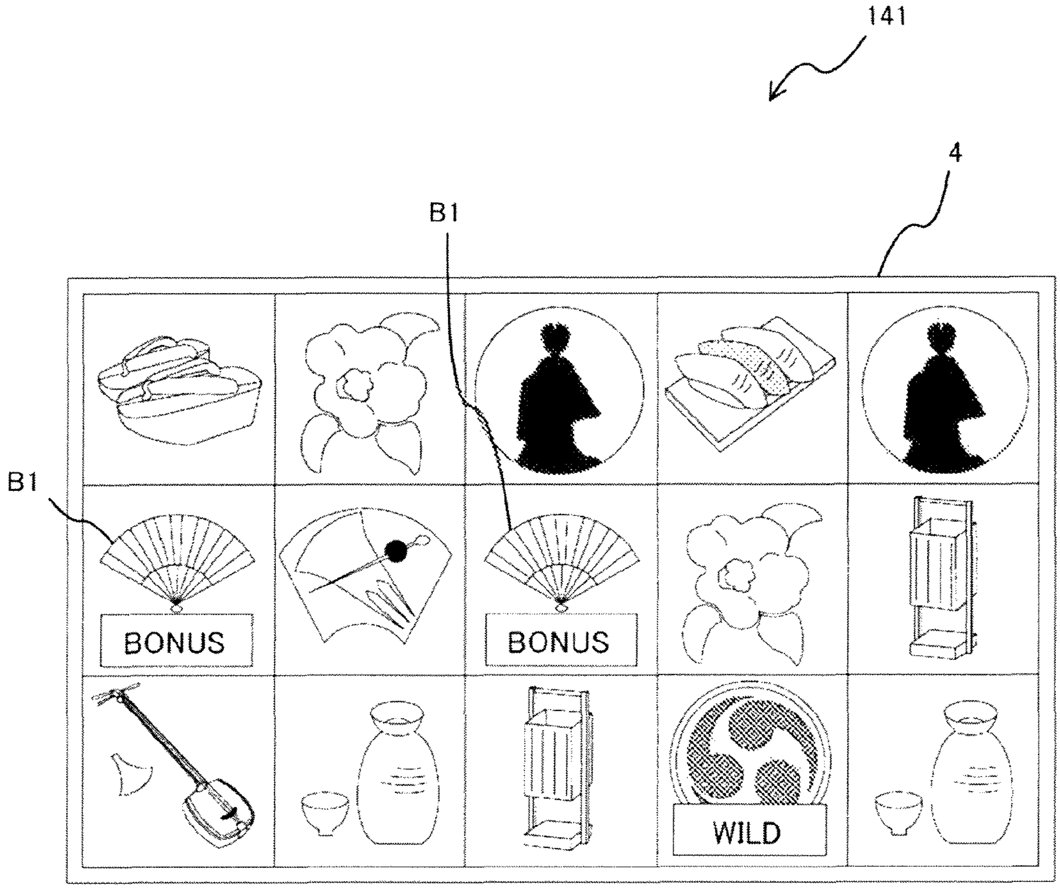
FIG. 19 is a view showing symbols that are displayed on the lower image display panel of the gaming machine according to the embodiment of the present invention.

In a case where two bonus symbols are displayed, the main CPU 71 causes the routine to migrate from step S309 to step S311 by obtaining an affirmative result in step S309 and then determines whether or not a counter value is smaller than a preset value α. In a case where the counter value does not reach the value α, the main CPU 71 causes the routine to migrate from step S311 to step S312 by obtaining an affirmative result in step S311, scrolls all of the symbols in the symbol display region 4, and then, stops the symbols that are determined by means of lottery so as to be displayed in a stopped state in the symbols display region 4. In this processing operation, in a case where a winning combination (FIG. 7) is established in accordance with the symbols displayed in a stopped state, a prize according to the established winning combination is awarded to a winning prize. In this manner, as shown in FIG. 19, two bonus symbols B1 are displayed in a stopped state in the symbol display region 4.

The main CPU 71 then performs lottery as to whether or not to execute re-scrolling (step S313). Re-scrolling to be described later is a processing operation to be executed by means of lottery in a case where two bonus symbols are included in the symbols displayed in a stopped state in the symbol display region 4, and the main CPU 71 executes lottery as to whether or not to perform re-scrolling in step S313.

The probability table that is employed in lottery processing of step S313 is provided in plurality, and among these tables, there is obtained a probability table in which a probability that re-scrolling is executed is set to be higher as more BETs are placed. That is, the main CPU 71 determines which probability table is to be employed, based on a value of a number-of-BETs counter that has been added in accordance with the number of BETs, in coin insertion/start check processing shown in FIG. 9.

The main CPU 71 determines a lottery result indicating whether or not to execute re-scrolling (step S314). If a lottery result indicating that no more re-scrolling is executed is obtained, the main CPU 71 completes the bonus game processing by obtaining a negative result in step S314.

On the other hand, if a lottery result indicating that re-scrolling is executed is obtained, the main CPU 71 causes the routine to migrate from step S314 to step S315 by obtaining an affirmative result in step S314, sets a unit game time so as to be reduced, and then in a reduced state, performs re-lottery for the symbols to be displayed in a stopped state in the symbol display region 4 as to video reels other than those including two bonus symbols having stopped in the symbol display region 4 (step S316). This re-lottery is performed without changing a probability table that is employed in symbol lottery. As the method of reducing a unit game time, a method or the like of reducing a scroll time of each video reel is employed.

In this way, symbol lottery is performed as to only video reels other than those on which at least one bonus symbol has stopped, whereby even if symbol lottery is performed without changing a probability table (without changing a lottery probability of each symbol), a probability that three bonus symbols are rearranged can be increased as to all of the video reels (as to all symbols on five reels). For example, in a state in which two bonus symbols stop in the symbol display region 4, symbol lottery is performed as to only the remaining video reels other than those on which at least one bonus symbol stops in the symbol display region 4, whereby if one bonus symbol is selected in the remaining video reel, a total of three bonus symbols are rearranged as to all of the video reels that are displayed in the symbol display region 4. Therefore, there can be increased a probability that three bonus symbols are rearranged as a result of lottery in the re-lottery (re-scroll) processing.

Thus, in a case where the high power button is further operated to be turned on in a state two bonus symbols are rearranged, there occurs a possibility that three bonus symbols are arranged at a high probability as a whole. As a method of increasing a probability that bonus symbols are rearranged at the time of re-scrolling, there may be employed a reel on which more bonus symbols have been assigned or there may be reduced the number of symbols other than bonus symbols in each reel.

In the embodiment, a player can be given a profit by means of a game having a probability that three bonus symbols are rearranged, and in the re-lottery (re-scroll) game, a unit game time is reduced and then the progress of the game is accelerated, whereby a profit of a gaming facility can be increased, and a balance between the profits of the player and the gaming facility can be maintained.

When re-lottery processing completes, the main CPU 71 scrolls video reels other than those on which at least one bonus symbol which should be displayed in a stopped state in the symbol display region 4 has already been displayed in a stopped state in the symbol display region 4 and then stops the symbols that are determined by means of lottery so as to be displayed in a stopped state in the symbol display region 4. In this processing operation, in a case where a winning combination (FIG. 7) is established in accordance with the symbols displayed in a stopped state, a prize according to the established winning combination is awarded to a winning player.

After counting up (step S318), the main CPU 71 then causes the routine o migrate to the step S306 described above and then determines whether or not three bonus symbols determined by means of lottery are displayed. That is, the CPU 71 determines whether or not a total of three symbols are displayed, the three symbols being made of at least one symbol determined by means of lottery in the step S316 described above and at least one bonus symbol, the display of which is maintained in the lottery performed previously.

In a case where a total number of three bonus symbols are not displayed (that is, in a case where two bonus symbols are displayed), the main CPU 71 sequentially executes the processing operations in step S307, step S309, and step S311. In a case where a counter value reaches a value α, the main CPU 71 resets the counter (step S310) by obtaining a negative result in step S311 and then completes the bonus game processing. In this manner, in a case where three bonus symbols have not appeared in a first re-scroll, re-scroll is executed by a preset number of times α.

In a case where three bonus symbols have been rearranged while re-scrolling is executed by a preset number of times α, the main CPU 71 sequentially executes the processing operation in step S308 by obtaining an affirmative result in step S306, whereby three bonus symbols and other symbols are displayed in the symbol display region 4. The main CPU 71 then executes a three options bonus game (step S312).

On the other hand, in a case where one of the bonus symbols that are determined by means of lottery in the step S303 described above is displayed, the main CPU 71 causes the routine to migrate from step S309 to step S320 by obtaining a negative result in step S309, scrolls all of the symbols in the symbol display region 4, and then, stops the symbols that are determined by means of lottery so as to be displayed in a stopped state in the symbol display region 4. In this processing operation, in a case where a winning combination (FIG. 7) is established in accordance with the symbols displayed in a stopped state, a prize according to the established winning combination is awarded to a winning player. The main CPU 71 then completes the bonus game processing.

In this way, in a case where one bonus symbol has appeared in a first scroll, a condition for re-scrolling other symbols while leaving bonus symbols as they are is not met, whereby bonus symbol processing is completed.

On the other hand, in a case where the high power button 38 has not been operated, the main CPU 71 causes the routine to migrate from step S307 to step S320 by obtaining a negative result in step S307, scrolls all of the symbols in the symbol display region 4, and then, stops the symbols that are determined by means of lottery so as to be displayed in a stopped state in the symbol display region 4. In this processing operation, in a case where a winning combination (FIG. 7) is established in accordance with the symbols displayed in a stopped state, a prize according to the in accordance with the established symbol winning combination is awarded to a winning player. The main CPU 71 then completes the bonus game processing.

In this way, in a case where the high power button 38 has not been operated, the main CPU 71 executes a bonus game as to whether or not three bonus symbols are rearranged only one time. In a case where two or less bonus symbols have appeared as a result of lottery, the main CPU 71 completes a bonus game without re-scrolling while leaving the bonus symbols having appeared.

As has been described above, in a case where two bonus symbols have been rearranged in bonus game processing, other symbols are determined and scrolled by means of re-lottery while the bonus symbols are left.

In addition, in a case where two bonus symbols have been rearranged in a state in which the high power button 38 is operated, a bonus game is repeated until three bonus symbols have been rearranged with a-times being its upper limit while a unit game time is reduced.

<Three Continuous WILD Symbols Bonus Game Processing>

Figure 20:
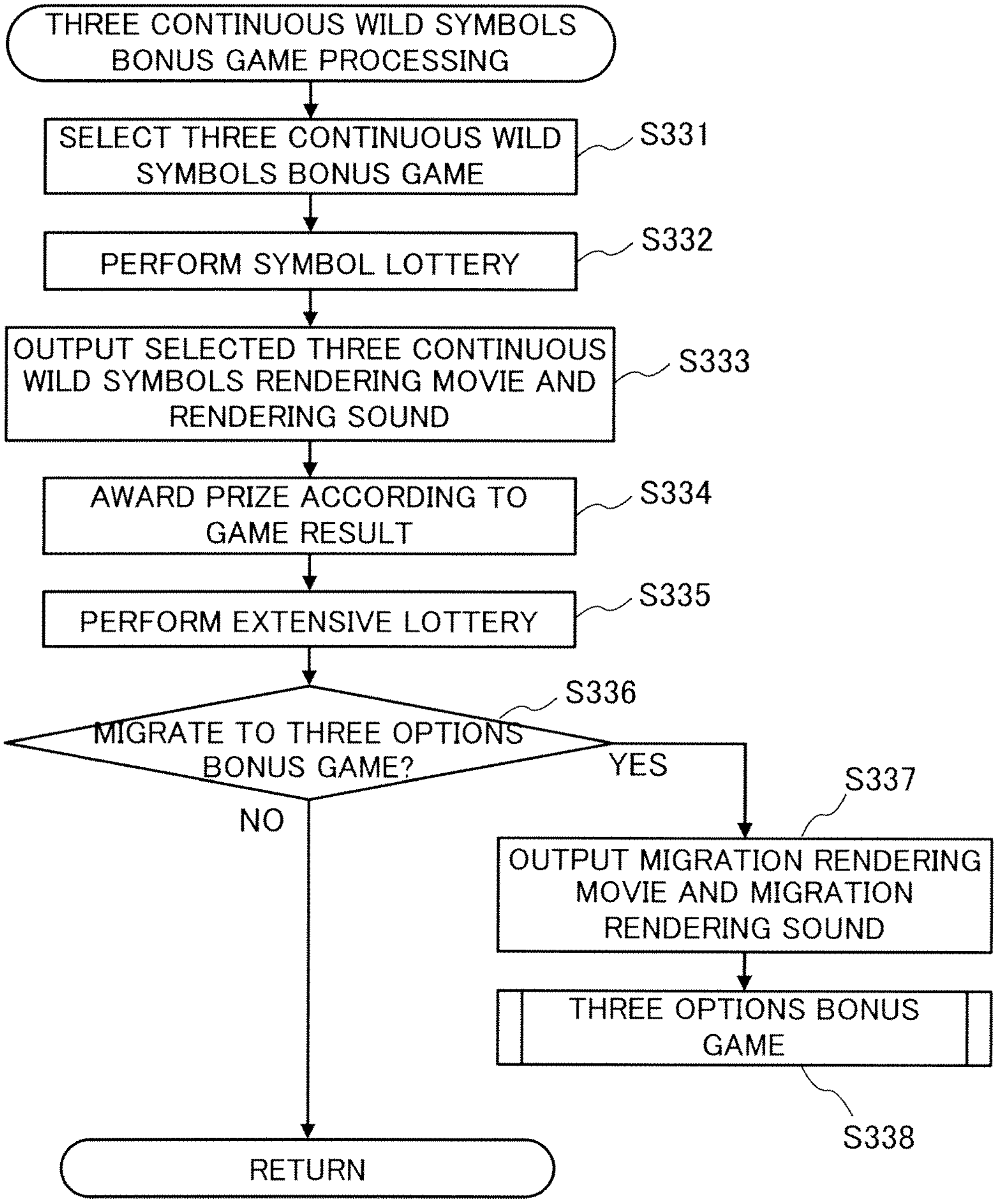
FIG. 20 is a view showing a flowchart of three continuous WILD symbols bonus game processing in the gaming machine according to the embodiment of the present invention.

Next, a three continuous WILD symbols bonus game will be described with reference to FIG. 20. In bonus game processing of FIG. 17, the main CPU 71 having caused the routine to migrate to step S302 enters a three continuous WILD symbols bonus game shown in FIG. 20 and then first selects the contents of the three continuous WILD symbols bonus game by means of random number lottery (step S331).

In the case of the embodiment, the RAM 73 stores in advance the contents of a plurality of three continuous WILD symbols bonus games provided in accordance with whether or not to display three continuous WILD symbols or different display video reels or the like in a case where these symbols are displayed. The main CPU 71 selects any of the plurality of three continuous WILD symbols bonus games provided, by means of random number lottery in the processing operation of step S331.

The main CPU 71 then determines the symbols that are displayed in the symbol display region 4, by means of random number lottery (step S332). Further, the main CPU 71 reads out from the RAM 73 three continuous WILD symbols movie data and rendering sound data that correspond to the contents selected in step S331 and then displays the three continuous WILD symbols movie on the lower image display panel 141 and outputs a rendering sound from a speaker 112 (step S333).

Figure 21:
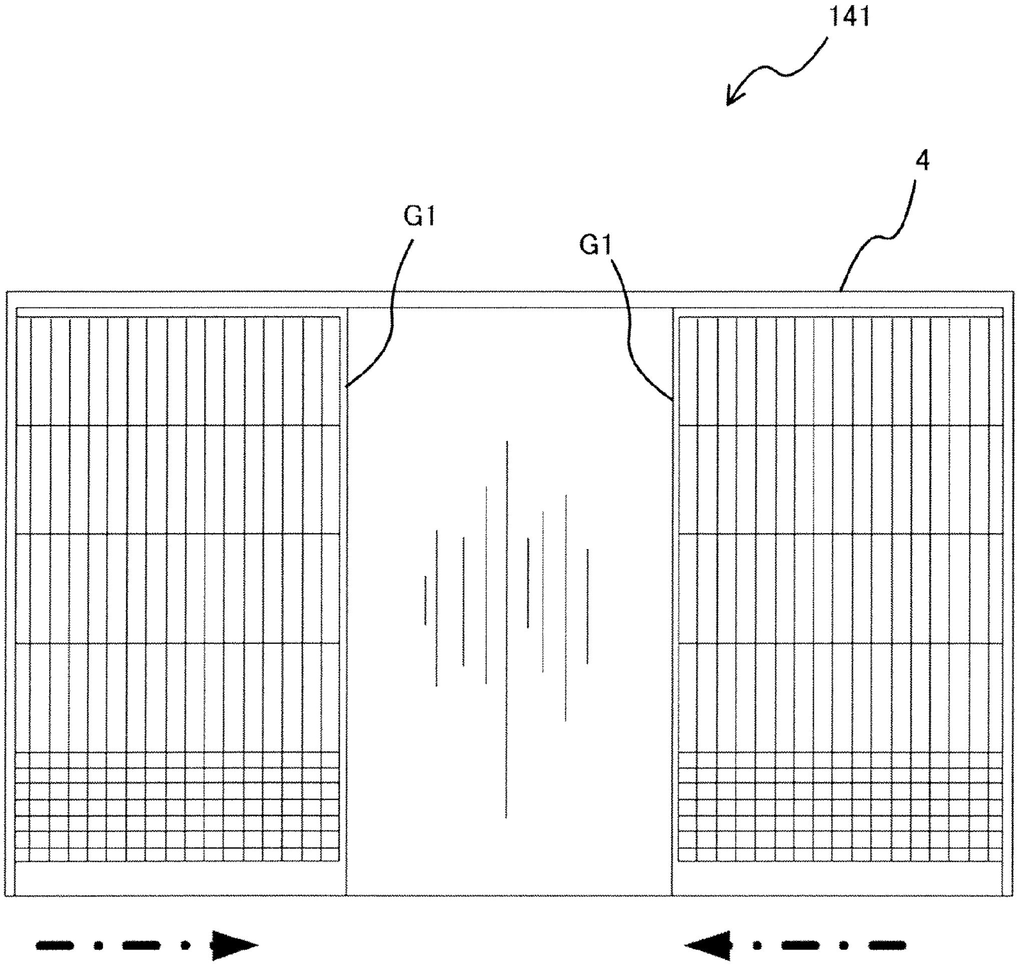
FIG. 21 is a view showing an example of a rendering image that is displayed on the lower image display panel of the gaming machine according to the embodiment of the present invention.

For example, as shown in FIG. 21, in a state in which the respective symbols are scrolled in the symbol display region 4 that is displayed on the lower image display panel 141, rendering is executed in the lower image display panel 141 as if this scroll screen were gradually covered with an image G1 indicating a Japanese paper sliding door and then all of the symbol display region 4 were covered therewith. As to this rendering, in a graphic board 130 (FIG. 6), two frames are provided; among the two frames, an image of symbols that are displayed in the symbol display region 4 is written in a first frame; and movie data on an image of a Japanese paper sliding door adapted to cover the symbol display region 4 therewith is written in a second frame.

By means of a command from the main CPU 71, the graphic board 130 displays an image of a region covered with a Japanese paper sliding door in one screen in accordance with the image data contained in the second frame, and then, displays an image of a region for displaying an appearance of scrolling symbols (the region that is not covered with the Japanese paper sliding door) in accordance with the image data contained in the first frame. In this manner, as shown in FIG. 21, image rendering is made as if the image G1 indicating the Japanese paper sliding door were gradually closed and then a state of symbols scrolling at the back side were covered therewith.

Figure 22:
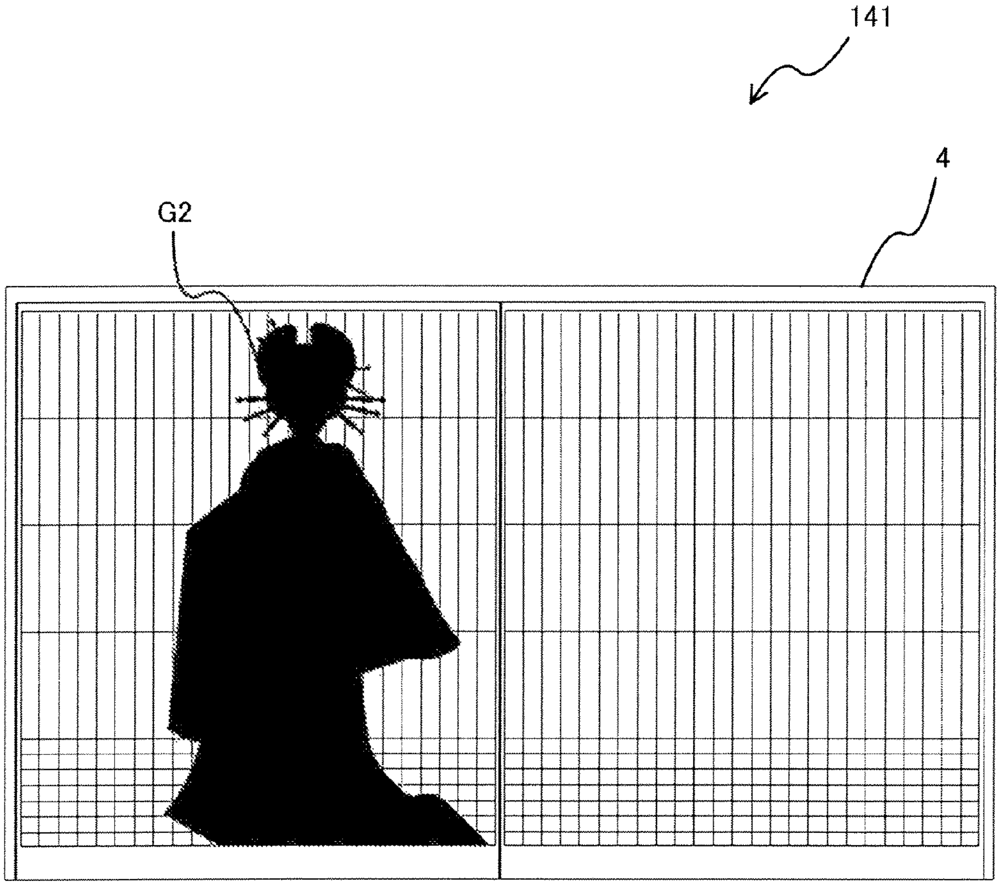
FIG. 22 is a view showing an example of a rendering image that is displayed on the lower image display panel of the gaming machine according to the embodiment of the present invention.

When all of the symbols in the symbol display region 4 have been covered with the Japanese paper sliding door, the main CPU 71 displays an image G2 indicating a shadow of a former Japanese courtesan called “Oiran” at a position corresponding to any video reel, as shown in FIG. 22. In this manner, a player is allowed to expect that three continuous WILD symbols may appear.

Figure 23:
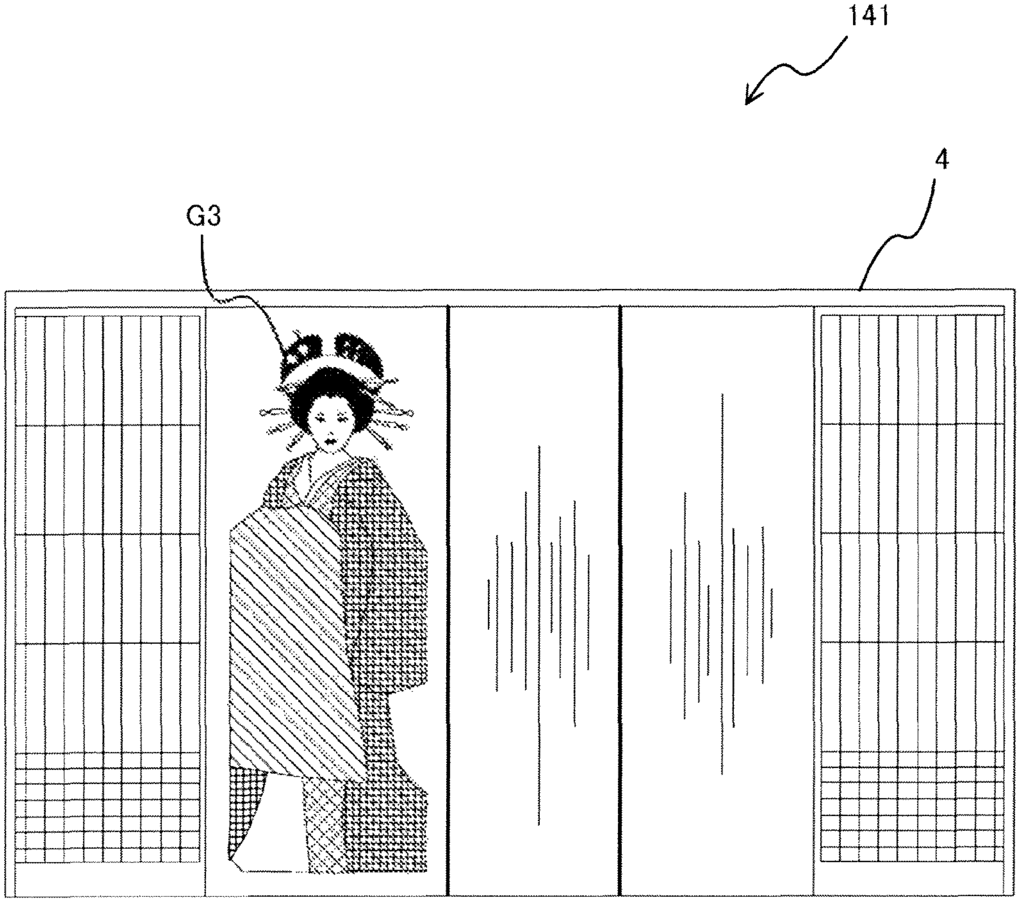
FIG. 23 is a view showing an example of a rendering image that is displayed on the lower image display panel of the gaming machine according to the embodiment of the present invention.

According to the selected content of rendering, after the shadow has been displayed, there may be a case in which a three continuous WILD symbols bonus game is completed without causing three continuous WILD symbols to appear. On the other hand, after the shadow has been displayed, in a case where the content of rendering indicating that three continuous WILD symbols appear has been selected, the main CPU 71 controls the graphic board 130, whereby as shown in FIG. 23, a Japanese paper sliding door that has been temporarily closed is opened and then an image G3 of a former Japanese courtesan called “Oiran” that is indicative of three continuous WILD symbols is displayed on a video reel on which the shadow has been displayed, from among the video reels scrolling at the back side. This image of the former Japanese courtesan called “Oiran” is displayed in place of three continuous symbols on the top and bottom displayed on one video reel. The image of the former Japanese courtesan called “Oiran” representing three continuous WILD symbols is a symbol to be employed in place of all symbols irrespective of the symbol lottery result in the step S332 described above. That is, in the display region for three symbols in which the image of the former Japanese courtesan called “Oiran” has been displayed, a winning combination (FIG. 7) is determined in place of all other symbols.

The main CPU 71 determines a winning combination including the image of the former Japanese courtesan called “Oiran” that is indicative of three continuous WILD symbols and then awards a prize according to a result of the determination to a winning player (step S334). The main CPU 71 then executes extensive lottery processing of determining whether or not the routine is caused to migrate to a three options bonus game by means of random number lottery (step S335). In a case where a result of the extensive lottery processing is a result indicating that the routine is caused to migrate to the three options bonus game, the main CPU 71 causes the routine to migrate from step S336 to step S337 by obtaining an affirmative result in step S336; reads out from the RAM 73 rendering movie data and rendering sound data for migration to the three options bonus game; and then displays the rendering movie on the lower image display panel 141 and outputs the rendering sound from the speaker 112. For example, the main CPU 71 execute a three options bonus game in which, after image rendering has been made as if the symbol display region 4 were covered with a Japanese paper sliding door, the Japanese paper sliding door opens again, an image of a former Japanese courtesan called “Oiran” is displayed in an enlarged manner and then three bonus symbols are displayed, a player executes a bonus game that is associated with one of the three bonus symbols that has been selected from a touch panel 114 that is operated by a player (step S338).

On the other hand, if a result indicating no migration to the three options bonus game is obtained as a lottery result in step S335, the main CPU 71 completes the three continuous WILD symbols bonus game by obtaining a negative result in step S336.

<Three Options Bonus Game Processing>

Figure 24:
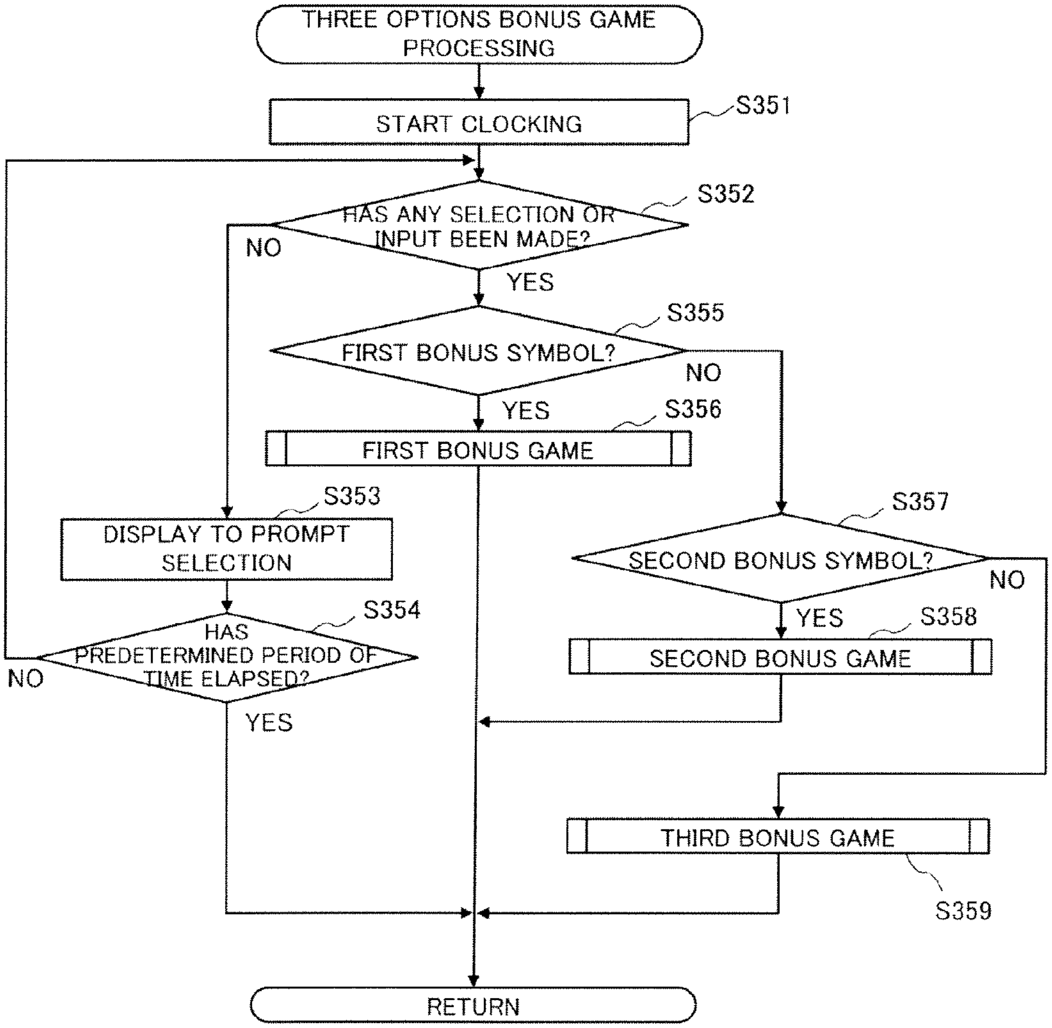
FIG. 24 is a view showing a flowchart of three options bonus game processing in the gaming machine according to the embodiment of the present invention.

Next, a three options bonus game will be described with reference to FIG. 24. The main CPU 71 having caused the routine to migrate to step S317 in the bonus game processing of FIG. 17 enters a three options bonus game shown in FIG. 24 and then first starts clocking by means of an internal counter (step S351).

The main CPU 71 then waits until any of the three bonus symbols that are displayed on the lower image display panel 141 has been selected by a player operating the touch panel 114 that is provided on the lower image display panel 141 (step S352). In a case where the player does not operate the touch panel 114, the main CPU 71 fails to input a signal that is output in accordance with an operation result from the touch panel 114, thereby obtaining a negative result in step S352. In this manner, the main CPU 71 causes the routine to migrate from step S352 to step S353 and then provides a display prompting an input operation (such as a character display) on the lower image display panel 141.

After a predetermined period of time has elapsed in this state, the main CPU 71 completes the three options bonus game by obtaining an affirmative result in step S354. On the other hand, in a case where the predetermined period of time has not elapsed, the main CPU 71 causes the routine to migrate to the step S352 described above by obtaining a negative result in step S354 and then waits for a player to make a selection or an input.

On the other hand, when the player operates the touch panel 114 to select and operate any of the three bonus symbols, the main CPU 71 determines the selected bonus symbol, based on a signal that is output in accordance with a selection result from the touch panel 114 (step S355). In a case where the selected bonus symbol is a first bonus symbol, the main CPU 71 causes the routine to migrate from step S355 to step S356 by obtaining an affirmative result in step S355 and then executes a first bonus game (a Koharu bonus game). In this case, the main CPU 71 changes the first bonus symbol that is displayed on the lower image display panel 141 (the bonus symbol that is selected by the player) to a character (Koharu) that is indicative of the first bonus game and then displays the changed character, thereby suggesting that the routine migrates to the first bonus game.

On the other hand, in a case where the bonus symbol selected by the player is not the first bonus symbol, the main CPU 71 causes the routine to migrate from step S355 to step S357 by obtaining a negative result in step S355 and then determines whether or not the selected bonus symbol is a second bonus symbol.

In a case where the selected bonus signal is the second bonus symbol, the main CPU 71 causes the routine to migrate from step S357 to step S358 by obtaining an affirmative result in step S357 and then executes a second bonus game (a Konatsu bonus game). In this case, the main CPU 71 changes the second bonus symbol that is displayed on the lower image display panel 141 (the bonus symbol that is selected by the player) to a character (Konatsu) that is indicative of the second bonus game and then displays the changed character, thereby suggesting that the routine migrates to the second bonus game.

On the other hand, in a case where the bonus symbol selected by the player is not the second bonus symbol, the fact designates that the bonus symbol selected by the player has been a third bonus symbol. The main CPU 71 causes the routine to migrate from step S357 to step S359 by obtaining a negative result in step S357 and then executes the third bonus game (a Koyuki bonus game). In this case, the main CPU 71 changes the third bonus symbol that is displayed on the lower image display panel 141 (the bonus symbol that is selected by the player) to a character (Koyuki) representing the third bonus game and then displays the changed character, thereby suggesting that the routine migrates to the third bonus game.

In this way, the player operates any of three bonus symbols from among the symbols having stopped after scrolled in the symbol display region 4 of the lower image display panel 141, whereby a bonus game (the first, second, or third bonus game) according to the operated bonus symbol is selected and executed.

<First Bonus Game (Koharu Bonus Game) Processing>

Next, a first bonus game (a Koharu bonus game) will be described with reference to FIG. 25. The main CPU 71 having caused the routine to migrate to the first bonus game (the Koharu bonus game) of step S356 in the three options bonus game processing of FIG. 24 enters the first bonus game (the Koharu bonus game) shown in FIG. 25 and then first starts clocking by means of an internal counter (step S371).

Figure 26:
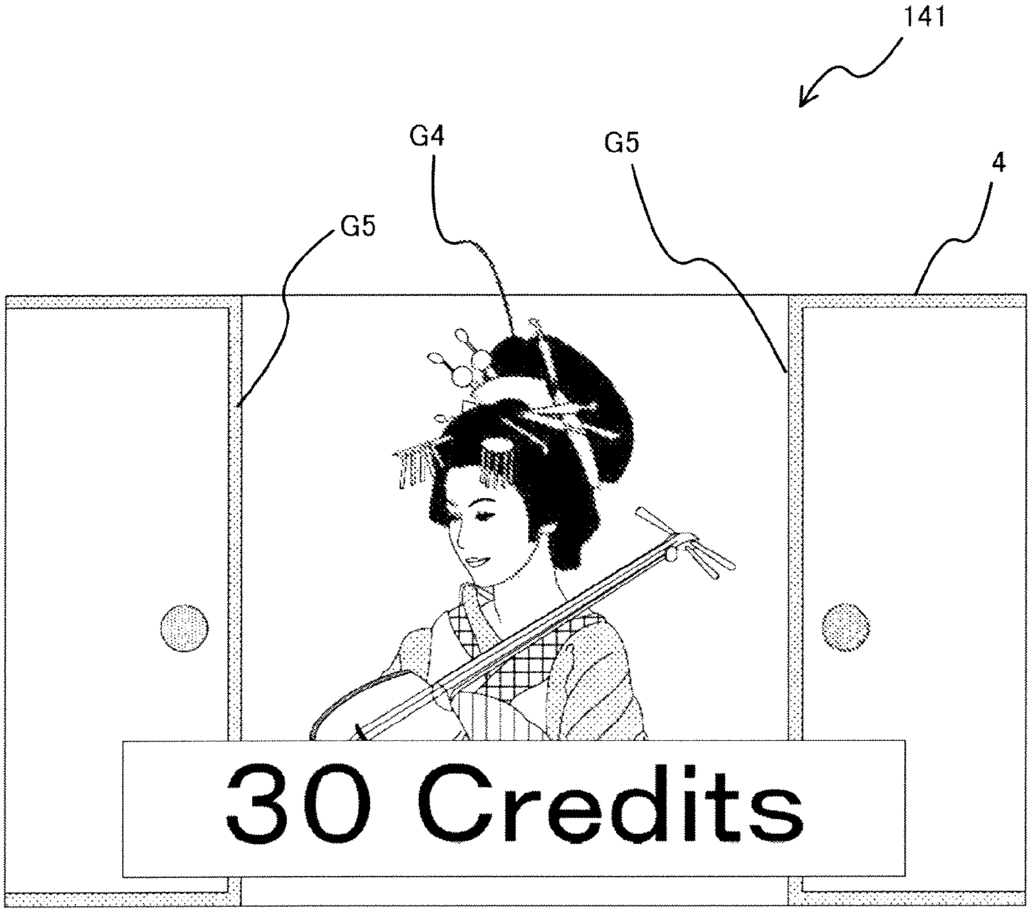
FIG. 26 is a view showing an example of a rendering image that is displayed on the lower image display panel of the gaming machine according to the embodiment of the present invention.

The main CPU 71 then reads out from the RAM 73 the performance movie data and the performance sound data according to the elapse of time and then displays the performance movie on the lower image display panel 141 and outputs the performance sound from the speaker 112 (step S372). The performance movie used herein is, as shown in FIG. 26, a movie on which an image G4 is displayed indicating that Koharu who is a character of the first bonus game performs a three-stringed Japanese traditional guitar called "Shamisen", and a plurality of patterns are provided in advance in accordance with the elapse of time. For example, in a case where the elapse of time is from 0 to a first elapse of time, items of data relating to a performance movie of a comparatively slow tempo and a performance sound are stored in the RAM 73 as a performance movie according to the first elapse of time.

Figure 27:
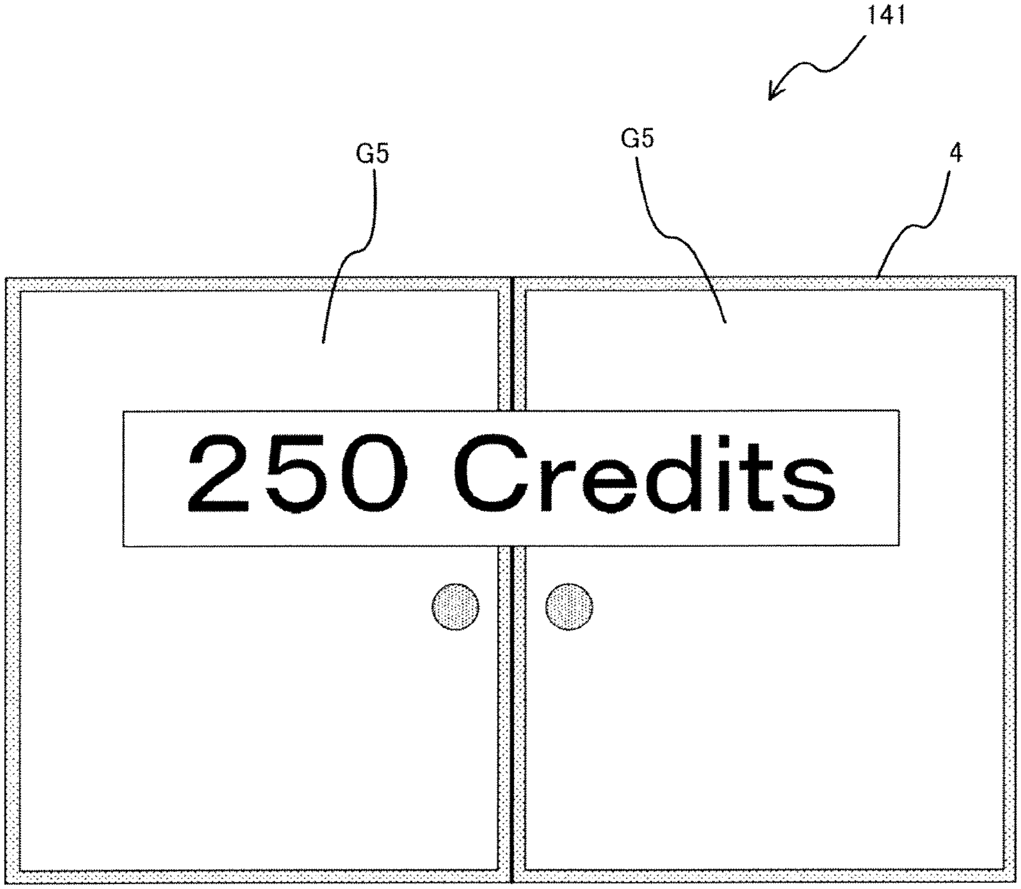
FIG. 27 is a view showing an example of a rendering image that is displayed on the lower image display panel of the gaming machine according to the embodiment of the present invention.

On the other hand, for example, in a case where the elapse of time is from 0 to a second elapse of time after the first elapse of time, items of a performance movie and a performance sound of a relatively faster tempo than those according to the first elapse of time are stored in advance in association with the above case. In addition, in the performance movie, as shown in FIG. 26, an image G5 is displayed indicating that a Japanese sliding screen is closed in accordance with the elapse of time, and if a long period of time has elapsed, image data is stored in advance, the image data indicating an appearance that the Japanese sliding screen is completely closed, as shown in FIG. 27. In this way, the items of data relating to the performance movie and the performance sound, the tempo of which becomes sequentially faster in accordance with the elapse of time, are stored in advance, and the main CPU 71 reads out from the RAM 73 the items of data relating to the performance movie and the performance sound according to the elapse of time and then outputs the read out data from the lower image display panel 141 and the speaker 112.

When the main CPU 71 outputs the performance movie and the performance sound according to the elapse of time, the main CPU 71 determines that a predetermined period of time has elapsed (step S373). In a case where the main CPU 71 determines that the predetermined period of time has not elapsed, the main CPU 71 causes the routine to migrate to the step S372 described above by obtaining a negative result in step S373 and then maintains output of the performance movie and the performance sound according to the elapse of time.

On the other hand, in a case where the main CPU 71 determines that the predetermined period of time has elapsed, the main CPU 71 causes the routine to migrate from step S373 to step S374 by obtaining an affirmative result in step S373 and then increases the number of payouts to be paid out to a player. The increased number of payouts is stored in the RAM 73.

In addition, the main CPU 71 displays the increased number of payouts on the lower image display panel 141, for example (step S375). This display includes a variety of rendering images suggesting the increased number in addition to numerically displaying the number of payouts, as shown in FIG. 26.

The main CPU 71 then determines whether or not to complete the first bonus game (the Koharu bonus game) by means of random number lottery (step S376). If a lottery result indicating that the first bonus game (the Koharu bonus game) is not completed is obtained, the main CPU 71 causes the routine to migrate from step S377 to step S374 by obtaining a negative result in step S377 and then increases the number of payouts in accordance with the elapse of time.

On the other hand, if a lottery result indicating that the first bonus game (the Koharu bonus game) is completed is obtained, the main CPU 71 causes the routine to migrate from step S377 to step S378 by obtaining an affirmative result in step S377 and then executes extensive lottery processing of determining whether or not the routine is caused to migrate to a third bonus game (a Koyuki bonus game) by means of random number lottery (step S378).

In a case where a result of the extensive lottery processing is a result indicating that the routine migrates to the third bonus game (the Koyuki bonus game), the main CPU 71 causes the routine to migrate from step S379 to step S380 by obtaining an affirmative result in step S379; reads out from the RAM 73 rendering movie data and rendering sound data for the routine to migrate to the third bonus game (the Koyuki bonus game); and then displays the rendering movie on the lower image display panel 141 and outputs the rendering sound from the speaker 112. For example, on the lower image display panel 141, as shown in FIG. 27, the rendering movie is displayed in such a manner that an image is displayed indicating that the Japanese paper sliding door is completely closed, and thereafter, an image is displayed indicating that the Japanese paper sliding door is opened again. After that, the main CPU 71 executes the third bonus game (the Koyuki bonus game) in order for the routine to extensively migrate to another bonus game (step S381).

On the other hand, a result indicating that the routine does not migrate to the third bonus game (the Koyuki bonus game) is obtained as a lottery result in step S378, the main CPU 71 completes the Koyuki bonus game by obtaining a negative result in step S379.

Figure 25:
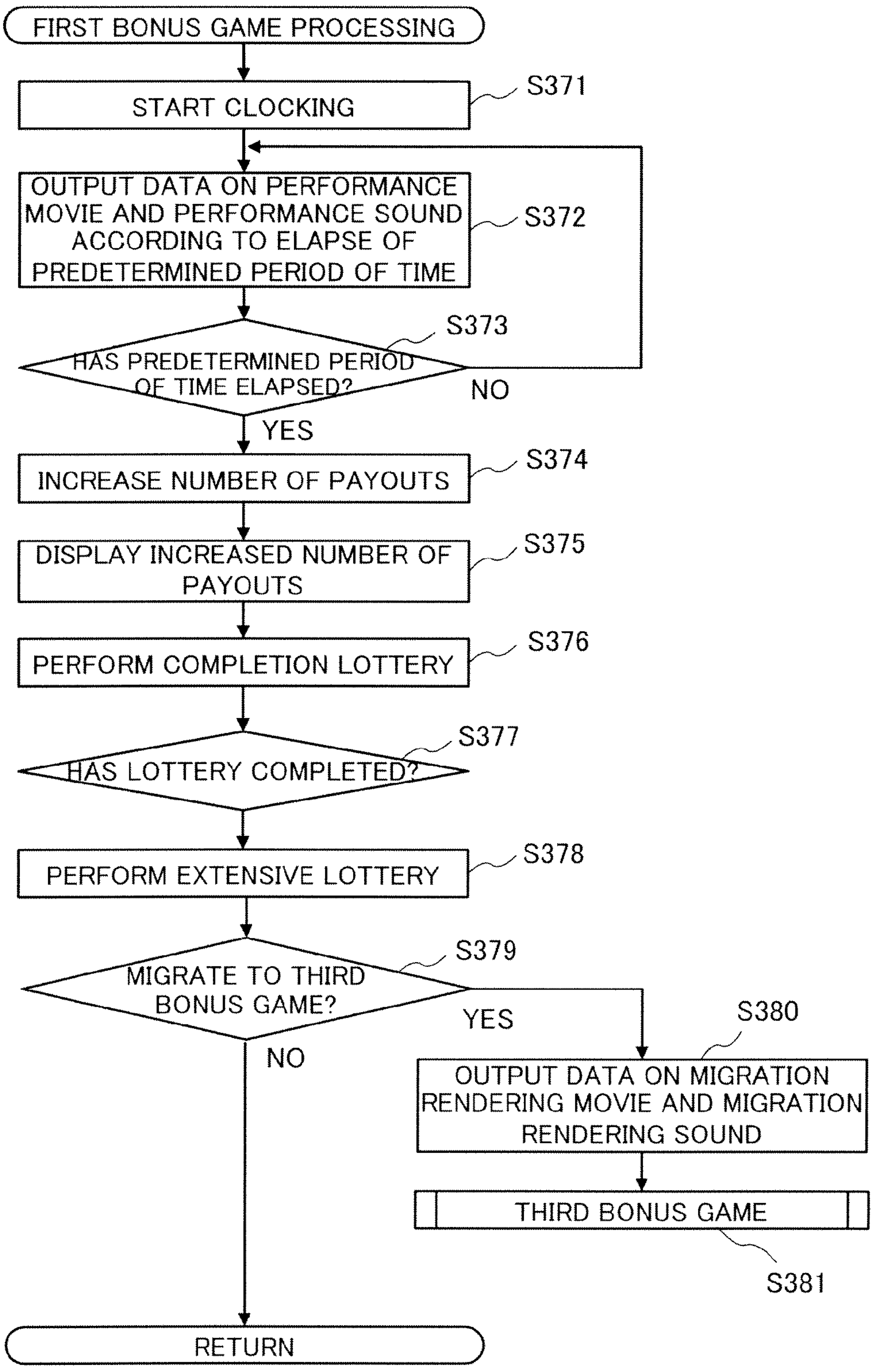
FIG. 25 is a view showing a flowchart of first bonus game processing in the gaming machine according to the embodiment of the present invention.
Figure 28:
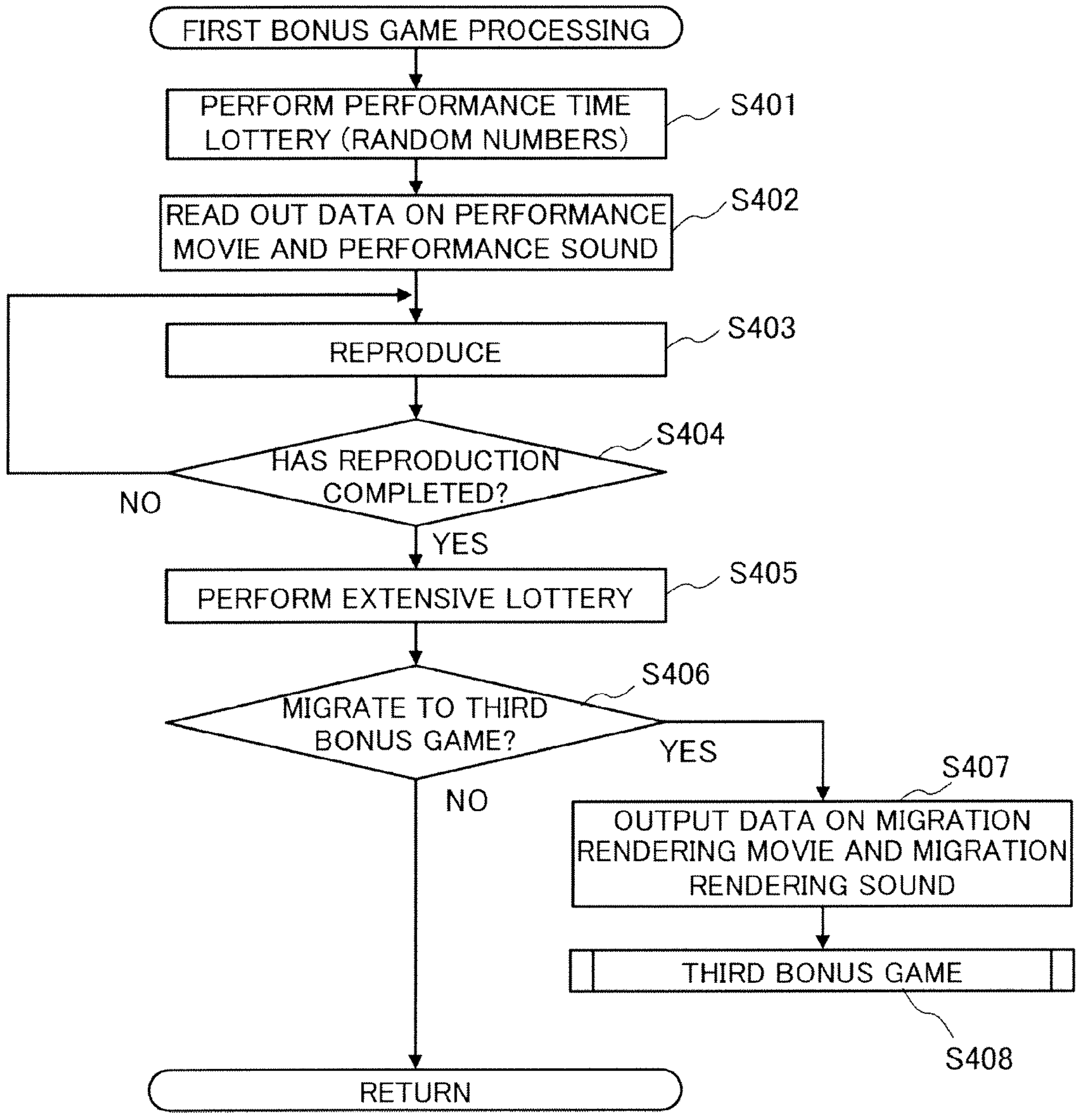
FIG. 28 is a view showing a flowchart of first bonus game processing in a gaming machine according to another embodiment of the present invention.

As to processing of the first bonus game (the Koharu bonus game), for example, an operating procedure shown in FIG. 28 may also be employed in addition to the operating procedure shown in FIG. 25. That is, while, in the operating procedure shown in FIG. 25, it was determined whether or not to complete the first bonus game (the Koharu bonus game) in accordance with the elapse of time, a game time is predetermined by means of lottery at the time of starting the first bonus game (the Koharu bonus game) in the operating procedure shown in FIG. 28.

As shown in FIG. 28, when the routine enters the first bonus game (the Koharu bonus game), the main CPU 71 determines a playing time (a performance time) of the first bonus game (the Koharu bonus game) by means of random number lottery (step S401). After that, the main CPU 71 reads out items of data relating to a plurality of kinds of performance movies and performance sounds that are stored in advance in the RAM 73 in association with the determined performance time in step S401 (step S402) and then outputs (reproduces) the read out data from the lower image display panel 141 and the speaker 112 (step S403). In this way, by outputting the performance movie and the performance sound that are provided according to the performance time, a player is allowed to recognize the playing time of the first bonus game (the Koharu bonus game) from his or her experience by means of the output performance movie and performance sound.

The main CPU 71 determines whether or not reproduction of the selected performance movie and performance sound has completed (step S404). In a case where the reproduction has not completed, the main CPU 71 causes the routine to migrate from step S404 to step S403 and then continues the reproduction. On the other hand, in a case where the reproduction has completed, the main CPU 71 causes the routine from step S404 to step S405 by obtaining an affirmative result in step S404 and then executes extensive lottery processing of determining whether or not the routine is caused to migrate to the third bonus game (the Koyuki bonus game) by means of random number lottery (step S406).

In a case where a result of the extensive lottery processing is a result indicating that the routine migrates to the third bonus game (the Koyuki bonus game), the main CPU 71 causes the routine to migrate from step S406 to step S407 by obtaining an affirmative result in step S406; reads out from the RAM 73 rendering movie data and rendering sound data for the routine to migrate to the third bonus game (the Koyuki bonus game); and then, displays the rendering movie on the lower image display panel 141 and outputs the rendering sound from the speaker 112. For example, in the lower image display panel 141, as shown in FIG. 27, the rendering movie is displayed in such a manner that an image is displayed indicating that a Japanese paper sliding is completely closed, and thereafter, an image is displayed indicating that the Japanese paper sliding door is opened again. After that, the main CPU 71 executes the third bonus game (the Koyuki bonus game) in order for the routine to extensively migrate to another bonus game (step S408).

On the other hand, if a result indicating that the routine does not migrate to the third bonus game (the Koyuki bonus game) is obtained as a lottery result in step S406, the main CPU 71 completes the Koyuki bonus game by obtaining a negative result in step S406. As shown in FIG. 28, when the first bonus game (the Koharu bonus game) is executed, the playing time (performance time) of the first bonus game (the Koharu bonus game) may be predetermined so as to output (reproduce) the performance movie and the performance sound according to the predetermined playing time.

<Second Bonus Game (Konatsu Bonus Game) Processing>

Figure 29:
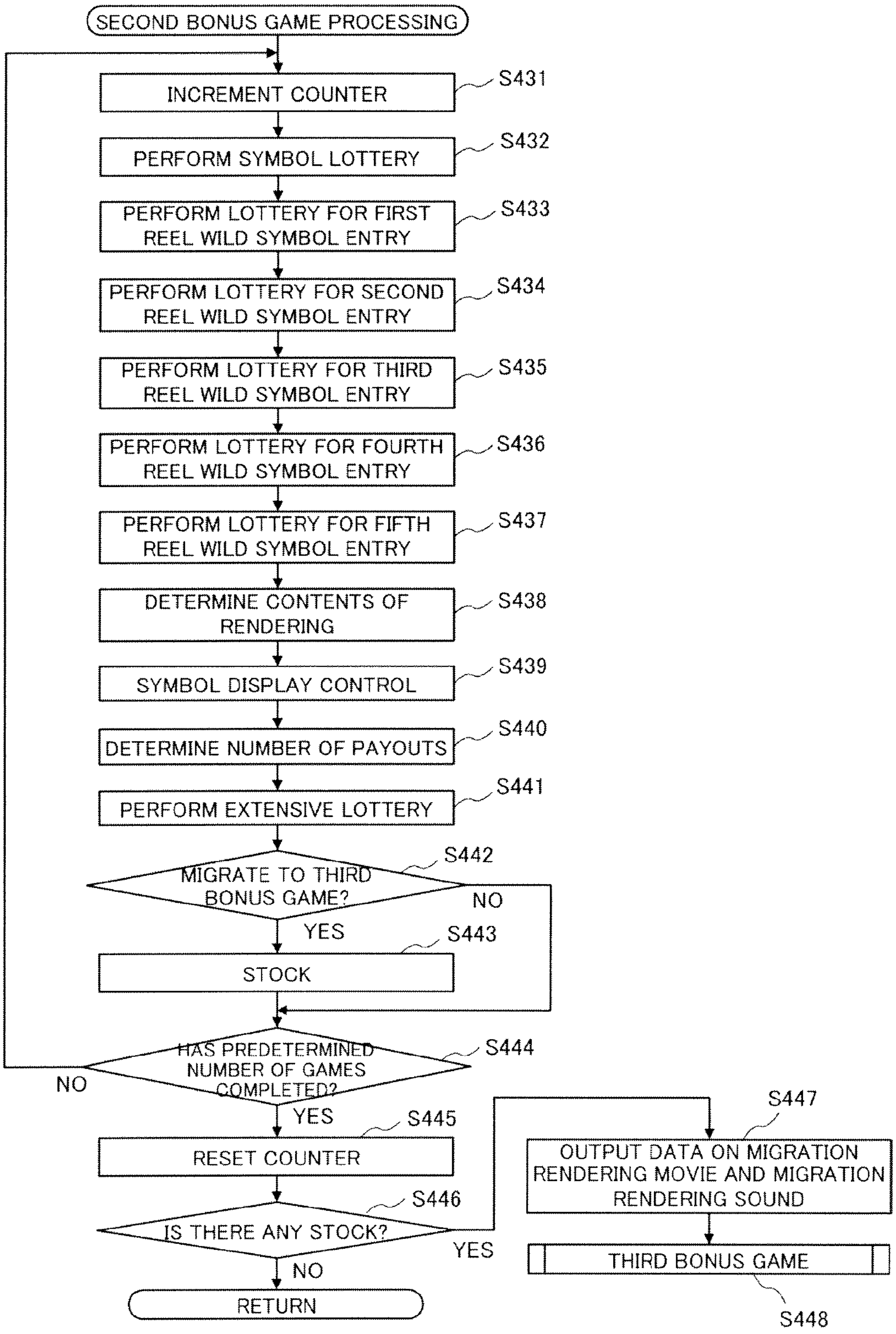
FIG. 29 is a view showing a flowchart of second bonus game processing in a view showing an example of a rendering image that is displayed on the lower image display panel of the gaming machine according to the embodiment of the present invention.

Next, a second bonus game (a Konatsu bonus game) will be described with reference to FIG. 29. The CPU 71 having caused the routine to migrate to the second bonus game (the Konatsu bonus game) of step S358 in three options bonus game processing of FIG. 23 enters the second bonus game (the Konatsu bonus game) shown in FIG. 29 and then first increments a counter (step S431).

The main CPU 71 then determines the symbols to be displayed in a stopped state in fifteen symbol display regions 4 made of five columns×three symbols, by means of random number lottery (step S432). When symbol lottery processing completes, the main CPU 71 determines the number of WILD symbols (one or two symbols) to be entered into a first video reel 3*a* (FIG. 4), by means of random number lottery (step S433). In addition, the main CPU 71 determines the number of WILD symbols (one or two symbols) to be entered into a second video reel 3*b* (FIG. 4), by means of random number lottery (step S434). Further, the main CPU 71 determines the number of WILD symbols (one or two symbols) to be entered into a third video reel 3*c* (FIG. 4), by means of random number lottery (step S435). Furthermore, the main CPU 71 determines the number of WILD symbols (one or two symbols) to be entered into a fourth video reel 3*d* (FIG. 4), by means of random number lottery (step S436). Still furthermore, the main CPU 71 determines the number of WILD symbols (one or two symbols) to be entered into a fifth video reel 3*e* (FIG. 4), by means of random number lottery (step S437).

Figure 30:
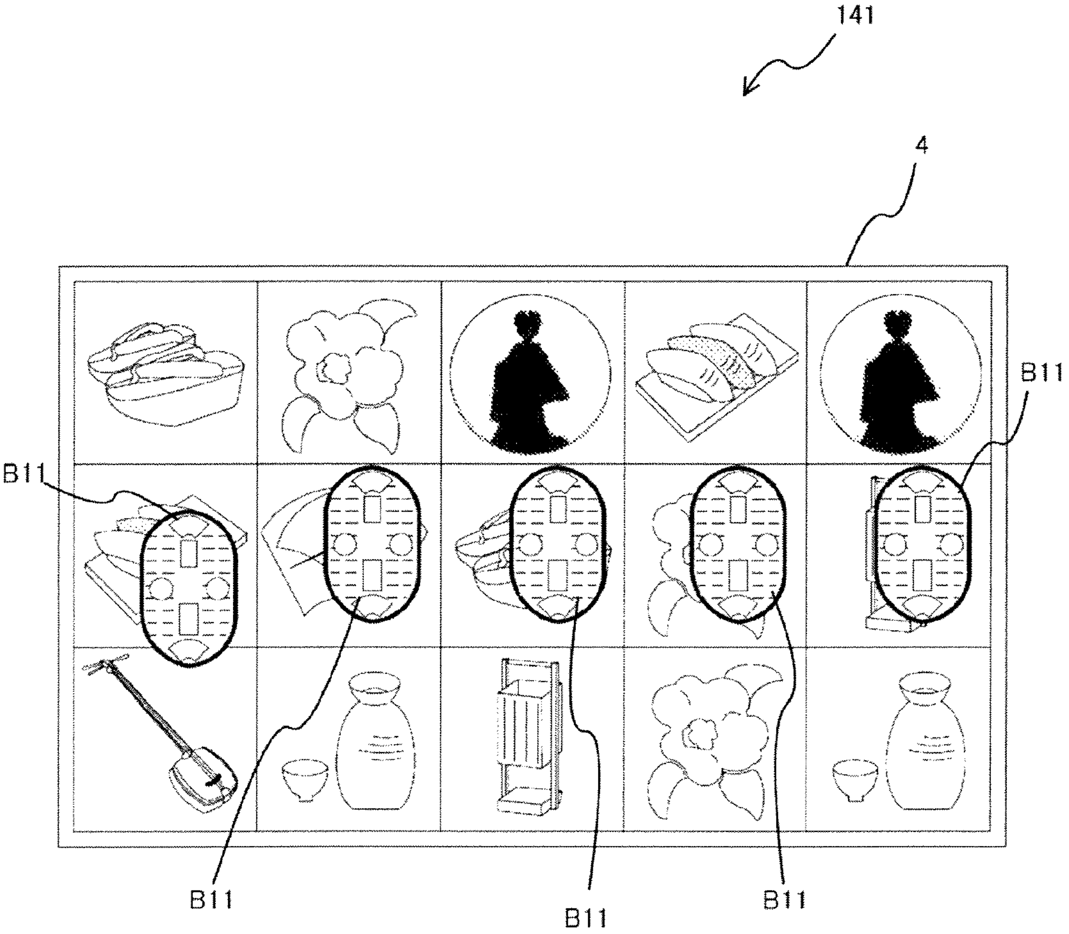
FIG. 30 is a view showing an example of a rendering image that is displayed on the lower image display panel of the gaming machine according to the embodiment of the present invention.

In this manner, with respect to the first video reel 3*a* to the fifth video reel 3*e*, when the number of WILD symbols to be entered is determined by means of lottery, the main CPU 71 determines the contents of rendering (step S438), scrolls symbols in a state in which all of the symbols determined in the step S432 described above have been covered with the WILD symbols on which the number of entries has been determined in the step S433 to the step S437 described above, and then, displays an image that is to be stopped, on the lower image display panel 141 (step S439). In this manner, as shown in FIG. 30, the lower image display panel 141 displays fifteen symbols and WILD symbols (former Japanese oval gold coins), the number of which has been determined for each video reel by means of lottery, in 15 symbol display regions 4 made of five columns×three symbols. FIG. 30 shows an example in which one WILD symbol (former Japanese oval gold coin) B11 is displayed on each video reel.

The main CPU 71 determines a winning combination including WILD symbols (determines a winning combination using any of the WILD symbols in place of any symbol) and determines the number of payouts made of a prize according to the number of entries of the WILD symbols, and then, stores the determined number of payouts in the RAM 73 (step S440).

The main CPU 71 executes extensive lottery processing of determining whether or not the routine is caused to migrate to the third bonus game (the Koyuki bonus game), by means of random number lottery (step S441). In a case where a result of the extensive lottery processing is a result indicating that the routine migrates to the third bonus game (the Koyuki bonus game), the main CPU 71 causes the routine to migrate from step S442 to step S443 by obtaining an affirmative result in step S442 and then stores in the RAM 73 the data relating to the lottery result indicating that the routine migrates to the third bonus game (the Koyuki bonus game) has been obtained. Subsequent to step S443 or in a case where a negative result has been obtained in step S442 (in a case where a result indicating that the routine does not migrate to the third bonus game (the Koyuki bonus game) has been obtained in the lottery of step S441 described above), the main CPU 71 determines whether or not the second bonus game (the Konatsu bonus game) has completed by a predetermined number of games (for example, by seven games), based on a counter value (step S444).

In a case where the predetermined number of games has not been reached, the main CPU 71 causes the routine to migrate from step S444 to the step S431 described above by obtaining a negative result in step S444, increments the counter, and then, further repeats the game. In this manner, on each video reel, the number of WILD symbols B11 to be entered increases as the number of games increases.

On the other hand, in a case where the predetermined number of games has been reached, the main CPU 71 causes the routine to migrate from step S444 to step S445 by obtaining an affirmative result in step S444, resets the counter, and then, determines whether or not a result indicating that the routine extensively migrates to the third bonus game (the Koyuki bonus game) has been stocked in the RAM 73 (step S446).

Figure 31:
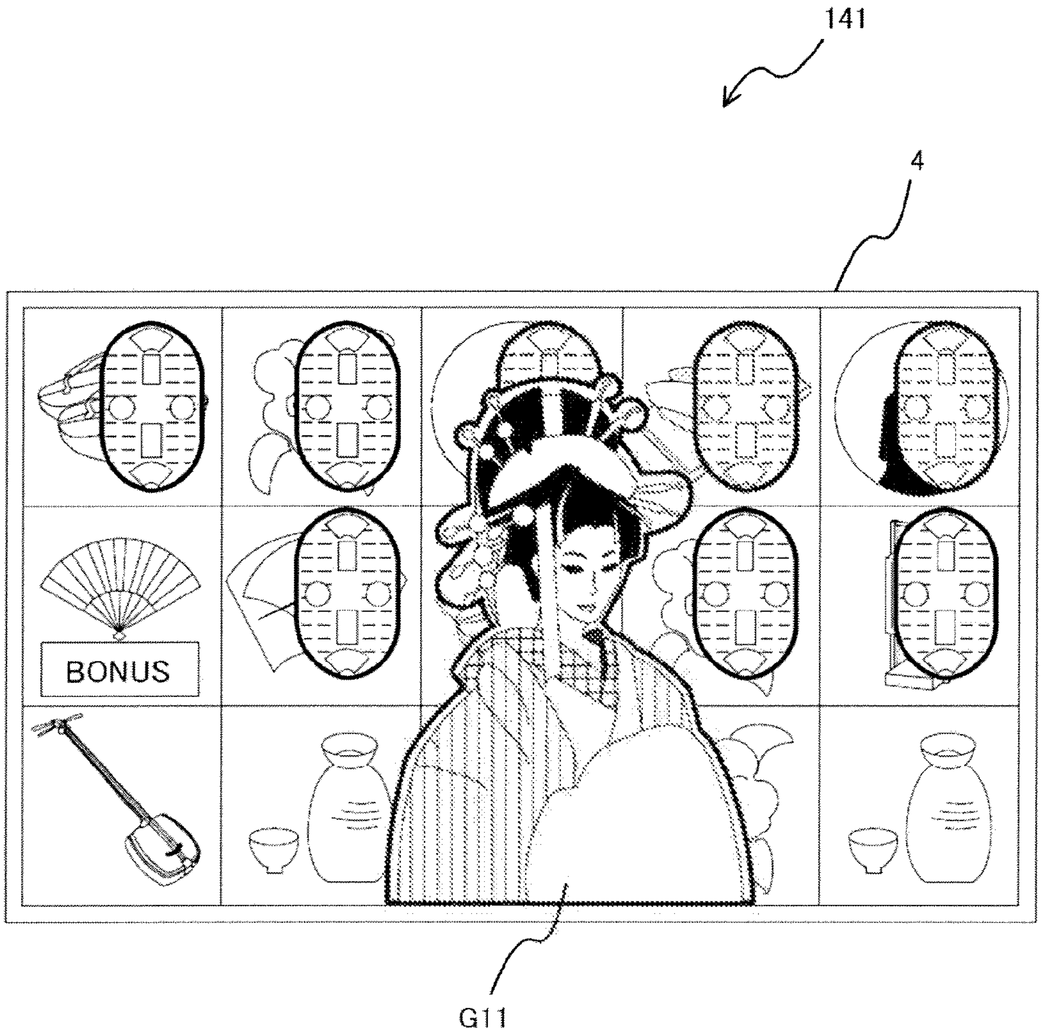
FIG. 31 is a view showing an example of a rendering image that is displayed on the lower image display panel of the gaming machine according to the embodiment of the present invention.

In a case where the result indicating that the routine extensively migrates to the third bonus game (the Koyuki bonus game) has been stocked in the RAM 73, in during predetermined numbers of game (for example, seven games), the fact designates that a lottery result indicating that the routine extensively migrates to the third bonus game (the Koyuki bonus game) has been obtained in the extensive lottery (step S441). The main CPU 71 causes the routine to migrate from step S446 to step S447 by obtaining an affirmative result in step S446; reads out from the RAM 73 rendering movie data and rendering sound data for the routine to migrate to the third bonus game (the Koyuki bonus game); and then, displays the rendering movie on the lower image display panel 141 and outputs the rendering sound from the speaker 112. For example, in the lower age display panel 141, as shown in FIG. 31, the rendering movie is displayed as if an image G11 indicative of a former Japanese courtesan called "Oiran" appears at the center of the symbol display, regions 4. After that, the main CPU 71 executes the third bonus game (the Koyuki bonus game) in order for the routine to extensively migrate to another bonus game (step S448).

On the other hand, in a case where a result indicating that the routine extensively migrates to the third bonus game (the Koyuki bonus game) has not been stocked in the RAM 73, in during predetermined numbers of game (for example, seven games), the fact designates that a lottery result indicating that the routine extensively migrates to the third bonus game (the Koyuki bonus game) has not been obtained in the extensive lottery (step S441). The main CPU 71 completes the second bonus game (the Konatsu bonus game) by obtaining a negative result in step S446.

In accordance with the second bonus game (the Konatsu bonus game) processing described above with respect to FIG. 29, the number of positions of WILD symbols to be entered into the first video reel 3*a* to the fifth video reel 3*e* are determined in each of the games, the number of which has been predetermined (for example, seven games), and then a prize (the number of payouts) according to a total number of WILD symbols having been entered is determined at a stage at which all games have been consumed.

In place of the fact that the lottery processing of the number of entries of WILD symbols is performed in each game, when the routine has migrated to the second bonus game (the Konatsu bonus game), the number of entries in all games (for example, seven games) may be determined. The operating procedure is shown in FIG. 32.

Figure 32:
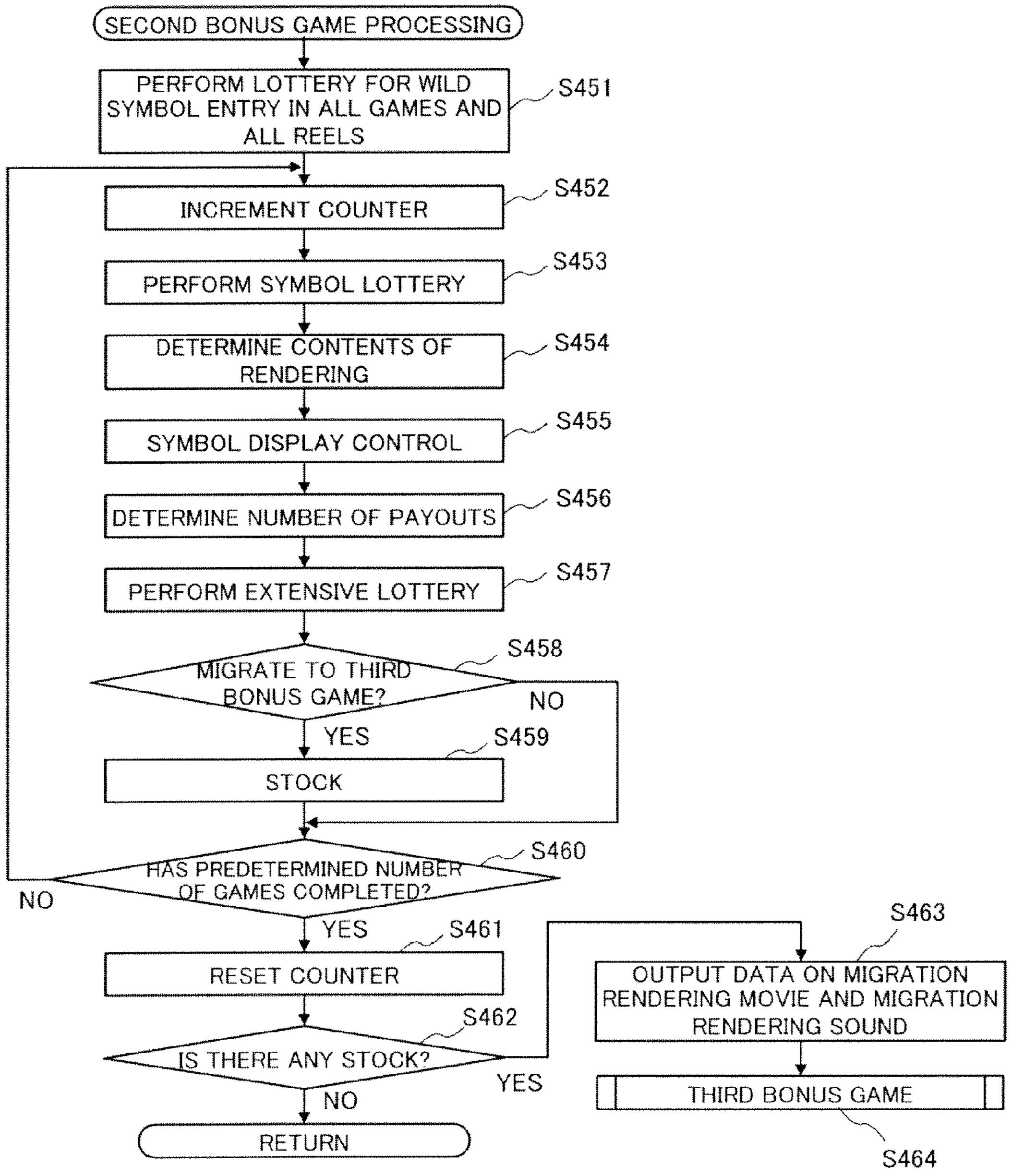
FIG. 32 is a view showing a flowchart of second bonus game processing in a gaming machine according to another embodiment of the present invention.

As shown in FIG. 32, the main CPU 71 having caused the routine to migrate to the second bonus game (the Konatsu bonus game) first determines, by means of random number lottery, the number of WILD symbols to be entered into all of the video reels (one or two symbols) with respect to all games (for example, seven games), each of which is the second bonus game (the Konatsu bonus game). The main CPU 71 then stores the determined result in the RAM 73 (step S451).

The main CPU 71 then increments the counter (step S452) and then determines the symbols to be displayed in a stopped state in the fifteen symbol display regions 4 made of five columns×three symbols (step S453). When symbol lottery processing completes, the main CPU 71 determines the contents of rendering (step S454). Among the WILD symbols to be entered with respect to all games determined in the step S451 described above, the CPU 71 scrolls symbols in a state in which all of the symbols determined in the step S453 described above are covered with the WILD symbol determined with respect to any of the games, and then, displays an image that is to be stopped, on the lower image display panel 141 (step S455). In this manner, as shown in FIG. 30, the lower image display panel 141 displays fifteen symbols and WILD symbols (former Japanese oval gold coin symbols), the number of which has been determined for each video reel by means of lottery, in fifteen symbol display regions 4 made of five columns×three symbols.

The main CPU 71 determines a winning combination including WILD symbols (determines a winning combination using any of the WILD symbols in place of any symbol) and determines the number of payouts made of a prize according to the number of entries of the WILD symbols. The main CPU 71 then stores the determined number of payouts in the RAM 73 (step S456).

The main CPU 71 executes extensive lottery processing of determining whether or not the routine is caused to migrate to the third bonus game (the Koyuki bonus game), by means of random number lottery (step S457). In a case where a result of the extensive lottery processing is a result indicating that the routine migrates to the third bonus game (the Koyuki bonus game), the main CPU 71 causes the routine to migrate from step S458 to step S459 by obtaining an affirmative result in step S458 and then stores in the RAM 73 data relating to the lottery result indicating that the routine migrates to the third bonus game (the Koyuki bonus game) has been obtained.

Subsequent to step S459 or in a case where a negative result has been obtained in step S458 (in a case where a result indicating that the routine does not migrate to the third bonus game (the Koyuki bonus game) has been obtained in the lottery of step S457 described above), the main CPU 71 determines whether or not the second bonus game (the Konatsu bonus game) has completed by a predetermined number of games (for example, by seven games), based on a counter value (step S460).

In a case where the predetermined number of games has not been reached, the main CPU 71 causes the routine to migrate from step S460 to the step S452 described above by obtaining a negative result in step S460, increments the counter, and then, further repeats the game.

On the other hand, in a case where the predetermined number of games has been reached, the main CPU 71 causes the routine to migrate from step S460 to step S461 by obtaining an affirmative result in step S460, resets the counter, and then, determines whether or not a result indicating that the routine extensively migrates to the third bonus game (the Koyuki bonus game) has been stocked in the RAM 73 (step S462).

In a case where the result indicating that the routine extensively migrates to the third bonus game (the Koyuki bonus game) has been stocked in the RAM 73, in during predetermined numbers of game (for example, seven games), the fact designates that a lottery result indicating that the routine extensively migrates to the third bonus game (the Koyuki bonus game) has been obtained in the extensive lottery (step S457). The main CPU 71 causes the routine to migrate from step S462 to step S463 by obtaining an affirmative result in step S462; reads out from the RAM 73 rendering movie data and rendering sound data for the routine to migrate to the third bonus game (the Koyuki bonus game); and then, displays the rendering movie on the lower image display panel 141 and outputs the rendering sound from the speaker 112. For example, in the lower image display panel 141, as shown in FIG. 31, the rendering movie is displayed as if an image G11 that is indicative of a former Japanese courtesan called "Oiran" were appearing at the center of the symbol display regions 4. After that, the main CPU 71 executes the third bonus game (the Koyuki bonus game) in order for the routine to extensively migrate to another bonus game (step S464).

On the other hand, in a case where a result indicating that the routine extensively migrates to the third bonus game (the Koyuki bonus game) has not been stocked in the RAM 73, in during predetermined numbers of game, the fact designates that a lottery result indicating that the routine extensively migrates to the third bonus game (the Koyuki bonus game) has not been obtained in the extensive lottery (step S457). The main CPU 71 completes the second bonus game (the Konatsu bonus game) by obtaining a negative result in step S462.

In accordance with the second bonus game (the Konatsu bonus game) processing described above with respect to FIG. 32, the number and positions of WILD symbols to be entered in each of the games, the number of which has been predetermined (for example, seven games) are predetermined by means of random number lottery with respect to all games of the second bonus game (the Konatsu bonus game), and then, a prize (the number of payouts) according to a total number of WILD symbols having been entered is determined at a stage at which all games have been consumed.

<Third Bonus Game (Koyuki Bonus Game) Processing>

Next, a third bonus game (a Koyuki bonus game) will be described with reference to FIG. 33 and FIG. 34.

The third bonus game (the Koyuki bonus game) is a bonus game that is set so that the routine can migrate by means of a plurality of routes. A first route is established in a case where the routine has been caused to migrate to the third bonus game (the Koyuki bonus game) of step S359 in the three options bonus game processing shown in FIG. 24. A second route is established in a case where the routine has been caused to migrate to the third bonus game (the Koyuki bonus game) of step S381 in the first bonus game (the Koharu bonus game) processing shown in FIG. 25. In addition, the second route is also established in a case where the routine has been caused to migrate to the third bonus game (the Koyuki bonus game) of step S408 in a modification example of the first bonus game (the Koharu bonus game) processing shown in FIG. 28. A third route is established in a case where the routine has been caused to migrate to the third bonus game (the Koyuki bonus game) of step S448 in the second bonus game (the Konatsu bonus game) processing shown in FIG. 29. In addition, the third route is established in a case where the routine has been caused to migrate to the third bonus game (the Koyuki bonus game) of step S464 in a modification example of the second bonus game (the Konatsu bonus game) processing shown in FIG. 32.

Figure 35:
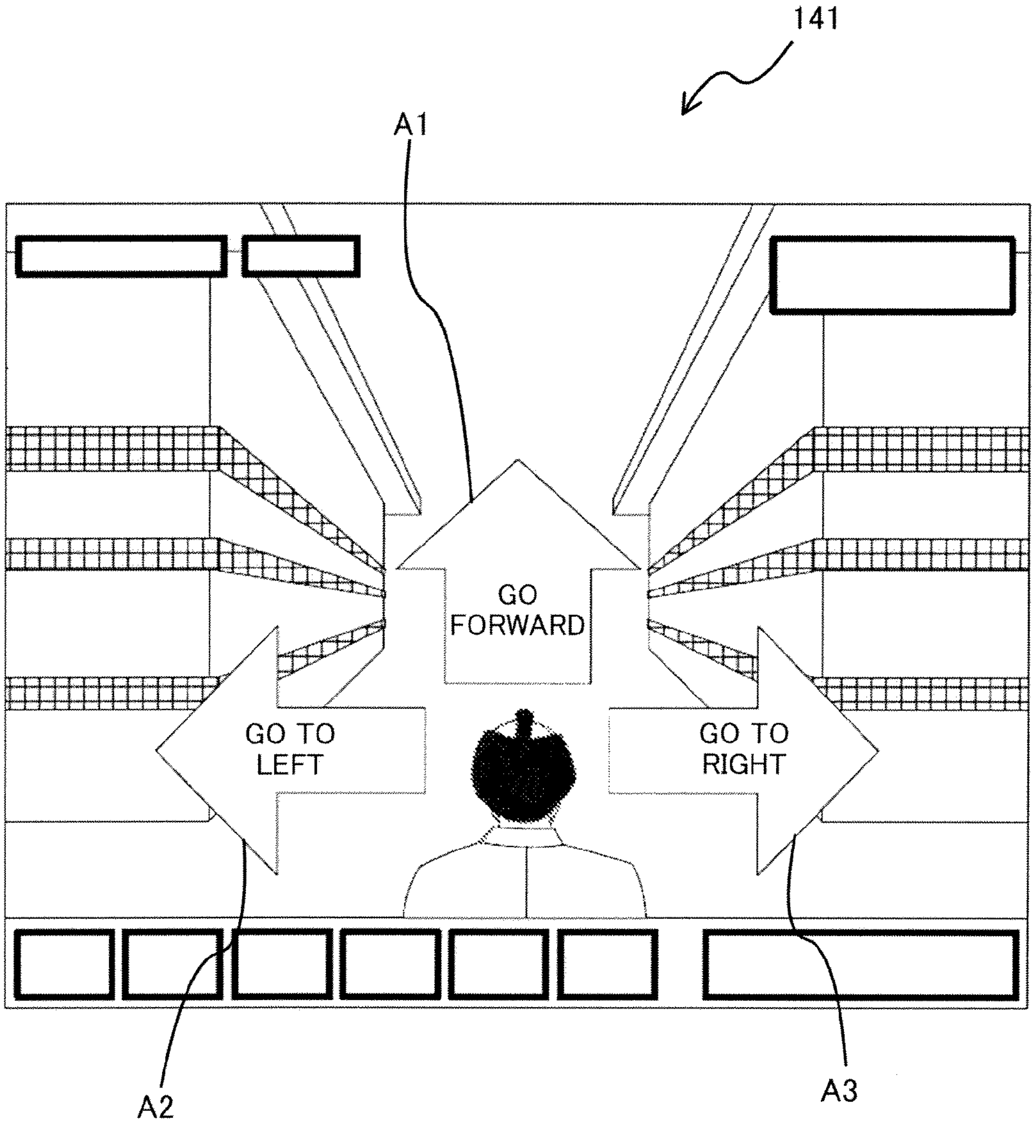
FIG. 35 is a view showing an example of a rendering image that is displayed on the lower image display panel of the gaming machine according to the embodiment of the present invention.

When the main CPU 71 enters the third bonus game (the Koyuki bonus game) from these loops, the main CPU 71 displays an image for start operation, shown in FIG. 35, in the lower image display panel 141, in place of fifteen symbols display regions 4 made of five columns×three symbols (step S481). This image also serves as an image that is indicative of a landscape at a start point, the image including guiding displays by means of characters such as "go forward", "go to left", or "go to right" together with the arrows. A player operates to press any of these arrows that are displayed on the lower image display panel 141, thereby enabling the main CPU 71 to determine that the player has specified any of the arrows, based on an output signal from the touch panel 114 that is provided in the lower image display panel 141.

Figure 36:
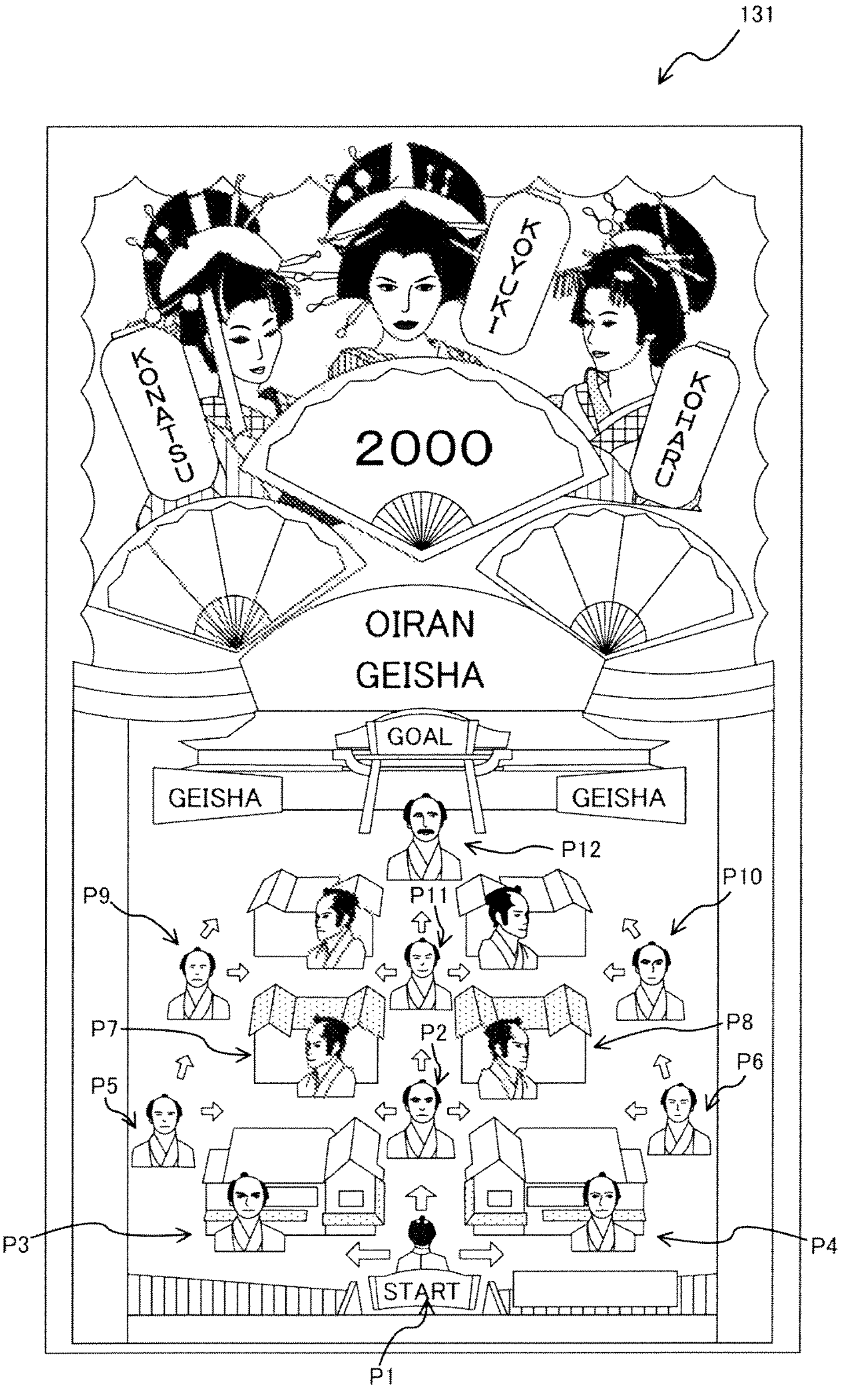
FIG. 36 is a view showing an example of a rendering image that is displayed on an upper image display panel of the gaming machine according to the embodiment of the present invention.

In addition, in the upper image display panel 131, an image that is indicative of the contents of the progress of the third bonus game, as shown in FIG. 36, is drawn on a surface of a light transmission plate. In this image, an image that is indicative of a start position of a game is drawn at a lower part of the upper image display panel 131, and an image that is indicative of a goal is drawn at an upper part of the same display panel. With respect to light emission modes of a plurality of lamps that are provided at a back side of the image display panel 131, their light emission positions are changed so that light moves from a lower start position sequentially upward or transversely, in accordance with the progress of the third bonus game, under the control of the main CPU 71.

Figure 37:
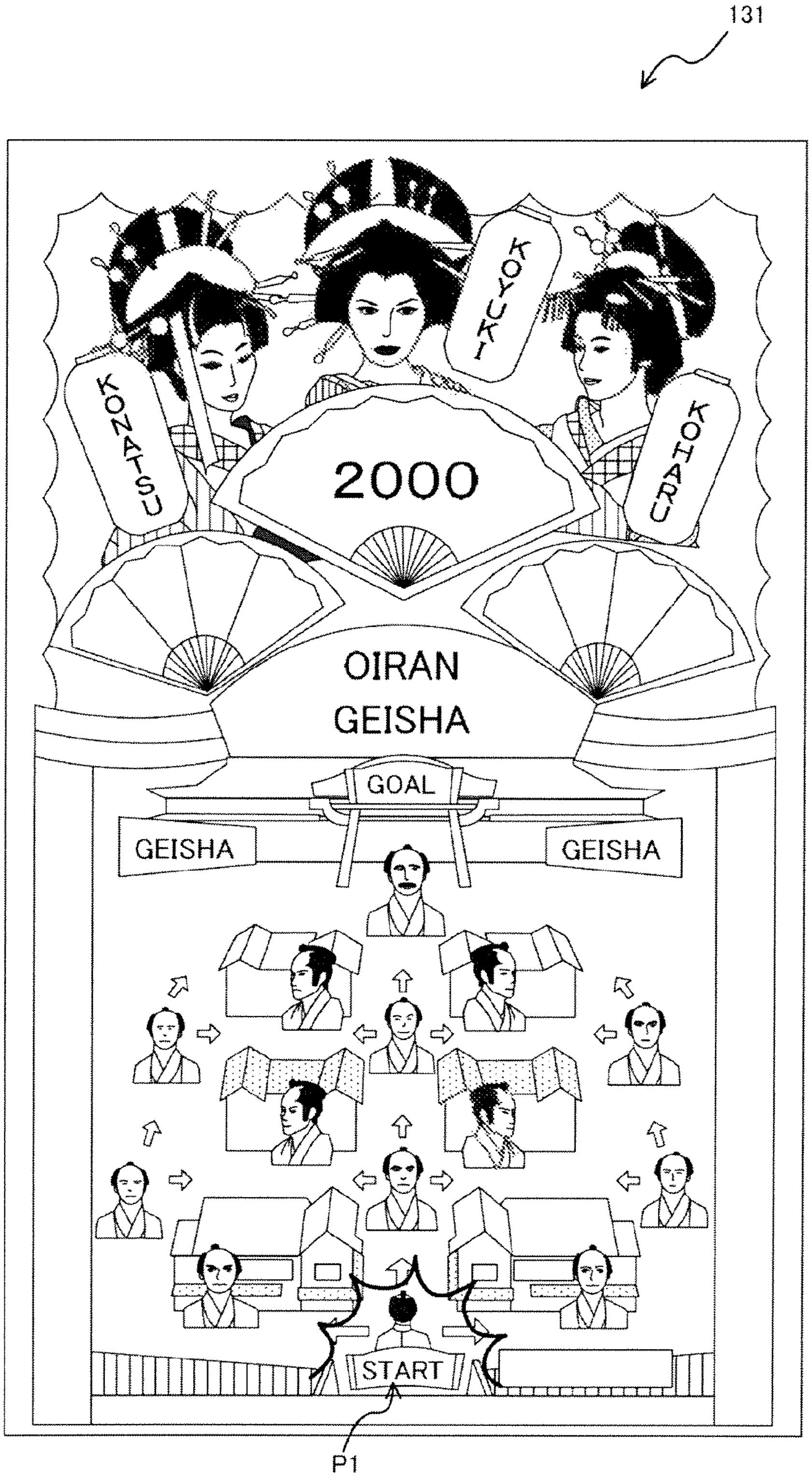
FIG. 37 is a view showing an example of a rendering image that is displayed on the upper image display panel of the gaming machine according to the embodiment of the present invention.

The main CPU 71 displays the image for start operation, shown in FIG. 35, in the lower image display panel 141 (step S481), and then, as shown in FIG. 37, the main CPU 71 causes light to be emitted from a lamp at the back side of a region P1 that is indicative of the start point, thereby causing a player to recognize that the third bonus game (the Koyuki bonus game) is started, through the light emission of the start point (step S482). The main CPU 71 then waits for the player to make an input operation from the touch panel 114 in the lower image display panel 141 (step S483).

In a case where the player has not made an input operation, the main CPU 71 causes the routine to migrate from step S483 to step S482 by obtaining a negative result in step S483 and then maintain light emission at a start point.

Figure 38:
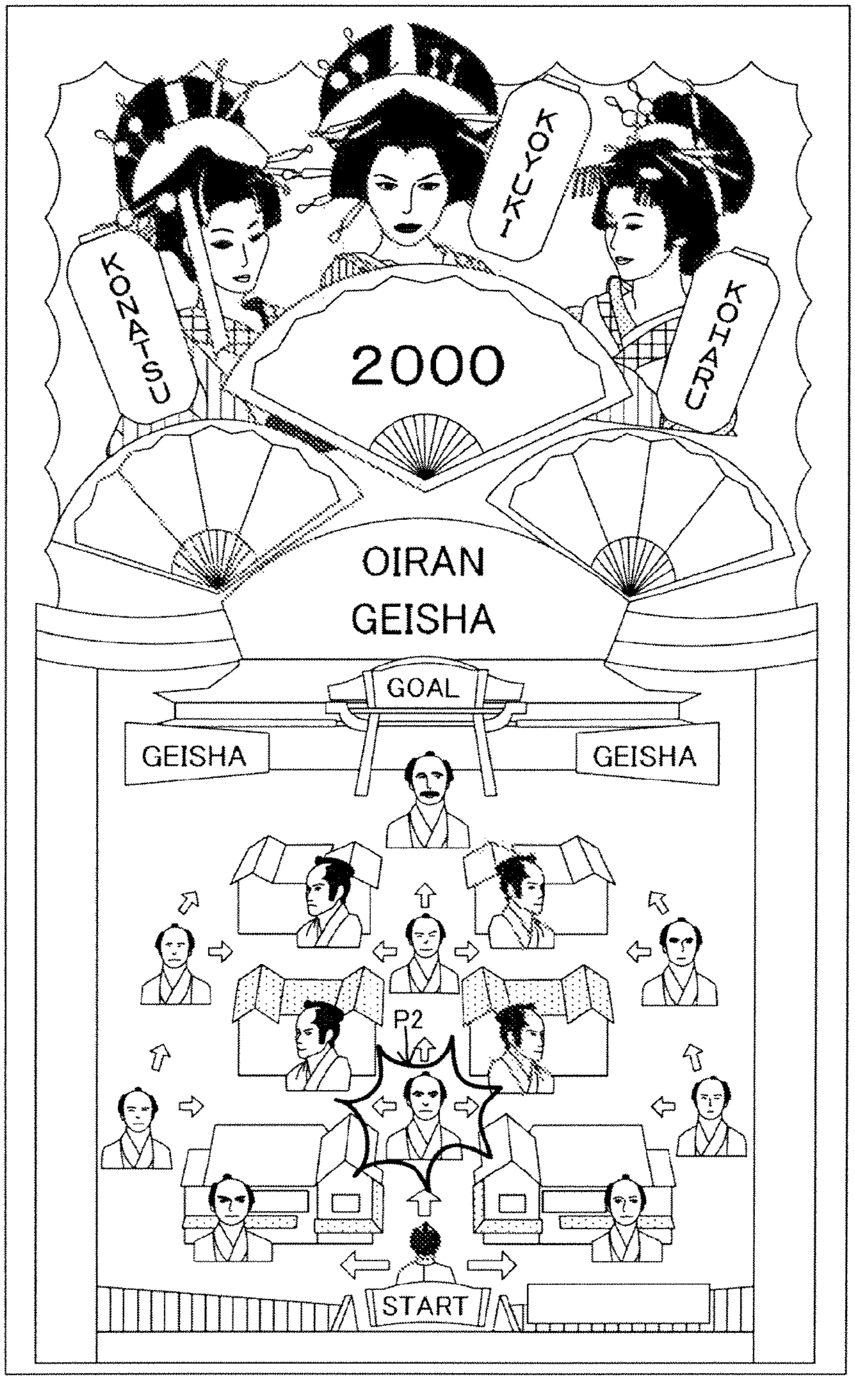
FIG. 38 is a view showing an example of a rendering image that is displayed on the upper image display panel of the gaming machine according to the embodiment of the present invention.

On the other hand, in a case where the player has made an input operation, the main CPU 71 causes the routine to migrate from step S483 to step S484 by obtaining an affirmative result in step S483 and then changes a light emitting position of the upper image display panel 131 in accordance with an input operation. Specifically, in a case where the player has operated to press the arrow A1 that corresponds to the guiding display "go forward" shown in FIG. 35 (the arrow indicating an upward direction), in response to the press operation the main CPU 71 changes the light emitting position of the upper image display panel 131 to a region P2 that is indicative of a crossing point at the upward direction as viewed from the region P1 that is indicative of the start point, as shown in FIG. 38. That is, the main CPU 71 stops light emission from the lamp at the back side of the region P1 that is indicative of the start point and then causes light to be emitted from a lamp at the back side of the region P2 that is indicative of the crossing point. In this manner, the player can recognize what the progress of a game is going on, in accordance with his or her own operation.

Figure 39:
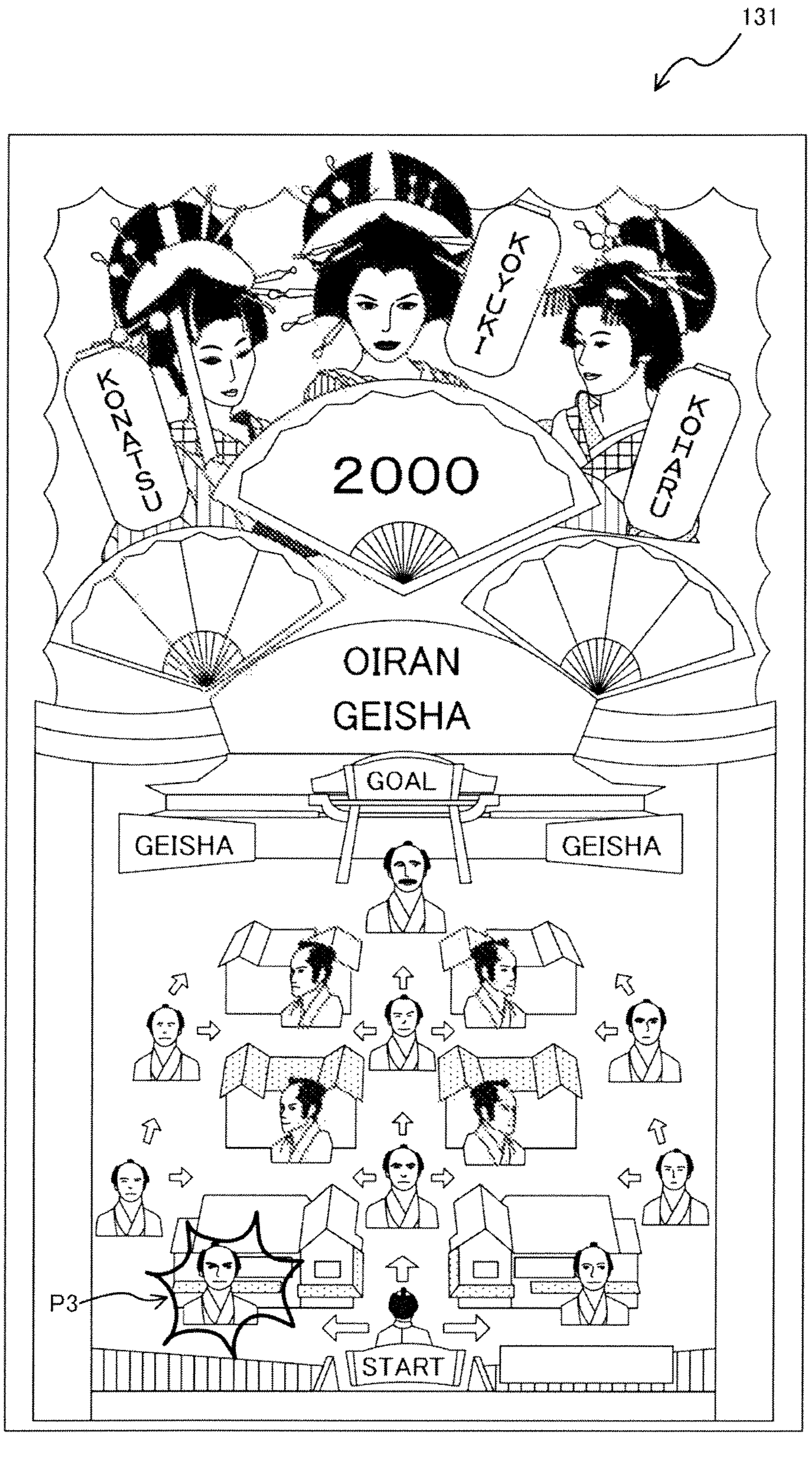
FIG. 39 is a view showing an example of a rendering image that is displayed on the upper image display panel of the gaming machine according to the embodiment of the present invention.

In addition, in a case where the player has operated to press the arrow A2 that corresponds to the guiding display "go to left" shown in FIG. 35 (the arrow indicating a leftward direction), in response to this press operation the main CPU 71 changes the light emitting position of the upper image display panel 131 to a region P3 that is indicative of a first shop (a Tempura House) that exists in a leftward direction as viewed from the region P1 that is indicative of the start point, as shown in FIG. 39. That is, the main CPU 71 stops light emission from the lamp at the back side of the region P1 that is indicative of the start point and then causes light to be emitted from a lamp at the back side of the region P3 that is indicative of the first shop (the Tempura House). In this manner, the player can recognize what the progress of a game is going on, in accordance with his or her own operation.

Figure 40:
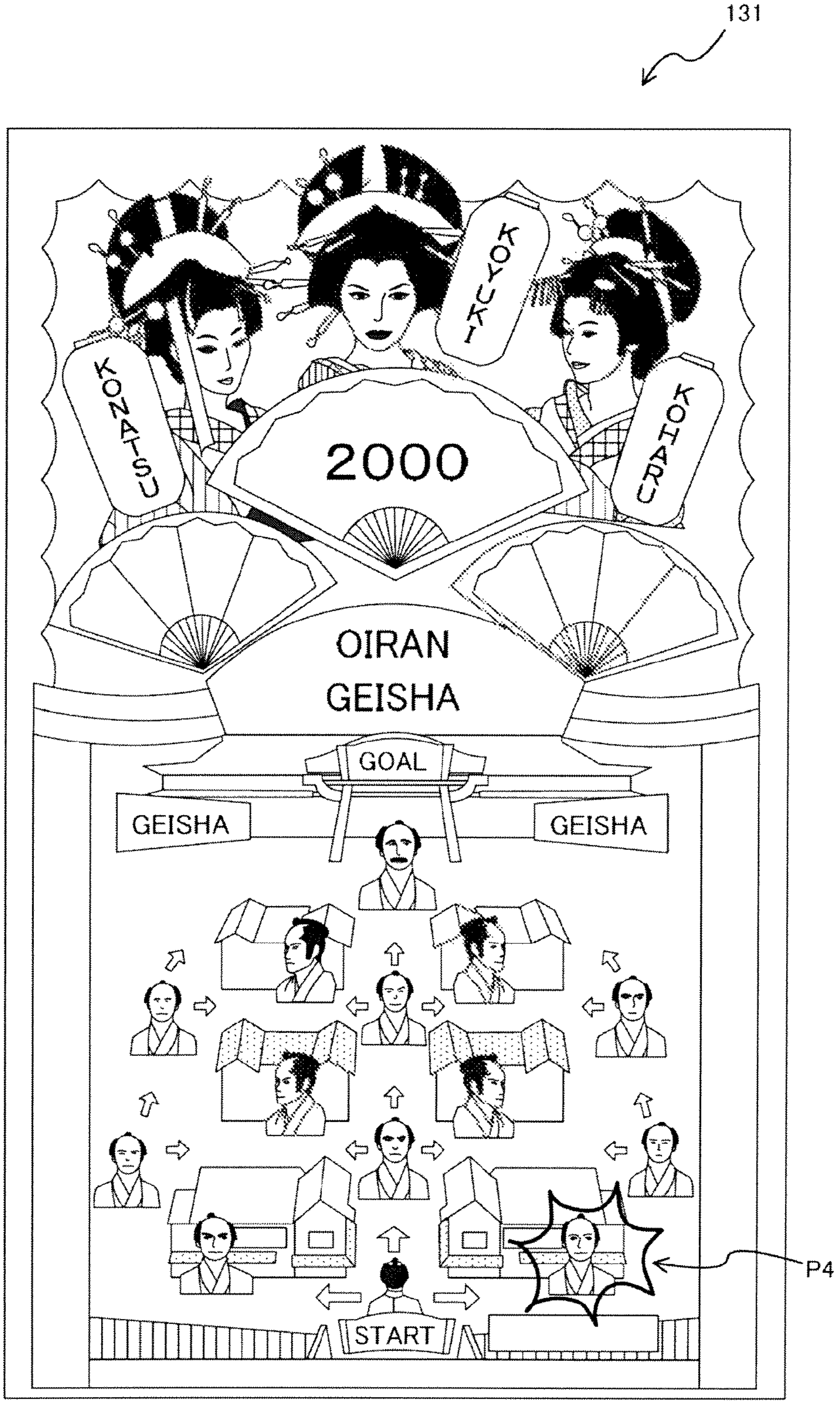
FIG. 40 is a view showing an example of a rendering image that is displayed on the upper image display panel of the gaming machine according to the embodiment of the present invention.

Further, in a case where the player has operated to press the arrow A3 that corresponds to the guiding display "go to right" shown in FIG. 35 (the arrow indicating a rightward direction), in response to this press operation the main CPU 71 changes the light emitting position of the upper image display panel 131 to a region P4 that is indicative of a second shop (a Japanese Tea Lounge) that is in a rightward direction as viewed from the region P1 that is indicative of the start point, as shown in FIG. 40. That is, the main CPU 71 stops light emission from the lamp at the back side of the region P1 that is indicative of the start point and then causes light to be emitted from a lamp at the back side of the region P4 that is indicative of the second shop (the Japanese Tea Lounge). In this manner, the player can recognize what the progress of a game is going on, in accordance with his or her own operation.

In a case where the first shop (the Tempura House) has been selected, a first mini-game is executed, or alternatively, in a case where the second shop (the Japanese Tea Lounge) has been selected, a second mini-game is executed. The main CPU 71 determines whether or not the game selected by the player is the first mini-game (step S485). In the case where the player has selected the first shop (the Tempura House), the main CPU 71 causes the routine from step S485 to step S486 by obtaining an affirmative result in step S485; displays an image of the first mini-game in the lower image display panel 141; and then, executes the first mini-game. For example, in the first mini-game, the player is caused to select one Tempura from among three different kinds of Tempuras and then execute a game in which a prize according to the selected Tempura is awarded to the player.

On the other hand, in a case where the player has not selected the first shop (the Tempura House), the main CPU 71 causes the routine from step S485 to step S487 by obtaining a negative result in step S485 and then determines whether or not the game selected by the player is the second mini-game. In a case where the player has selected the second shop (the Japanese Tea Lounge), the main CPU 71 causes the routine to migrate from step S487 to step S488 by obtaining an affirmative result in step S487; displays an image of the second mini-game in the lower image display panel 141; and then, executes the second mini-game. For example, in the second game, the player is caused to select one Japanese teacup from three different kinds of Japanese teacups and then execute a game in which a prize according to the selected Japanese teacup is awarded to the player.

While the amounts of the prizes to be awarded to the player according to a game result are different from each other in the first mini-game executed in the step S486 described above and the second mini-game executed in the step S488 described above, the average amount of prizes is the same in these two mini-games. For example, while variation margin of prizes in three Tempuras selected in the first mini-game are greater than those in three Japanese teacups selected in the second mini-game, the average amount of prizes in the three Tempuras selected in the first mini-game is identical to that in the three Japanese teacups selected in the second mini-game.

The main CPU 71 causes the routine to migrate to step S489 subsequent to the processing operation of the step S486 described above or subsequent to the processing operation of the step S488 described above and then awards to the player a prize according to a result of the mini-game.

On the other hand, in a case where the player has selected neither of the first shop (the Tempura House) and the second shop (the Japanese Tea Lounge) in the step S483 described above, the main CPU 71 causes the routine to migrate from step S487 to step S490 by obtaining a negative result in step S487. Step S490 is a processing operation of displaying a landscape image in a region that is indicative of a crossing point according to the progress of a game, on the lower image display panel 141. For example, in a case where the CPU 71 has caused the routine to migrate to step S490 by obtaining the negative result in step S487, the fact designates that the player has selected a crossing point indicating an upward direction, in a selection operation made in the region P1 that is indicative of the start point. The main CPU 71 displays a selection operation image in the cross point, as shown in FIG. 41, in the lower image display panel 141.

Figure 41:
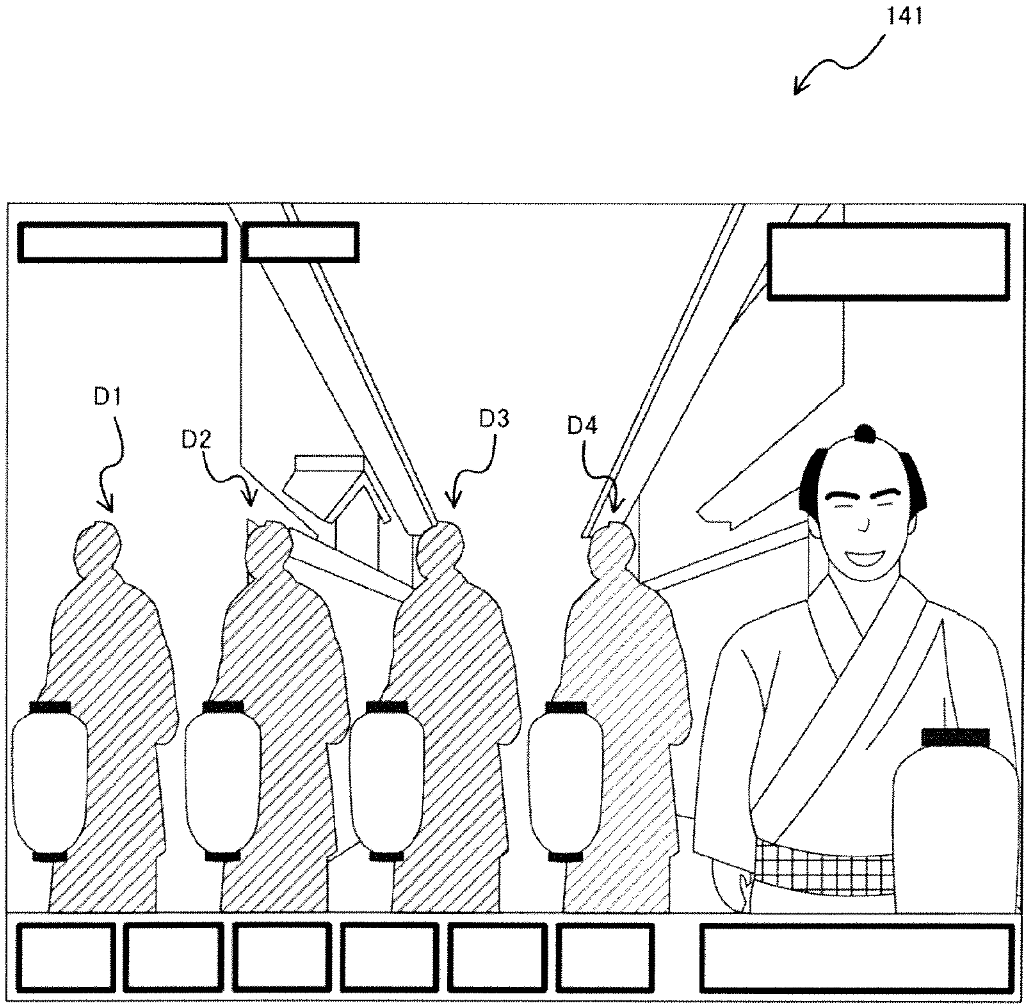
FIG. 41 is a view showing an example of a rendering image that is displayed on the lower image display panel of the gaming machine according to the embodiment of the present invention.

In addition, after the first mini-game in step S486 has been executed, or alternatively, after the second mini-game in step S488 has been executed, a game moves to a respective one of the corresponding crossing points (a region P5 (FIG. 36) that is indicative of a crossing point after the first mini-game or a region P6 (FIG. 36) that is indicative of a crossing point after the second mini-game), and in response to this movement, in step S490, a selection operation image in the cross point, as shown in FIG. 41, is displayed on the lower image display panel 141.

After the selection operation image has been displayed at the crossing point according to the progress of a game in the lower image display panel 141 (step S490), the main CPU 71 waits for the player to make an input operation (a selection operation). The selection operation image (FIG. 41) that has been displayed in the lower image display panel 141 includes images D1 to D4 that are indicative of shadows of a plurality of guides. When the player operates to press any of the images D1 to D4, the main CPU 71 determines that the player's selection is any of the images D1 to D4, based on an output signal that is output from the touch panel 114 in response to this press operation.

In a case where the player has made no selection operation, the main CPU 71 causes the routine from step S491 to step S490 described above by obtaining a negative result in step S491 and then continues display of the selection operation image (FIG. 41). On the other hand, in a case where the player has made any selection operation, the main CPU 71 causes the routine to migrate from step S491 to step S492 by obtaining an affirmative result in step S491 and then displays an image according to the input operation (the selection operation) on the lower image display panel 141. For example, in a case where the image D1 (FIG. 41) has been selected, a good guider appears in response to the selected image D1 and then the player is guided to advance in an upward direction.

For example, in the region P5 that is indicative of a crossing point, a game advances to a region P9 that is indicative of a crossing point that is in the upward direction; in the region P6 that is indicative of a crossing point, a game advances to a region P10 that is indicative of a crossing point that is in the upward direction; and in the region P2 that is indicative of a crossing point, a game advances to a region P11 that is indicative of a crossing point that is in the upward direction. In this manner, in a case where a good guider has appeared in accordance with the player selection, a game advances to the top that is a goal in the third bonus game (the Koyuki bonus game).

On the other hand, in a case where the player has selected the image D2 (FIG. 41), for example, a guide appears in response to the selected image D2, the player is guided to a shop in a transverse direction, and then, in the shop to which the player has been guided, a further new selection operation image is displayed on the lower image display panel 141. On this new selection operation image, a plurality of former Japanese courtesan called "Oiran" shadows are displayed on a Former Japanese paper sliding door, and when the player selects any of them, the routine advances to a game according to the selection. For example, if a specific Japanese Geisha girl appears, a predetermined prize is awarded; if a former Japanese courtesan called "Oiran" appears, roulette lottery is executed; or if a thief appears, the third bonus game (the Koyuki bonus game) completes. Different kinds of prizes are set depending on these characters.

On the other hand, in a case where the player has selected the image D3 (FIG. 41), for example, a thief appears in response to the selected image D3 and then the third bonus game (the Koyuki bonus game) completes.

On the other hand, in a case where the player has selected the image D4 (FIG. 41), for example, a former Japanese courtesan called "Oiran" appears in response to the selected image D4 and then roulette lottery is executed. In this roulette lottery, a roulette is displayed on the lower image display panel 141 and then a prize is determined and awarded by means of this roulette.

When any of the images D1 to D4 is selected in this way, the main CPU 71 displays an image of a character according to the selected image, on the lower image display panel 141, and then, advances a game in accordance with the selected image. In addition, the main CPU 71 awards a prize according to the selected image from among the images D1 to D4 to a winning player (step S493). Further, the main CPU 71 changes a light emitting device in the upper image display panel 131 in response to an input operation (a selection operation) (in response to advance of the game) made by the player (step S494).

After the main CPU 71 has caused the routine to move from a crossing point to a shop in a transverse direction by means of selection of any of the images D1 to D4, the main CPU 71 causes the routine to advance in the transverse direction as is and then move to another crossing point. For example, after the player has selected any of the images D1 to D4 at a crossing point P5, a game is executed in a shop P7 in the transverse direction of the crossing point P5, the routine in the game is then advanced to a crossing point P2 that is provided in the transverse direction of the shop P7. That is, when a shop in the transverse direction is selected at a crossing point, after the game has completed in the shop, the routine advances in a direction opposite to a direction in which the routine has reached the shop. Specifically, in a case where the routine has advanced from the crossing point P5 to the shop P7 in accordance with the player selection, after the game has completed in the shop P7, the routine advances from the shop P7 to the crossing point P2, or alternatively, in a case where the routine has advanced from the crossing point P2 to the shop P7, after the game has completed in the shop P7, the routine advances from the shop P7 to the crossing point P5.

In this way, if the game in the shop in the transverse direction is selected in a selection operation of any of the images D1 to D5 (FIG. 41), the routine advances in a transverse direction that is different from an upward direction in which the routine should advance to a goal, and as a result, more time is required for migration to a lottery game to be played after the goal has been reached, the lottery game suggesting a possibility that a player may obtain a greater prize. In this manner, in a case where a route going up to the goal becomes a roundabout way, there may be a case in which a prize is obtained by means of a game in shop in that route or there may be a case in which the third bonus game (the Koyuki bonus game) forcibly completes, for example, and there may be a case in which a situation is advantageous or disadvantageous to a player in comparison with a case in which the goal is reached in a short route. In this respect, the gaming entertaining property to be imparted to the player can be enhanced.

The main CPU 71 advances the game after selection of any of the images D1 to D4 at a crossing point (step S492, S493, or S494) and then determines whether or not the goal has been reached (step S495). In a case where the goal has not been reached, the main CPU 71 causes the routine to migrate from step S495 to the step S490 described above by obtaining a negative result in step S495 and then displays a selection operation image at a cross point according to the progress of a game.

Figure 42:
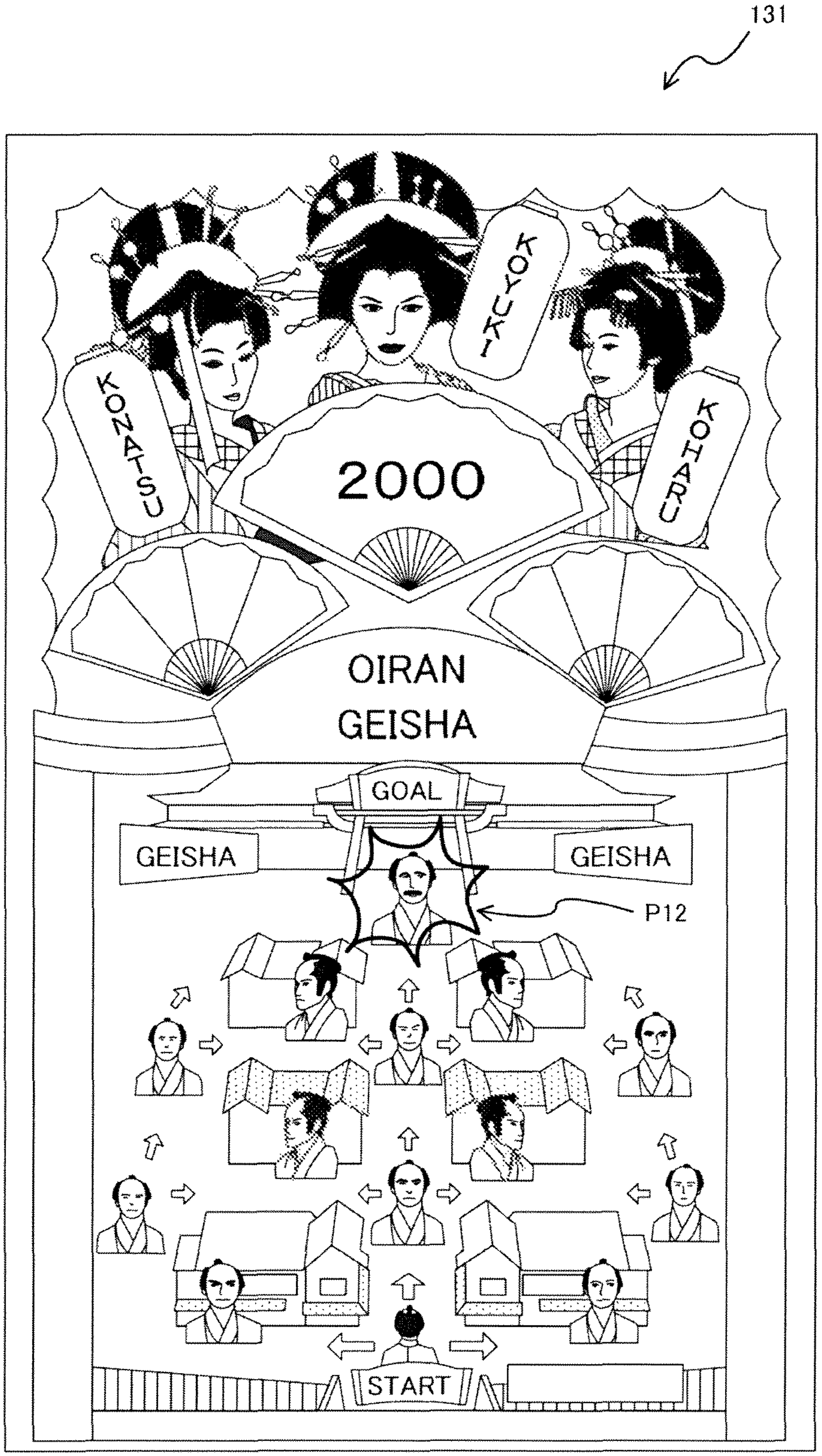
FIG. 42 is a view showing an example of a rendering image that is displayed on the upper image display panel of the gaming machine according to the embodiment of the present invention.

On the other hand, in a case where the goal has been reached, the main CPU 71, as shown in FIG. 42, causes light to be emitted from a lamp at the back side of a region P12 that is indicative of a goal point in the upper image display panel 131, thereby informing a player that the goal has been reached. In addition, the main CPU 71 causes the routine to migrate from step S495 to step S496 shown in FIG. 34 by obtaining an affirmative result in step S495 and then determines whether or not a counter value has reached 5. In a case where the counter value has not reached 5, the fact designates that the number of repetitions of loop migrating to the first bonus game (the Koharu bonus game) or the second bonus game (the Konatsu bonus game) after the goal has been reached is 5 times or less. The main CPU 71 causes the routine to migrate from step S496 to step S497 by obtaining a negative result in step S496, increments the counter value, and then performs game lottery (step S498).

Figure 43:
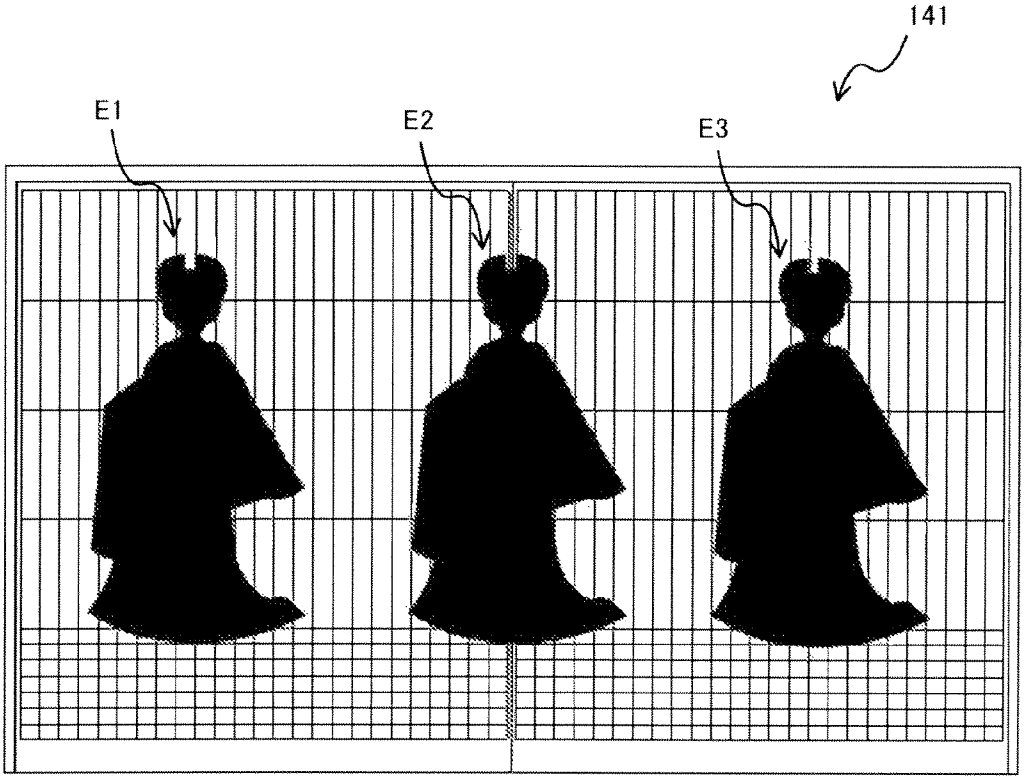
FIG. 43 is a view showing an example of a rendering image that is displayed on the lower image display panel of the gaming machine according to the embodiment of the present invention.

The game lottery used here is a processing operation of determining any of items of migration to the first bonus game (the Koharu bonus game), migration to the second bonus game (the Konatsu bonus game), and awarding a prize in the third bonus game (the Koyuki bonus game) by means of lottery. The main CPU 71, as shown in FIG. 43 displays images E1 to E3 that are indicative of three person's shadows suggesting the first to third bonus games, on the lower image display panel 141, and then, causes a player to select any of these person's shadows. The player operates to press any of the three person's shadows that are displayed on the lower image display panel 141, whereby the main CPU 71 recognizes the selected shadow, based on an output signal from the touch panel 114 that is provided in the lower image display panel 141.

The main CPU 71 then determines the contents with which the selected shadow is associated (any of items of migration to the first bonus game, migration to the second bonus game, and awarding a prize in the third bonus game) as the contents of the progress selected by the player. While an association between the three person's shadows that can be selected by the player and the contents of the progress of a game is determined by means of lottery every time game lottery (step S498) is executed, each of the contents of the progress may be determined by means of lottery every time game lottery (step S498) is executed irrespective of which shadow is selected by the player.

The main CPU 71 determines whether or not an item of awarding a prize in the third bonus game (the Koyuki bonus game) has been selected as a result of the game lottery in step S498 (step S499). In a case where the item of awarding a prize has not been selected in the third bonus game (the Koyuki bonus game), the main CPU 71 causes the routine to migrate from step S499 to step S500 by obtaining a negative result in step S499 and then determines whether or not the contents of the progress selected in step S498 are an item of migration to the first bonus game (the Koharu bonus game).

In a case where the contents of the selected progress are the item of migration to the first bonus game (the Koharu bonus game), the main CPU 71 causes the routine to migrate from step S500 to step S501 by obtaining an affirmative result in step S500 and then executes the first bonus game (the Koharu bonus game). The first bonus game (the Koharu bonus game) used herein is a game described above with reference to FIG. 25 or FIG. 28. In this manner, in the third bonus game (the Koyuki bonus game), in a case where the first bonus game (the Koharu bonus game) has been selected in a selection operation made after the goal has been reached, a processing loop that migrates to the first bonus game (the Koharu bonus game) is executed.

In a case where migration to the first bonus game (the Koharu bonus game) has been selected in the step S496 described above, light is emitted from the lamps that are provided at the back sides of a right fan symbol and a symbol of a former Japanese courtesan called "Oiran" that is associated with the right fan symbol, from among the three manual fan symbols that are drawn upward of the goal in the upper image display panel 131, whereby the right fan is brightly seen to enable a player to recognize that the routine migrates to the first bonus game (the Koharu bonus game).

On the other hand, in a case where the contents of the progress selected in the step S498 described above are none of the items of awarding a prize in the third bonus game (the Koyuki bonus game) and migration to the first bonus game (the Koharu bonus game), the main CPU 71 causes the routine to migrate from step S500 to step S502 by obtaining a negative result in step S500 and then executes the second bonus game (the Konatsu bonus game). The second bonus game (the Konatsu bonus game) is a game described above with reference to FIG. 29 or FIG. 32. In this manner, in the third bonus game (the Koyuki bonus game), in a case where the item of migration to the second bonus game (the Konatsu bonus game) has been selected in a selection operation made after the goal has been reached, a processing loop that migrates to the second bonus game (the Konatsu bonus game) is executed.

In a case where the item of migration to the second bonus game (the Konatsu bonus game) has been selected in the step S496 described above, light is emitted from the lamps that are provided at the back sides of a left fan symbol and a symbol of a former Japanese courtesan called "Oiran" that is associated with the left fan symbol, from among the three fan symbols that are drawn upward of the goal in the upper image display panel 131, whereby the left fan is brightly seen to enable a player to recognize that the routine migrates to the second bonus game (the Konatsu bonus game).

In addition, in a case where the game selected in the step S498 described above has been the item of awarding a prize in the third bonus game (the Koyuki bonus game), the main CPU 71 causes the routine to migrate from step S499 to step S504 by obtaining a negative result in step S499; awards a final prize in the third bonus game (the Koyuki bonus game) (the prize of 2,000 credits, for example, to be awarded after the goal has been reached); and completes the third bonus game (the Koyuki bonus game).

In this manner, in the third bonus game (the Koyuki bonus game), in a case where the item of awarding a prize in the third bonus game (the Koyuki bonus game) has been selected in a selection operation made after the goal has been reached, the item of awarding a prize in the third bonus game (the Koyuki bonus game) is executed and then the third bonus game completes without migrating to loop processing of migrating to the first bonus game (the Koharu bonus game) or the second bonus game (the Konatsu bonus game). In this case, light is emitted from the lamps that are provided at the back sides of a center fan symbol and a symbol of a former Japanese courtesan called "Oiran" associated with the center fan symbol, from among the three fan symbols that are drawn upward of the goal in the upper image display panel 131, whereby the center fan is brightly seen to enable a player to recognize that the item of awarding a prize is determined in the third bonus game (the Koyuki bonus game) and then the game completes.

On the other hand, in a case where the counter value has reached 5, the main CPU 71 causes the routine to migrate from step S496 to step S504 by obtaining an affirmative result in the step S496 described above; awards a prize in the third bonus game (the Koyuki bonus game); and completes the third bonus game (the Koyuki bonus game). In this manner, loop processing that migrates from the third bonus game (the Koyuki bonus game) to the first bonus game (the Koharu bonus game) or the second bonus game (the Konatsu bonus game) is repeated up to five times that are defined as its upper limit.

Figure 33:
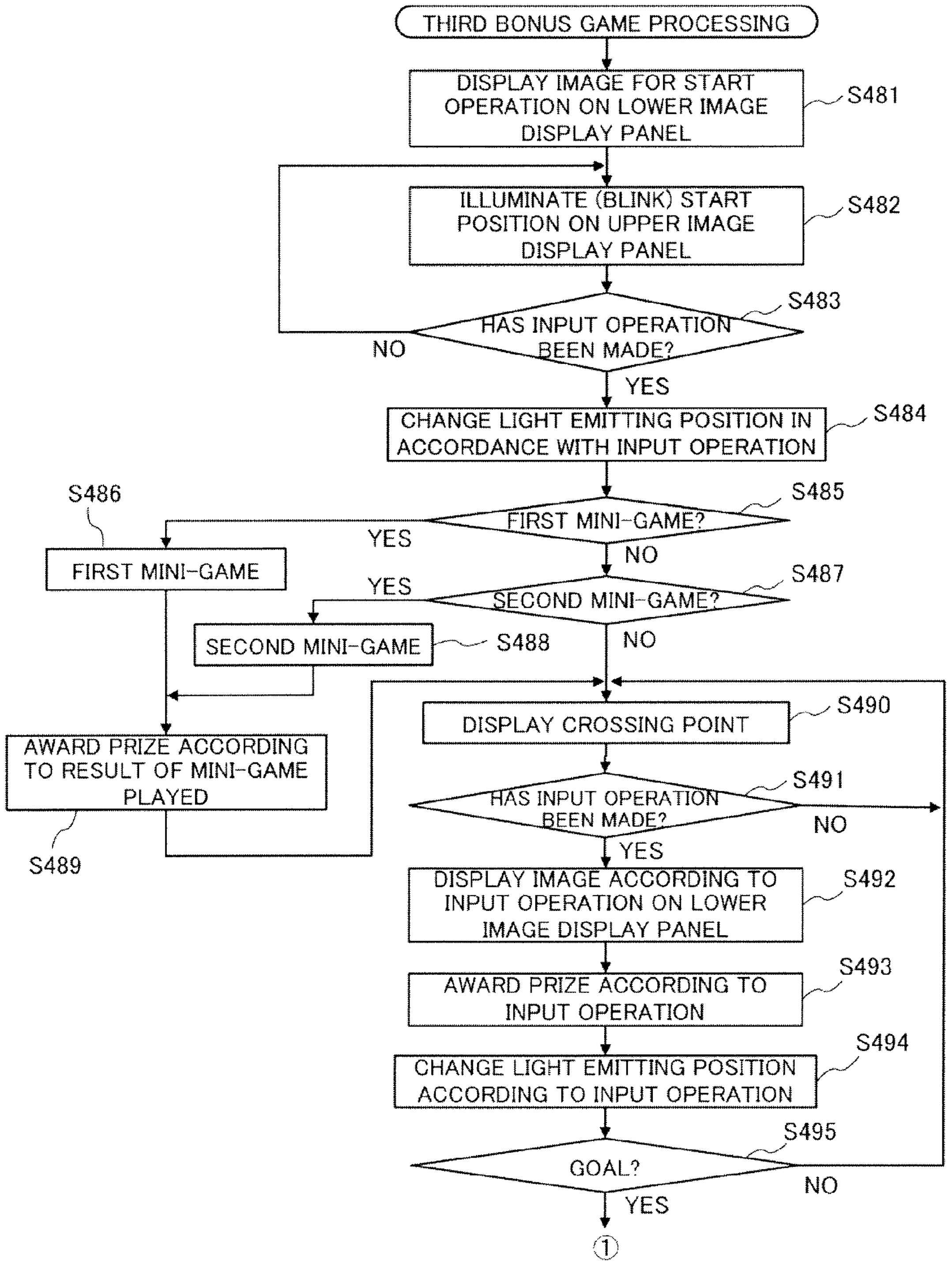
FIG. 33 is a view showing a flowchart of third bonus game processing in the gaming machine according to the embodiment of the present invention.
Figure 34:
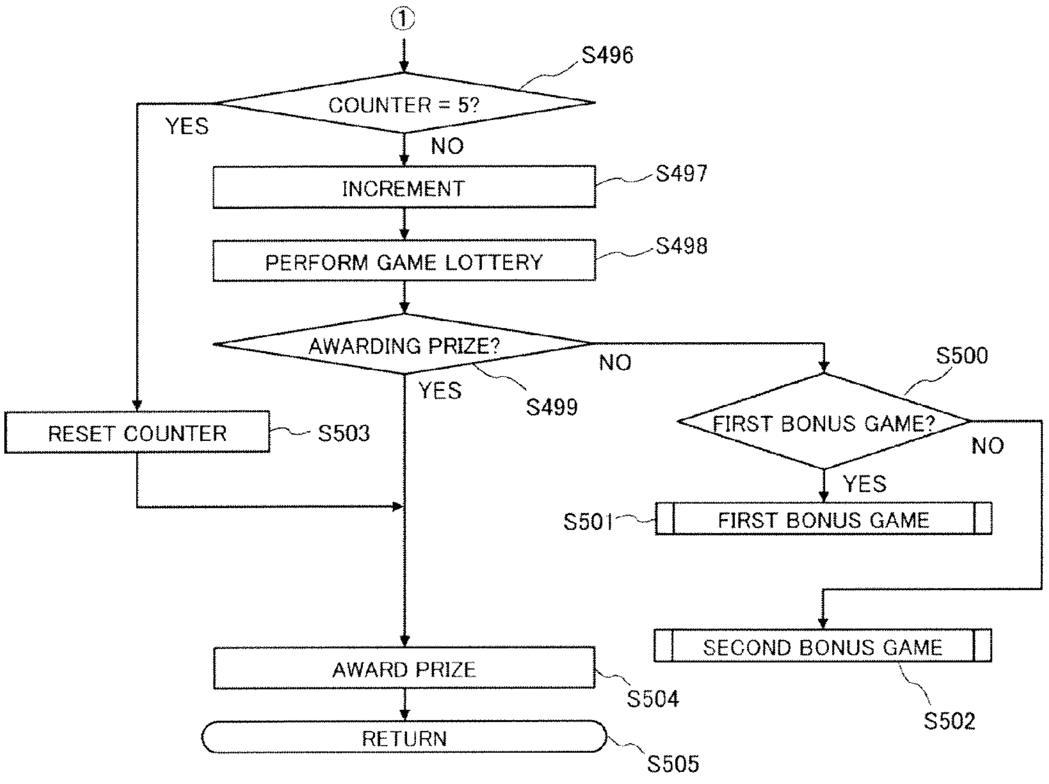
FIG. 34 is a view showing a flowchart of third bonus game processing in the gaming machine according to the embodiment of the present invention.

As has been described above, in the third bonus game (the Koyuki bonus game) shown in FIG. 33 and FIG. 34, a player operates the lower image display panel 141 (the touch panel 114), whereby the progress of a game according to a result of the operation is displayed on the upper image display panel 131.

In the upper image display panel 131, a start point P1 of a game is provided at a bottom part, and a light emitting region at the bottom part moves sequentially in an upward direction in accordance with the progress of the game. In this manner, a player's eye can move upward together with movement of the light emitting region. When the progress of the game reaches a goal, light is emitted in a goal region P12 that is provided at the top part of the upper image display panel 131, thereby enabling the player to pay his or her attention to the three fan symbols at the top part. Any of the three fan symbols emits light, thereby enabling the player to recognize a lottery result after the goal has been reached in the third bonus game (the Koyuki bonus game). At the top part of the upper image display panel 131, rendering that allows the fan or the symbol of a former Japanese courtesan called "Oiran" to emit light is performed, thereby enabling another player in hall to be informed that the goal has been reached in the third bonus game (the Koyuki bonus game).

What is claimed is:

1. A gaming machine comprising:

an input device for starting a basic game;

a first display panel configured to display a plurality of symbol arrays on which a plurality of symbol groups are respectively drawn, the first display panel constituting an operating panel;

a second display panel that is provided upward of the first display panel, and is configured to display an image; and a controller configured to execute processing operations of:

(a) based on an input to the input device, making determination processing to randomly determine symbols to be displayed for a player when scrolling of the plurality of symbol arrays stops, and then, starting a basic game;

(b) scrolling the plurality of symbol arrays that are displayed on the first display panel;

(c) based on a result of the determination processing, sequentially stopping the scrolling of the plurality of symbol arrays;

(d) after the scrolling of the plurality of symbol arrays is stopped, when at least one bonus symbol is displayed, migrating to a bonus game and then executing rendering of the bonus game in the second display panel;

(e) in the bonus game that is executed in the second display panel, moving a predetermined character along a route having a starting point, a finish point, and one or more crossing points, wherein a direction of further movement upon reaching one of the one or more crossing points is determined by the player choosing a direction of further movement via the first display panel;

(f) starting a mini-game when the predetermined character moves in a direction that does not advance the predetermined character toward the finish point, based upon the direction of further movement selected by the player upon reaching one of the one or more crossing points; and (g) based on a result of the mini-game, either determining a mini-game prize and then awarding the determined prize to the player or finishing the bonus game; and (h) awarding a bonus-game prize to the player after the predetermined character reaches the finish point.

2. The gaming machine of claim 1, wherein the bonus game further comprises a plurality of mini-games, each of the plurality of mini-games being associated with a different direction of further movement upon reaching one of the one or more crossing points, and further wherein the player's selection of a direction of further movement upon reaching one of the one or more crossing points corresponds to a selection of one of the plurality of mini-games.

3. The gaming machine of claim 2, wherein:

each of the plurality of mini-games is associated with a plurality of prizes having an average prize amount and a prize variation margin;

the average prize amount is the same for each of the plurality of mini-games; and the prize variation margin is different for each of the plurality of mini-games.

4. The gaming machine of claim 1, wherein the result of the mini-game depends upon a selection made by the player during the mini-game.

5. The gaming machine of claim 1, wherein the bonus game further comprises a plurality of routes between the starting point and the finish point, each of the plurality of routes comprising advantages or disadvantages associated with that route.

6. The gaming machine of claim 1, wherein:

the controller is further configured to execute processing operations of (i) causing light to be emitted from a lamp behind a region within the route when a predetermined direction of further movement is selected by the player upon reaching one of the one or more crossing points; and in the processing operation (f), the mini-game is started based upon the predetermined direction of further movement.

7. The gaming machine of claim 1, wherein:

the controller is further configured to execute processing operations of (i) causing light to be emitted from a lamp behind a first region within the route when a first direction of further movement is selected by the player upon reaching a first one of the one or more crossing points, and (j) causing light to be emitted from a lamp behind a second region within the route when a second direction of further movement is selected by the player upon reaching a second one of the one or more crossing points; and in the processing operation (f), a first mini-game is started based upon the first direction of further movement, and a second mini-game is started based upon the second direction of further movement.

8. The gaming machine of claim 1, wherein, in the processing operation (h):

the controller repeatedly migrates to a further bonus game if a predetermined condition is not satisfied after the predetermined character reaches the finish point; and the bonus-game prize is awarded to the player based upon a result of the further bonus game.

9. A gaming machine comprising:

an input device for starting a basic game;

a first display panel configured to display a plurality of symbol arrays on which a plurality of symbol groups are respectively drawn, the first display panel constituting an operating panel;

a second display panel that is provided upward of the first display panel, and is configured to display an image; and a controller configured to execute processing operations of:

(a) based on an input to the input device, making determination processing to randomly determine symbols to be displayed for a player when scrolling of the plurality of symbol arrays stops, and then, starting a basic game;

(b) scrolling the plurality of symbol arrays that are displayed on the first display panel;

(c) based on a result of the determination processing, sequentially stopping the scrolling of the plurality of symbol arrays;

(d) after the scrolling of the plurality of symbol arrays is stopped, when at least one bonus symbol is displayed, migrating to a first specific bonus game and then executing rendering of the first specific bonus game in the second display panel;

(e) in the first specific bonus game that is executed in the second display panel, moving a predetermined character along a route having a starting point, a finish point, and one or more crossing points, wherein a direction of further movement upon reaching one of the one or more crossing points is determined by the player choosing a direction of further movement via the first display panel;

(f) starting a mini-game when the predetermined character moves in a direction that does not advance the predetermined character toward the finish point, based upon the direction of further movement selected by the player upon reaching one of the one or more crossing points;

(g) based on a result of the mini-game, either determining a mini-game prize and then awarding the determined prize to the player or finishing the first specific bonus game;

(h) awarding a first specific bonus-game prize to the player after the predetermined character reaches the finish point;

(j) performing a first lottery as to whether or not the controller migrates to a second specific bonus game after the first specific bonus game is finished; and (k) performing a second lottery as to whether or not the controller migrates to the first specific bonus game after the second specific bonus game is finished.

10. The gaming machine of claim 9, wherein the first specific bonus game further comprises a plurality of mini-games, each of the plurality of mini-games being associated with a different direction of further movement upon reaching one of the one or more crossing points, and further wherein the player's selection of a direction of further movement upon reaching one of the one or more crossing points corresponds to a selection of one of the plurality of mini-games.

11. The gaming machine of claim 10, wherein:

each of the plurality of mini-games is associated with a plurality of prizes having an average prize amount and a prize variation margin;

the average prize amount is the same for each of the plurality of mini-games; and the prize variation margin is different for each of the plurality of mini-games.

12. The gaming machine of claim 9, wherein the result of the mini-game depends upon a selection made by the player during the mini-game.

13. The gaming machine of claim 9, wherein the first specific bonus game further comprises a plurality of routes between the starting point and the finish point, each of the plurality of routes comprising advantages or disadvantages associated with that route.

14. The gaming machine of claim 9, wherein:

the controller is further configured to execute processing operations of (i) causing light to be emitted from a lamp behind a region within the route when a predetermined direction of further movement is selected by the player upon reaching one of the one or more crossing points; and in the processing operation (f), the mini-game is started based upon the predetermined direction of further movement.

15. The gaming machine of claim 9, wherein:

the controller is further configured to execute processing operations of (i) causing light to be emitted from a lamp behind a first region within the route when a first direction of further movement is selected by the player upon reaching a first one of the one or more crossing points, and (j) causing light to be emitted from a lamp behind a second region within the route when a second direction of further movement is selected by the player upon reaching a second one of the one or more crossing points; and in the processing operation (f), a first mini-game is started based upon the first direction of further movement, and a second mini-game is started based upon the second direction of further movement.

16. The gaming machine of claim 9, wherein, in the processing operation (h):

the controller repeatedly migrates to a further bonus game if a predetermined condition is not satisfied after the predetermined character reaches the finish point; and the first specific bonus-game prize is awarded to the player based upon a result of the further bonus game.

* * * * *